3,772,302
PROCESSES AND INTERMEDIATES FOR QUININE, QUINIDINE, ISOMERS AND DERIVATIVES THEREOF

Juerg Albert Walter Gutzwiller, Bettingen, Switzerland, and Milan Radoje Uskokovic, Upper Montclair, N.J., assignors to Hoffmann-La Roche Inc., Nutley, N.J.
No Drawing. Continuation-in-part of application Ser. No. 104,784, Jan. 7, 1971, which is a continuation-in-part of application Ser. No. 837,354, June 27, 1969, which in turn is a continuation-in-part of application Ser. No. 741,914, July 2, 1968, all now abandoned. This application Dec. 27, 1971, Ser. No. 212,774
Int. Cl. C07d 43/24
U.S. Cl. 260—284            10 Claims

ABSTRACT OF THE DISCLOSURE

The preparation of quinine, quinidine, isomers and derivatives thereof from the correspondingly substituted 4-methylquinoline and 1-acyl( or 1-H)-3-vinyl(or lower alkyl)-4-piperidine acetic acid esters (or acetaldehyde) through alternative series of reaction steps which comprise condensation, halogenation, deacylation, reduction, cyclization and hydroxylation, is described. Also described is the preparation of 1-acyl(or 1-H)-3-vinyl-4-piperidineacetic acids and esters thereof and 1-acyl-3-vinyl-4-piperidineacetaldehyde utilizing the corresponding 7-acyldecahydro-2H-pyrido[3,4-d]azepin-2-one, prepared from 2 - acyl-1,3,4,7,8,8a-hexahydro-6(2H)-isoquinolone. The end products are useful as antimalarial and antiarrhythmic agents.

CROSS-REFERENCE TO RELATED APPLICATIONS

This application is a continuation-in-part of application Ser. No. 104,784, filed Jan. 7, 1971, now abandoned, which is a continuation-in-part of application Ser. No. 837,354, filed June 27, 1969, now abandoned, which in turn is a continuation-in-part of Ser. No. 741,914, filed July 2, 1968, now abandoned.

BRIEF SUMMARY OF THE INVENTION

The invention relates to a process for preparing quinine, quinidine, isomers and derivatives thereof which comprises:

(a) Condensing the correspondingly substituted 4-methylquinoline with racemic or optically active cis or trans 1-acyl(or 1-H)-3-vinyl(or lower alkyl)-4-piperidineacetic acid ester to yield the corresponding racemic or optically active cis or trans 4-{3-[1-acyl(or 1-H)-3-vinyl (or lower alkyl)-4-piperidyl]-2-oxo-propyl}quinoline;

(b) Deacylating, if necessary, and reducing the product of step (a) to yield the corresponding racemic or optically active epimeric 4-{cis or trans-3-[3-vinyl(or lower alkyl) - 4 - piperidyl]-2ξ-hydroxypropyl}quinolines. If desired, this reaction product can be acylated to yield racemic or optically active epimeric 4-{cis or trans-3-[3-vinyl (or lower alkyl)-4-piperidyl]-2ξ-acyloxypropyl}quinolines or dehydrated to yield racemic or optically active cis or trans 4-{cis or trans 3-[3-vinyl(or lower alkyl)-4- piperidyl]prop-1-enyl}quinolines;

(c) An alternate process comprises condensing the correspondingly substituted 4-methylquinoline with racemic or optically active cis or trans 1-acyl-3-vinyl(or lower alkyl)-4-piperidineacetaldehyde to yield the corresponding racemic or optically active epimeric 4-{cis or trans-3-[1-acyl-3-vinyl(or lower alkyl)-4-piperidyl]-2ξ-hydroxypropyl}quinolines, and deacylating, this reaction product to yield the corresponding racemic or optically active epimeric 4-{cis or trans-3-[3-vinyl(or lower alkyl)-4-piperidyl]-2ξ-hydroxypropyl}quinolines;

(d) Cyclizing the hydroxy, acyloxy or prop-1-enyl quinoline product of step (b) or (c) to yield the corresponding racemic or optically active 4-{α-[5-vinyl(or lower alkyl)-2-quinuclidinyl]-methyl}quinoline, epimeric in positions 2 and 5;

(e) Hydroxylating the product of step (d) to yield the corresponding racemic or optically active α-[5-vinyl(or lower alkyl)-2-quinuclidinyl] - 4 - quinolinemethanol, epimeric in positions α, 2 and 5; and (f) Recovering the desired reaction product.

An alternate process comprises:

(g) Halogenating the product of step (a) above to yield the corresponding racemic or optically active epimeric 4-{cis or trans 3-[1-acyl-3-vinyl(or lower alkyl)-4-piperidyl]-1ξ-halo-2-oxopropyl}quinolines;

(h) Reducing the product of step (g) with subsequent cyclization to yield a mixture of the corresponding racemic or optically active epimeric 4-{cis or trans-3-[1-acyl-3-vinyl(or lower alkyl) - 4 - piperidyl]-1ξ,2ξ-oxapropyl] quinolines;

(i) Deacylating the product of step (g) to yield a mixture of the corresponding racemic or optically active epimeric 4-{cis or trans 3-[3-vinyl(or lower alkyl)-4-piperidyl]-1ξ,2ξ-oxapropyl}quinolines;

(j) Cyclizing the product of step (h) to yield the corresponding racemic or optically active α-[5-vinyl(or lower alkyl)-2-quinuclidinyl]-4-quinolinemethanol, epimeric in positions α, 2 and 5; and (k) Recovering the desired reaction product.

The end products are useful as antimalarial and antiarrhythmic agents.

In another aspect, the invention relates to a process for preparing racemic or optically active cis or trans 1-acyl(or 1-H)-3-vinyl - 4 - piperidineacetic acid and esters thereof and racemic or optically active cis or trans 1-acyl-3-vinyl-4-piperidineacetaldehyde by:

(a) Nitrosating a racemic or optically active cis or trans 7 - acyl-decahydro-2H-pyrido[3,4-d]azepin-2-one to yield the corresponding racemic or optically active cis or trans 7-acyl-1-nitroso-decahydro-2H-pyrido[3,4-d]azepin-2-one;

(b) Pyrrolyzing the reaction product of step (a) to yield the corresponding racemic or optically active cis or trans 1-acyl-3-vinyl-4-piperidineacetic acid; and (c) Hydrolyzing, if desired, and esterifying the reaction product of step (b) to yield the corresponding racemic or optically active cis or trans 1-acyl(or 1-H)-3-vinyl-4-piperidineacetic acid ester; and (d) Reducing and acylating the reaction product of step (c) to yield racemic or optically active cis or trans 1-acyl-3-vinyl-4-piperidineacetaldehyde.

In a further aspect, the invention relates to an alternate process for preparing racemic or optitcally active cis and trans 1-acyl(or 1-H)-3-vinyl-4-piperidineacetic acid and esters thereof by:

(a) Alcoholizing a racemic or optically active cis or trans 7-acyl-decahydro-2H-pyrido[3,4-d]azepin-2-one to yield the corresponding racemic or optically active cis or trans 1-acyl-3-(2-aminoethyl) - 4 - piperidineacetic acid esters;

(b) Methylating the reaction product of step (a) to yield the corresponding racemic or optically active cis or trans 1-acyl-3-(2-dimethylaminoethyl)-4-piperidineacetic acid esters;

(c) Oxidizing the reaction product of step (b) to yield the corresponding racemic or optically active cis or trans 1-acyl-3-(2 - dimethylaminoethyl)-4-piperidineacetic acid ester N-oxide; and (d) Pyrolyzing the reaction product of step (c) to yield the desired acetic acid and esters thereof.

In still another aspect, the invention relates to a process for preparing racemic or optically active cis or trans 7-acyl-decahydro-2H-pyrido[3,4-d]azepin - 2 - one which comprises:

(a) Hydrogenating a racemic or optically active 2-acyl-1,3,4,7,8,8a-hexahydro-6(2H) - isoquinolone to yield the corresponding racemic or optically active cis or trans 2-acyl-octahydro-6(2H)-isoquinolone; and (b) Converting the reaction product of step (a), through a Schmidt Rearrangement, to the corresponding racemic or optically active cis or trans 7-acyl-decahydro-2H-pyrido[3,4-d]azepin-2-one.

Alternatively, by a process which comprises:

(a) Converting, through a Schmidt Rearrangement, a racemic or optically active 2-acyl-1,3,4,7,8,8a-hexahydro-6(2H)-isoquinolone to the corresponding racemic or optically active 2-acyl-1,2,3,4,7,8,9,9a-octahydro-6H-pyrido[3,4-d]azepin-6-one; and (b) Hydrogenating the reaction product of step (a) to yield the corresponding racemic or optically active cis or trans 7-acyl-decahydro-2H-pyrido[3,4-d]azepin-2-one.

In yet another aspect, the invention relates to novel compounds.

DETAILED DESCRIPTION OF THE INVENTION

The term "lower alkyl" as used herein denotes a hydrocarbon group containing 1–7 carbon atoms, such as methyl, ethyl, propyl, butyl and the like; methyl and ethyl are preferred. The term "lower alkoxy" denotes a lower alkyl ether group in which the lower alkyl moiety is described as above, such as methoxy, ethoxy, propoxy, butoxy and the like; methoxy and ethoxy are preferred. The term "halogen" denotes all of the halogens, i.e., bromine, chlorine, fluorine and iodine. Preferred are chlorine and bromine. The term "acyl" denotes lower alkanoyl of 1–7 carbon atoms such as formyl, acetyl, propanoyl, butanoyl, heptanoyl, and the like; ar-lower alkanoyl, preferably phenyl-lower alkanoyl wherein phenyl may be substituted by one or more lower alkyl, lower alkoxy or halogen groups such as benzoyl and the like. The term "aryl" means phenyl which may be substituted by one or more lower alkyl, lower alkoxy or halogen groups. The term "aralkyl" means a hydrocarbon group of 7–12 carbon atoms such as benzyl, phenethyl, phenylpropyl and the like. The term "acyloxy" means an acyloxy wherein the acyl moiety is as hereinbefore described, for example, lower alkanoyloxy and ar-lower alkanoyloxy.

The process for preparing quinine, quinidine, isomers and derivatives thereof is exemplified by Reaction Scheme Ia, Ia', Ia'', Ib, Ib' and Ib''.

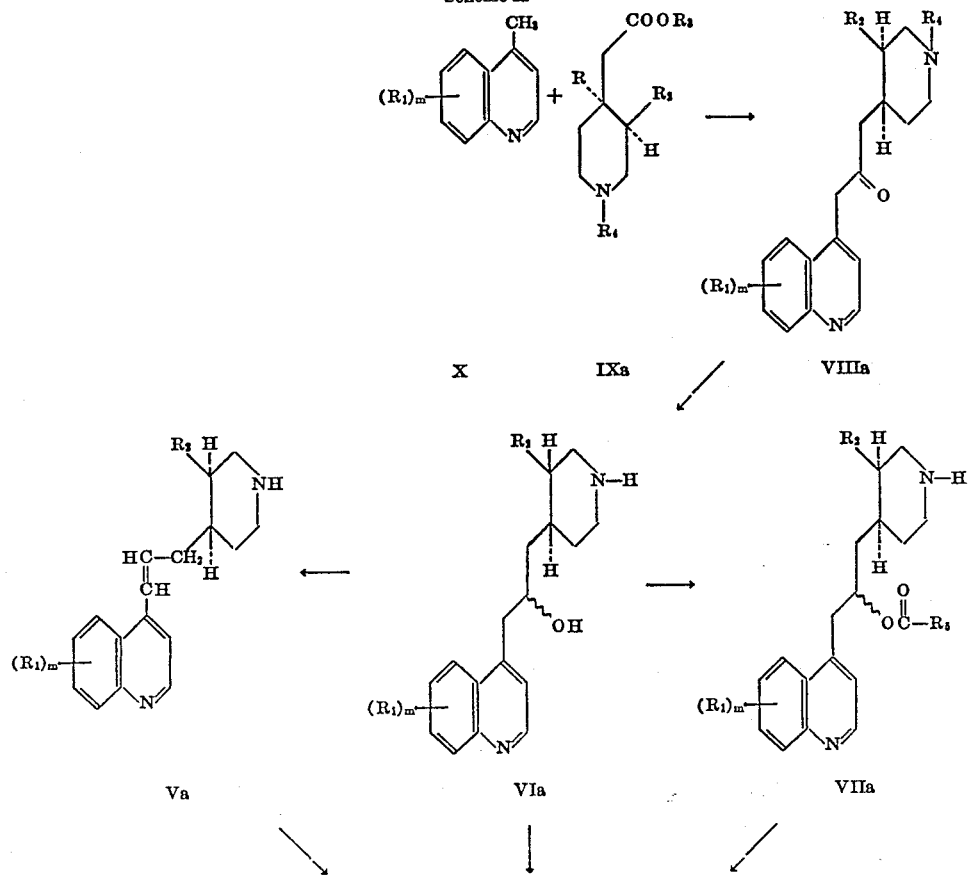

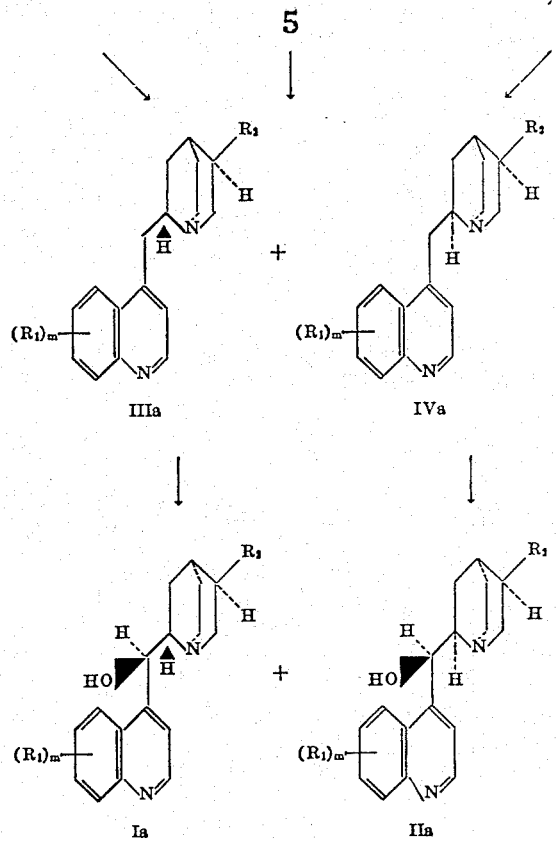

wherein m is 0, 1 or 2; $R_1$ is hydrogen, hydroxy, halogen, trifluoromethyl, lower alkyl, lower alkoxy, or when m is 2, $R_1$, taken together with an adjacent $R_1$, is also methylenedioxy; $R_2$ is vinyl or lower alkyl, preferably ethyl; $R_3$ is hydrogen or lower alkyl; $R_4$ is hydrogen or acyl; and $R_5$ is lower alkyl, aryl or ar-lower alkyl. As is evident from the above when m is 2, $R_1$ or the like is individually selected from the various groupings hereinbefore described.

Compounds of the Formula Ia and IIa above are useful as antimalarial and antiarrhythmic agents.

In Reaction Scheme Ia, 4-methyl-quinolines of Formula X, which are known compounds or are analogs of known compounds readily obtained by known procedures, are condensed with 1-acyl (or 1-H)-3(R)-vinyl(or lower alkyl)-4(S)-piperidineacetic acid ester of Formula IXa, antipode or its racemate which are known compounds, are analogs of known compounds readily obtained by known procedures, or are prepared as hereinafter described, in the presence of a base, for example, sodium hydride, an alkali metal alkoxide such as sodium methoxide, or lithium dialkylamide such as lithium diisopropylamide to yield 4-{3-[1-acyl(or 1-H)-3(R)-vinyl(or lower alkyl)-4(S)-piperidyl]-2-oxopropyl}quinoline of Formula VIIIa, antipode or its racemate. The condensation is suitably carried out at room temperature; however, temperatures above or below room temperature may be employed. Preferably, the condensation is conducted at a temperature within the range of about −70° and about 50° C. Moreover, the condensation can be suitably carried out in the presence of an inert organic solvent, for example, a hydrocarbon, such as benzene, hexane and the like, or an ether such as ether, tetrahydrofuran or dioxane, or dimethylformamide or hexamethylphosphoramide.

The 4-{3-[1-acyl(or 1-H)-3(R)-vinyl(or lower alkyl)-4(S)-piperidyl]-2-oxopropyl}quinoline of Formula VIIIa, antipode or its racemate is converted to the mixture of epimeric 4-{3-[3(R)-vinyl(or lower alkyl)-4(S)-piper- idyl]-2ξ-hydroxypropyl}quinolines of Formula VIa, their antipodes or racemates by simultaneous deacylation, if necessary, and reduction. The deacylation and reduction are conveniently effected utilizing a reducing agent, for example, diisobutylaluminum hydride, sodium aluminum hydride and the like, in an inert organic solvent, for example, a hydrocarbon such as benzene or toluene, ether, tetrahydrofuran and the like. The deacylation and reduction are suitably carried out at room temperature or below, preferably, at a temperature within the range of about −70° to about 25° C. The reduction and deacylation can also be carried out stepwise, i.e., by first reducing a compound of Formula VIIIa, wherein $R_4$ is acyl, with sodium borohydride, followed by deacylation utilizing, for example, aqueous hydrochloric or sulfuric acid as the deacylating agent. If desired, the compound of Formula VIa can be esterified to the corresponding mixture of epimeric 4-{3-[3(R)-vinyl(or lower alkyl)-4(S)-piperidyl]-2ξ-acyloxypropyl}quinolines of Formula VIIa, their antipodes or racemates utilizing known procedures, for example, reaction with the corresponding organic acid in the presence of a catalyst, such as boron trifluoride. Alternatively, if desired, the compound of Formula VIa can be converted to cis and trans 4-{3-[3(R)-vinyl(or lower alkyl)-4(R)-piperidyl]-prop-1-enyl}quinolines of Formula Va, their antipodes or racemates utilizing a dehydrating agent such as thionyl chloride, phosphorus oxychloride, phosphorus pentachloride and the like, in the presence of an organic base, for example, a tertiary amine such as pyridine, triethylamine and the like, at a temperature within the range of about 0° to about room temperature.

The cyclization of epimeric 4-{3-[3(R)-vinyl(or lower alkyl)-4(S)-piperidyl] - 2ξ - hydroxy(or acyloxy)propyl} quinolines of Formulas VIa and VIIa, their antipodes or racemates, respectively and cis and trans 4-{3-[3(R)-vinyl (or lower alkyl)-4(R)-piperidyl]prop-1-enyl}quinolines of Formula Va, their antipodes or racemates to 4-{α-[5(R)-vinyl(or lower alkyl)-4(S)-quinuclidin-2(S) and 2(R)-yl]-methyl}quinolines of Formulas IIIa and IVa, their antipodes or its racemate is carried out utilizing a cyclizing agent, for example, an organic acid, such as glacial acetic acid or the like. The cyclization is suitably carried out at room temperature; however, temperatures above or below room temperature may also be employed. It is preferred to employ a temperature within the range of about 25° to about 100° C. Moreover, the cyclization can be conveniently conducted in the presence of an inert organic solvent, for example, a hydrocarbon such as benzene or toluene, or an ether, such as diethyl ether or tetrahydrofuran.

The hydroxylation of the compounds of Formulas IIIa and IVa or their racemates to α(R)-[5(R)-vinyl(or lower alkyl)-4(S)-quinuclidin-2(S)-yl] - 4 - quinolinemethanol of Formula Ia, its antipode or racemate and α(S)-[5(R)-vinyl(or lower alkyl)-4(S)-quinuclidin-2(R)-yl]-4-quinolinemethanol of Formula IIa, its antipode or racemate, respectively, is carried out, for example, in the presence of molecular oxygen and a reducing agent, such as dimethylsulfoxide, pyridine, triphenylphosphine, platinum black, or a trialkylphosphite, such as triethylphosphite, or the like, in a strongly basic solution.

A suitable base for the reaction described above comprises, for example, an alkali metal alkoxide, such as potassium t-butoxide, sodium t-butoxide, sodium isoamylate, sodium methoxide or the like, or an alkali metal amide, such as lithium diisopropylamide, sodium amide or the like. Conveniently, a solvent such as dimethylsulfoxide, dimethylformamide, hexamethylphosphoramide, pyridine, t-butanol, a hydrocarbon such as benzene or toluene, an ether such as tetrahydrofuran, dioxane or the like, or mixtures thereof can be utilized. A preferred reaction medium comprises a mixture of dimethylsulfoxide and t-butanol in the presence of potassium t-butoxide.

Scheme Ia'

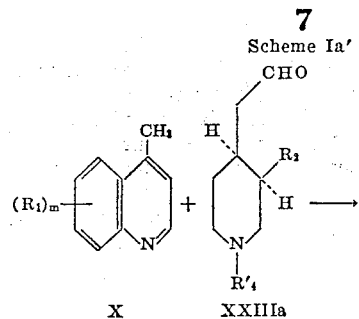

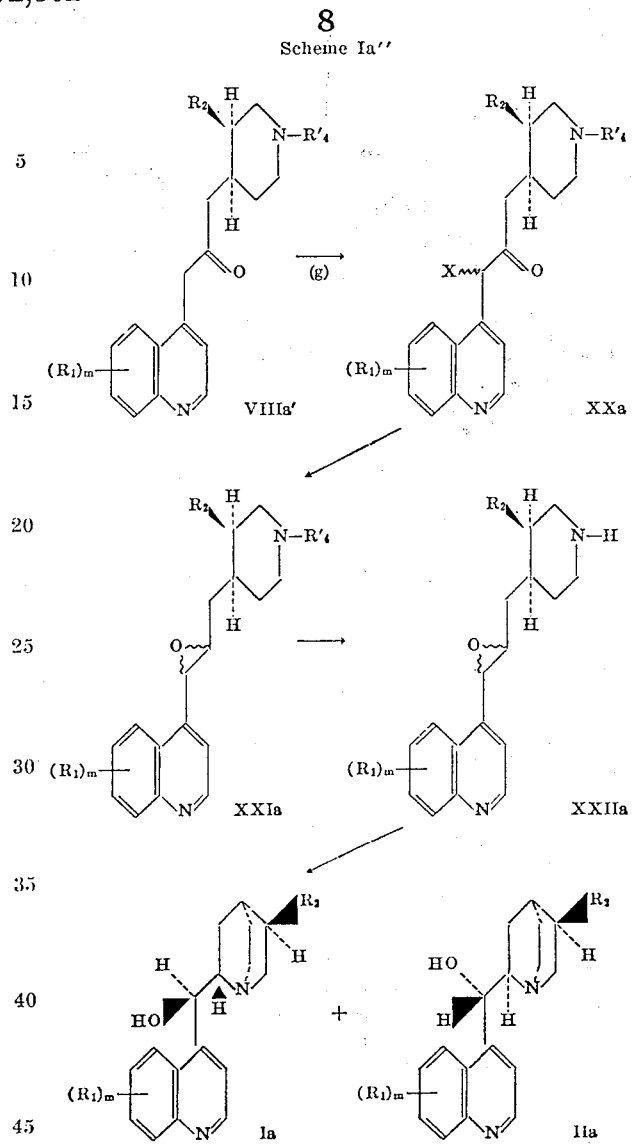

wherein $R_1$, $R_2$ and $m$ are previously described and $R'_4$ is acyl.

In Reaction Scheme Ia' an alternative process for the preparation of compounds of Formula VIa is described. 4-methylquinolines of Formula X are condensed with 1-acyl-3(R)-vinyl- (or lower alkyl)-4(S)-piperidineacetaldehyde of Formula XXIIIa, its antipode or racemate which are new compounds and are prepared as hereinafter described, in the presence of base, for example, sodium hydride, an alkali metal alkoxide such as sodium methoxide, or lithium dialkylamide such as lithium diisopropylamide to yield the mixture of epimeric 4-{3-[1-acyl-3(R)-vinyl- (or lower alkyl)-4(S)-piperidyl]-2ξ-hydroxypropyl}quinolines of Formula XXIVa, their antipodes of racemates. The compounds of Formula XXIVa are deacylated to the corresponding mixture of epimeric 4-{3-[3(R)-vinyl (or lower alkyl)-4(S)-piperidyl]-2ξ-hydroxypropyl}quinolines of Formula VIa, their antipodes or racemates, utilizing a deacylating agent, for example, alkali metal hydroxide, such as sodium hydroxide or potassium hydroxide, a reductive deacylating agent such as lithium aluminum hydride, sodium aluminum hydride, diisobutyl aluminum hydride and the like. Preferably, the deacylation is suitably carried out at room temperature; however, temperatures above and below room temperature may be employed. Moreover, the deacylation can be suitably carried out in the presence of an inert organic solvent, for example, a lower alkanol, such as methanol or ethanol, or an ether, such as tetrahydrofuran or dioxane.

Scheme Ia'' wherein $R_1$, $R_2$, $R'_4$ and $m$ are as previously described and X is halogen.

In Reaction Scheme Ia'', an alternative process for the conversion of compounds of Formula VIIIa' to the compounds of Formulas Ia and IIa is described. The conversion of the 4-{3-[1-acyl-3(R)-vinyl (or lower alkyl)-4(S)-piperidyl]-2-oxopropyl}quinoline of Formula VIIIa', its antipode or racemate to the corresponding mixture of epimeric 4-{3-[1-acyl-3(R)-vinyl (or lower alkyl)-4(S)-piperidyl]-1ξ-halo-2-oxopropyl}quinolines of Formula XXa, their antipodes or racemates, respectively, is effected utilizing a halogenating agent such as N-bromosuccinimide, N-chloro-succinimide, N-bromoacetamide and the like. The halogenation can be conducted in an inert organic solvent, for example, a hydrocarbon such as benzene, toluene and the like, a halogenated hydrocarbon such as carbon tetrachloride; an ether such as diethylether, tetrahydrofuran, dioxane and the like. Conveniently, the reaction can be initiated by a free radical catalyst such as dibenzoylperoxide or by irradiation with infrared. The temperature is not critical, however, it is preferred to conduct the reaction at a temperature in the range of about room temperature and the reflux temperature of the reaction mixture.

The conversion of the epimeric compounds of Formula XXa, their antipodes or racemates to the corresponding mixture of diastereomeric 4-{3-[1-acyl-3(R)-vinyl(or lower alkyl)-4(S)-piperidyl]-ξ,2ξ-oxapropyl}quinolines of the Formula XXIa, their antipodes or racemates can be effected utilizing a reducing agent, for example, alkali metal hydrides such as sodium borohydride, potassium borohydride, lithium tritertiarybutoxyaluminum hydride and the like. The reduction is conveniently effected in an inert organic solvent, for example, aliphatic alcohols such as methanol, ethanol and the like; ethers such as diethylether, tetrahydrofuran, dioxane and the like, at a temperature in the range of about —70° C. and about the reflux temperature of the reaction mixture.

The conversion of the compound of Formula XXIa to the corresponding mixture of the diastereomeric 4-{3-[3(R)-vinyl(or lower alkyl)-4(S)-piperidyl]-1ξ,2ξ-oxopropyl}quinolines of the Formula XXIIa, their antipodes or racemeates is effected using a deacylating agent, for example, alkali hydroxides such as sodium hydroxide, potassium hydroxides, or a reducing deacylating agent, for example, dialkylaluminum hydride such as diisobutylaluminum hydride, or an alkali metal aluminum hydride such as lithium aluminum hydride, sodium aluminum hydride and the like. The deacylation is conveniently conducted in the presence of an inert organic solvent, for example, lower alkanols such as methanol, ethanol and the like, hydrocarbons such as toluene and the like, ethers such as diethylether, tetrahydrofuran and the like. The deacylation temperature is not critical. Conveniently, it may be in the range of about —70° C. to about the reflux temperature of the reaction mixture.

The conversion of the compounds of Formula XXIIa to the corresponding mixture comprising α(R)-[5(R)-vinyl(or lower alkyl)-4(S)-quinuclidin-2(S)-yl]-4-quinolinemethanol of Formula Ia, its antipode or racemate and α(S)-[5(R)-vinyl(or lower alkyl)-4-(S)-quinuclidin-2(R)-yl]-4-quinolinemethanol of Formula IIa, its antipode or racemate is effected by reaction with a weak organic or inorganic protonic acid, for example, water, ammonium chloride, lower alkanols such as methanol, ethanol and the like, Lewis acids such as aluminum oxide, aluminum chloride, boron trifluoride and the like. Conveniently, conversion is conducted in the presence of an inert organic solvent, for example, carbon disulfide, hydrocarbons such as benzene, toluene and the like, chlorinated hydrocarbons such as dichloromethane, carbontetrachloride, chloroform and the like, and ethers such as diethylether, tetrahydrofuran, dioxane and the like. The temperature of the reaction is not critical. Conveniently, it may be in the range of about 0° C. and about the reflux temperature of the reaction mixture.

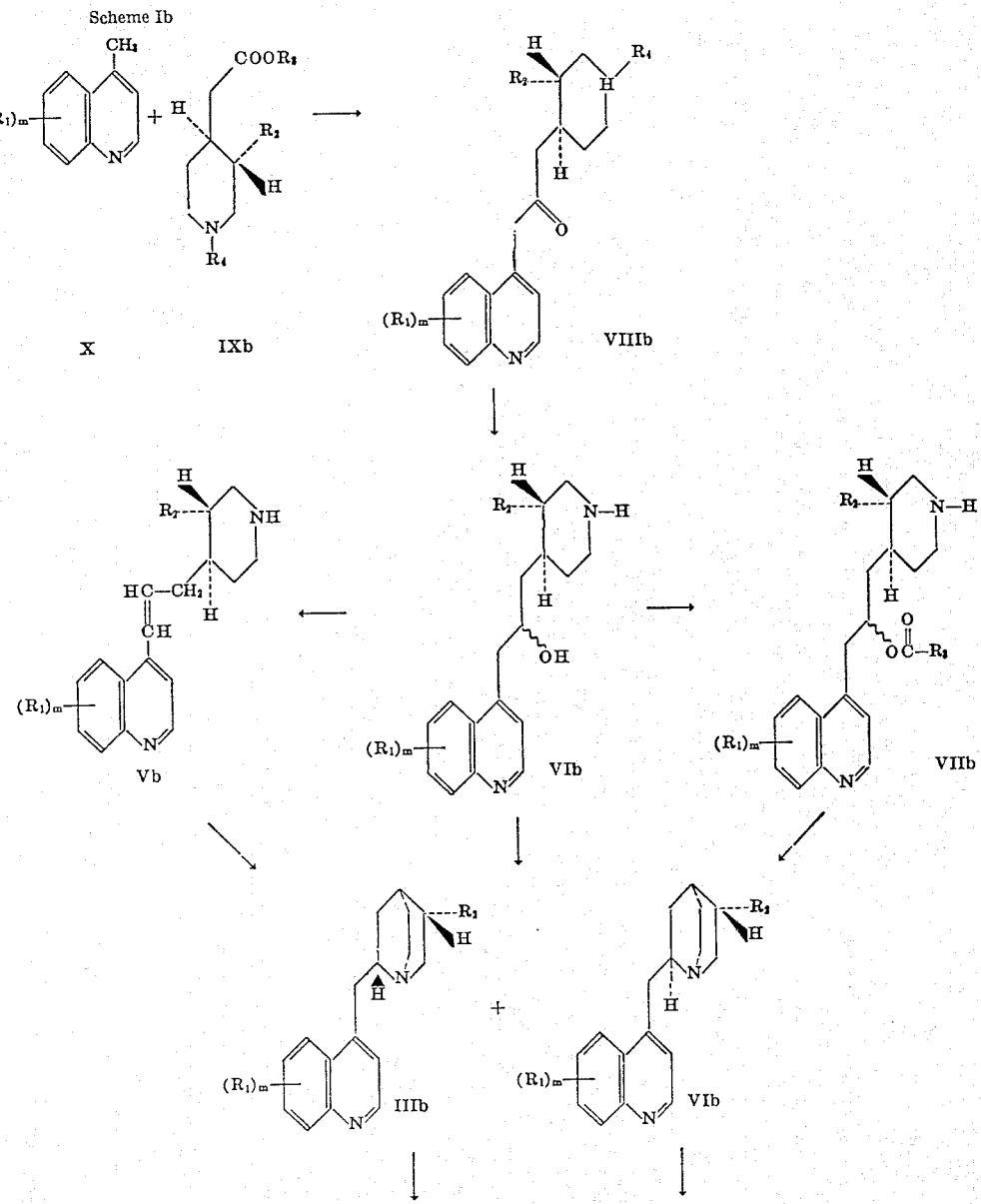

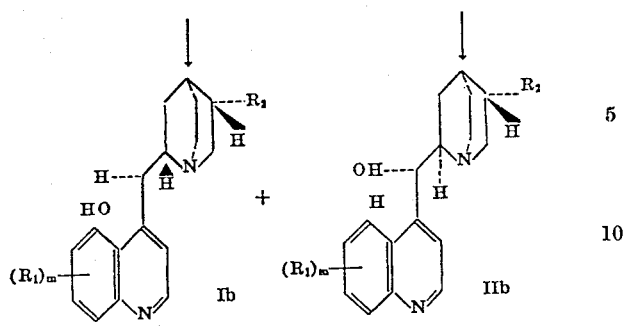

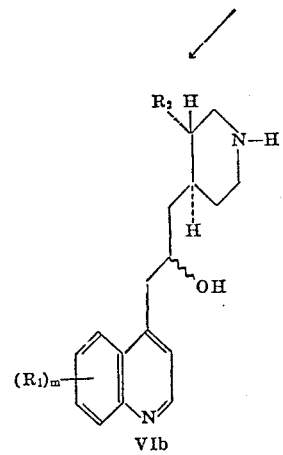

wherein $R_1$, $R_2$, $R_3$, $R_4$, $R_5$ and $m$ are as previously described.

The hereinafter described reaction steps of Reaction Scheme Ib are effected utilizing the procedures and conditions set forth in Scheme Ia. The 4-methyl-quinoline of Formula X is condensed with 1-acyl (or 1-H)-3(S)-vinyl (or lower alkyl)-4(S)-piperidineacetic acid ester of Formula IXb, its antipode or racemate to yield 4-{3-[1-acyl (or 1-H)-3(S)-vinyl(or lower alkyl)-4(S)-piperidyl]-2-oxopropyl}quinoline of Formula VIIIb, its antipode or racemate. The compound of Formula VIIIb is deacylated, if necessary, and reduced to the mixture of epimeric 4-{3-[3(S)-vinyl(or lower alkyl) - 4(S)-piperidyl]-2ξ-hydroxypropyl}quinolines of Formula VIb, their antipodes or racemates. If desired, the compounds of Formula VIb can be esterified to the mixture of epimeric 4-{3-[3(S)-vinyl(or lower alkyl) - 4(S)-piperidyl]-2ξ-acyloxypropyl} quinolines of Formula VIIb, their antipodes or racemates or, alternatively, it can be converted to cis and trans 4-{3-[3(S)-vinyl(or lower alkyl)-4(R)-piperidyl]-prop-1-enyl}quinolines of Formula Vb, their antipodes or racemates. The compounds of Formula Vb, VIb or VIIb are cyclized to 4-{α-[5(S)-vinyl(or lower alkyl)-4(S)-quinuclidin-2(S) and 2(R)-yl]-methyl}quinolines of Formulas IIIb and IVb, their antipodes or racemates. The compounds of Formulas IIIb and IVb are hydroxylated to α(R)-[5 - (S)-vinyl(or lower alkyl) - 4(S)-quinuclidin-2(S)-yl]-4-quinolinemethanol of Formula Ib, its antipode or racemate and αS)-[5(S)-vinyl(or lower alkyl)-4(S)-quinuclidin - 2(R)-yl]-4-quinolinemethanol of Formula IIc, its antipode or racemate, respectively.

wherein $R_1$, $R_2$, $R'_4$ and $m$ as previously described.

The hereinafter described reaction steps of Reaction Scheme Ib' are effected utilizing the procedures and conditions set forth in Scheme Ia'. 4-Methyl-quinolines of Formula X are condensed with 1-acyl-3(S)-vinyl(or lower alkyl)-4(S)-piperidineacetaldehyde of Formula XXIIIb, its antipode or racemate which are new compounds and are prepared as hereinafter described, to yield the mixture of epimeric 4-{3-[1-acyl-3(S)-vinyl(or lower alkyl)-4(S)-piperidyl] - 2ξ - hydroxypropyl}quinolines of Formula XXIVb, their antipodes or racemates. The compounds of Formula XXIVb are deacylated to the corresponding mixture of epimeric 4-{3-[3(S)-vinyl(or lower alkyl)-4(S)-piperidyl]-2ξ-hydroxypropyl}quinolines of Formula VIb, their antipodes or racemates.

The hydroxylation of the compound of Formulas IIIa,b–IVa,b to the end products of Formulas Ia,b–IIa,b, i.e., Scheme Ib'

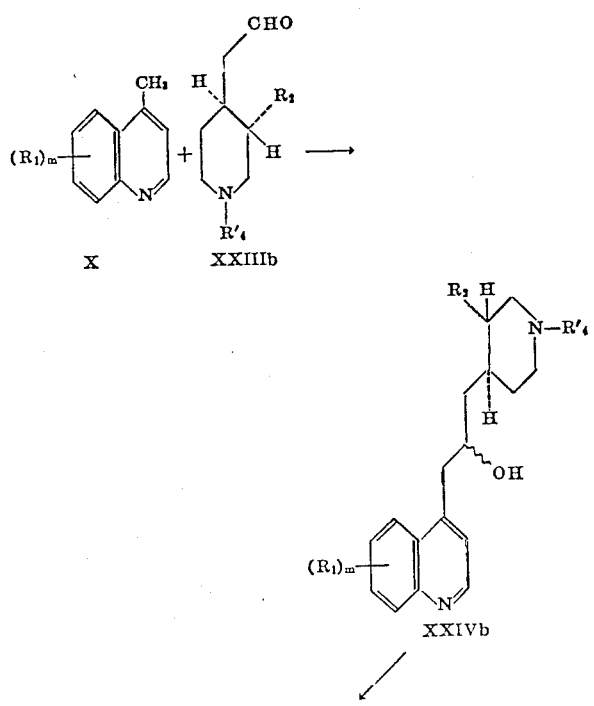

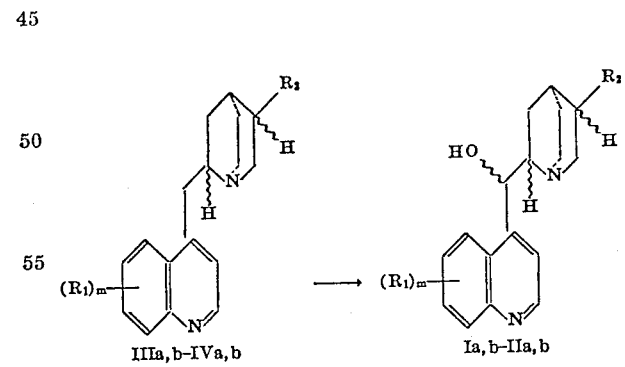

can also be effected utilizing molecular oxygen and a catalyst such as platinum, tris(triphenylphosphine) rhodium chloride or the like or by oxidation utilizing a compound such as selenium dioxide, ruthenium tetroxide, palladium acetate, mercuric acetate, thallium triacetate, manganese dioxide, cerium (IV) oxide, or the like.

Alternate procedure for the conversion of the compounds of Formula VIa,b to the corresponding compound of Formula IIIa,b–IVa,b are exemplified in Reaction Scheme V.

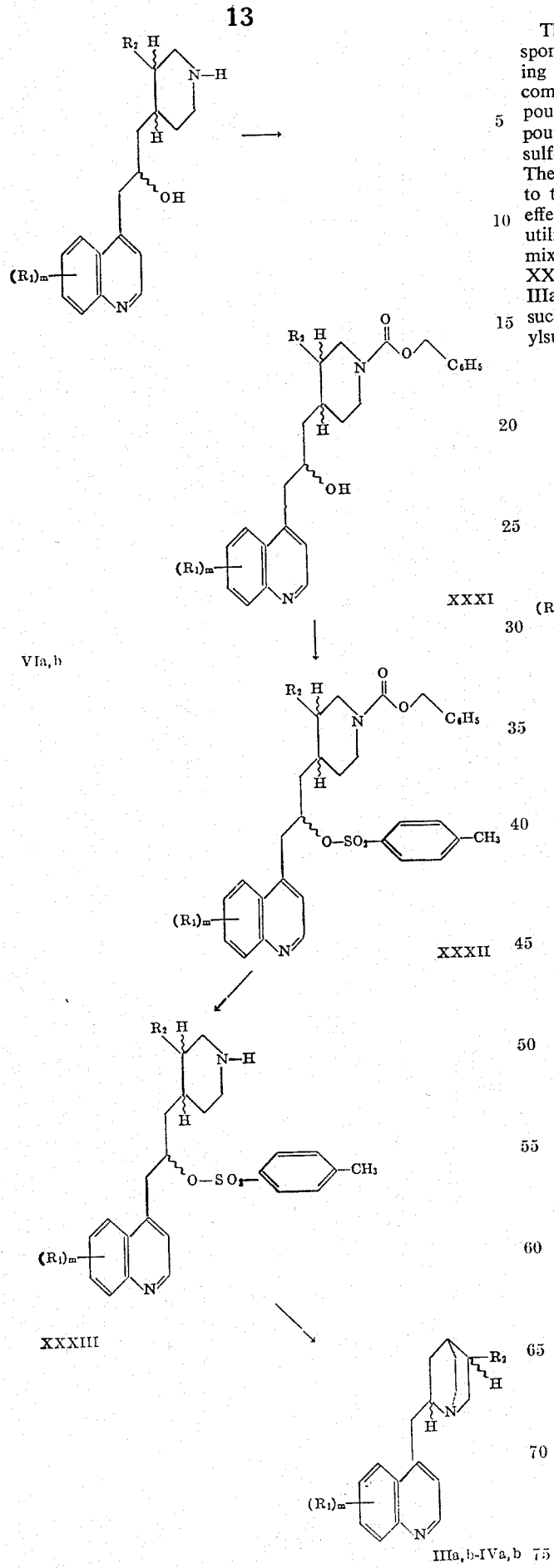

The conversions of Compounds VIa,b to the corresponding compounds of Formula XXXI is effected utilizing a chloroformate such as benzylchloroformate. The compounds of Formula XXXI are converted to the compounds of Formula XXXII by tosylation with a compound such as p-toluenesulfonylchloride or p-toluenesulfonic acid anhydride in a solvent such as pyridine. The conversion of the compounds of Formula XXXII to the corresponding compound of Formula XXXIII is effected by the removal of the N-carbobenzoxy group utilizing, for example, acetic acid/hydrogen bromide mixture. The cyclization of the compounds of Formula XXXIII to the corresponding compound of Formula IIIa,b–IVa,b is effected by heating in an organic solvent such as methanol, ethanol, dimethylformamide, dimethylsulfoxide and the like.

Scheme Ib'

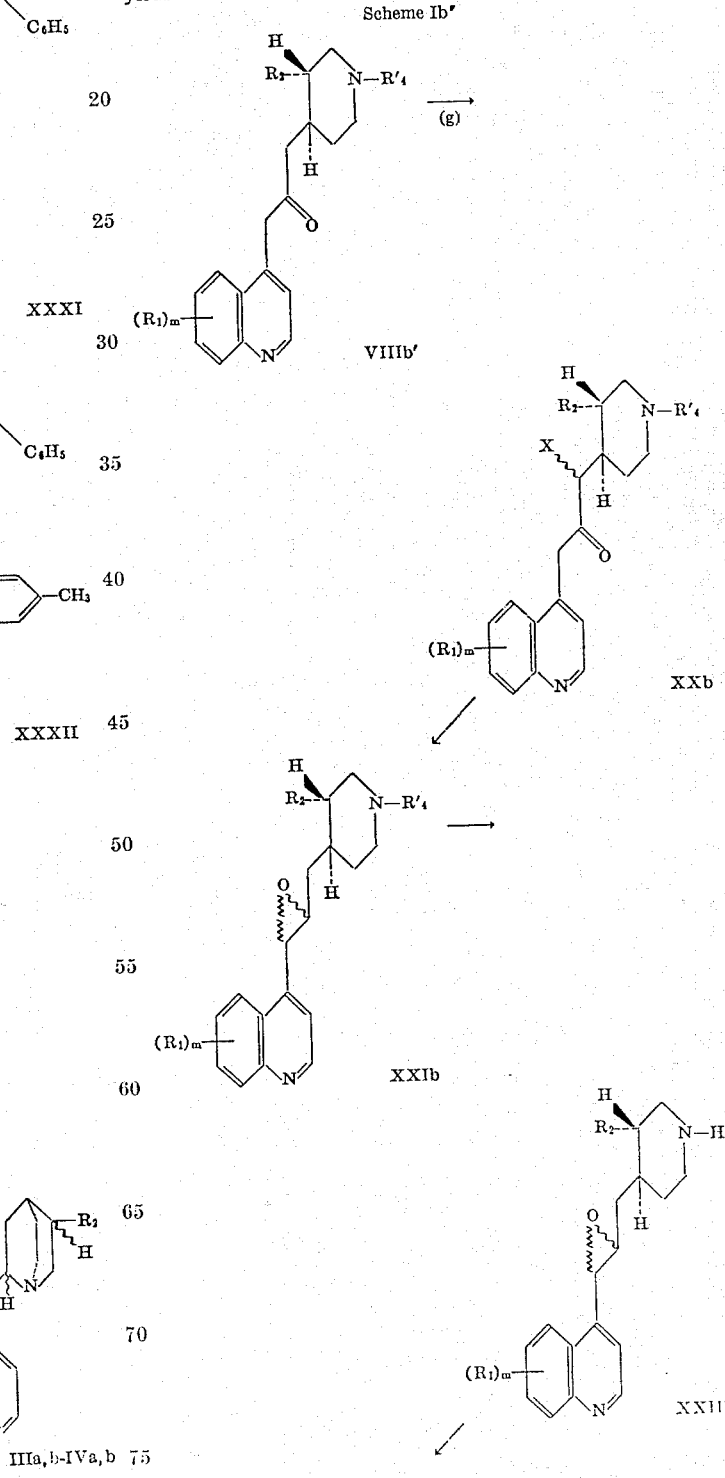

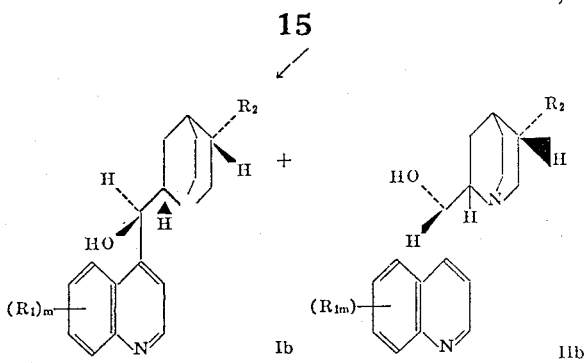

wherein R₁, R₂, R'₄, m and X are as previously described.

In Reaction Scheme Ib'', an alternative process for the conversion of compounds of Formula VIIIb' to the compounds of Formulas Ib and IIb is desired. The conversion of the 4 - {3-[1-acyl-3(S)-vinyl (or lower alkyl)-4(S)-piperidyl]-2-oxopropyl}quinoline of Formula VIIIb', its antipode or racemate to the corresponding mixture of epimeric 4-{3-[1-acyl-3(S)-vinyl (or lower alkyl)-4(S)-piperidyl] - 1ξ-halo-2-oxopropyl}quinolines of Formula XXb, their antipodes or racemates, respectively, is effected utilizing a halogenating agent such as N-bromo-succinimide, N-chloro-succinimide, N-bromoacetamide and the like. The halogenation can be conducted in an inert organic solvent, for example, a hydrocarbon such as benzene, toluene and the like, a halogenated hydrocarbon such as carbon tetrachloride; an ether such as diethylether, tetrahydrofuran, dioxane and the like. Conveniently, the reaction can be initiated by a free radical catalyst such as dibenzoylperoxide or by irradiation with infrared. The temperature is not critical, however, it is preferred to conduct the reaction at a temperature in the range of about room temperature and the reflux temperature of the reaction mixture.

The conversion of the epimeric compounds of Formula XXb, their antipodes or racemates to the corresponding mixture of diastereomeric 4 - {3-[1-acyl-3(S)-vinyl (or lower alkyl) - 4(S)-piperidyl]-1ξ,2ξ-oxapropyl}quinolines of the Formula XXIb, their antipodes or racemates can be effected utilizing a reducing agent, for example, alkali metal hydrides such as sodium borohydride, potassium borohydride, lithium tritertiarybutoxyaluminum hydride and the like. The reduction is conveniently effected in an inert organic solvent, for example, aliphatic alcohols such as methanol, ethanol and the like; ethers such as diethylether, tetrahydrofuran, dioxane and the like, at a temperature in the range of about −70° C. and about the reflux temperature of the reaction mixture.

The conversion of the compound of Formula XXIb to the corresponding mixture of the diastereomeric 4-{3-[3(S) - vinyl(or lower alkyl)-4(S)-piperidyl]-1ξ,2ξ-oxapropyl}quinolines of the Formula XXIIb, their antipodes or racemates is effected using a deacylating agent, for example, alkali hydroxides such as sodium hydroxide, potassium hydroxide, or a reducing deacylating agent, for example, dialkylaluminum hydride such as diisobutylaluminum hydride, or an alkali metal aluminum hydride such as lithium aluminum hydride, sodium aluminum hydride and the like. The deacylation is conveniently conducted in the presence of an inert organic solvent, for example, lower alkanols such as methanol, ethanol and the like, hydrocarbons such as toluene and the like, ethers such as diethylether, tetrahydrofuran and the like. The deacylation temperature is not critical. Conveniently, it may be in the range of about −70° C. to about the reflux temperature of the reaction mixture.

The conversion of the compounds of Formula XXIIb to the corresponding mixture comprising α(R)-[5(S)-vinyl-(or lower alkyl) - 4(S) - quinuclidin-2(S)-yl]-4-quinolinemethanol of Formula Ib, its antipode or racemate and α(S) - [5(S) - vinyl(or lower alkyl)-4(S)-quinuclidin-2(R)-yl]-4-quinolinemethanol of Formula IIb, its antipode or racemate is effected by reaction with a weak organic or inorganic protonic acid, for example, water, ammonium chloride, lower alkanols such as methanol, ethanol and the like, Lewis acids such as aluminum oxide, aluminum chloride, boron trifluoride and the like. Conveniently, conversion is conducted in the presence of an inert organic solvent, for example, carbo disulfide, hydrocarbons such as benzene, toluene and the like, chlorinated hydrocarbons such as dichloromethane, carbontetrachloride, chloroform and the like, and ethers such as diethyl-ether, tetrahydrofuran, dioxane and the like. The temperature of the reaction is not critical. Conveniently, it may be in the range of about 0° C. and about the reflux temperature of the reaction mixture.

The various other process aspects of the invention are exemplified by the following reaction schemes IIa, IIb, IIIa, IIIb and IV.

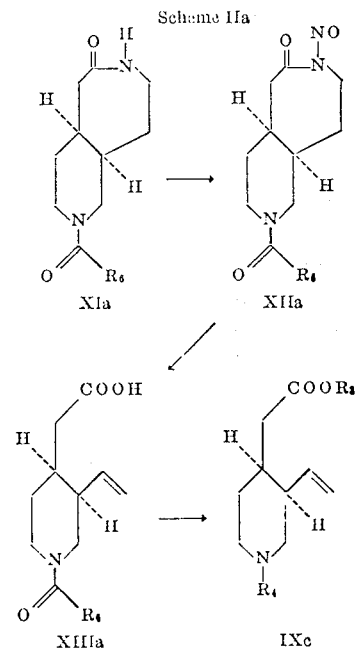

Scheme IIa wherein R₃ and R₄ are as previously described, and R₆ is lower alkyl, aryl or ar-lower alkyl.

In Reaction Scheme IIa, the conversion of 7-acyl-decahydro - 2H - pyrido[3(R),4(S) - d]azepin-2-one of Formula XIa, its antipode or racemate to 7-acyl-1-nitrosodecahydro - 2H - pyrido[3(R),4(S)-d]-azepin-2-one of Formula XIIa, its antipode or racemate, respectively, is carried out utilizing a nitrosetting agent, such as, for example, sodium nitrite or dinitrogen tetroxide. Conveniently, the reaction can be conducted in the presence of a solvent, for example, an organic acid such as acetic acid, or a chlorinated hydrocarbon such as carbon tetrachloride. The nitrosation is conveniently conducted at a temperature within the range of about 0° C. to about room temperature, preferably at 0° C.

The compound of Formula XIIa is converted to 1-acyl-3(R)-vinyl-4(S)-piperidineacetic acid of Formula XIIIa, its antipode or racemate, respectively, by pyrolysis. Conveniently, the pyrolysis is conducted at a temperature within the range of about room temperature to about 200° C., preferably at a temperature within the range of about 100° C. to about 130° C. Conveniently, a high boiling solvent such as xylene, decaline and the like, can be utilized in the reaction.

The compound of Formula XIIIa is converted to 1-acyl(or 1-H)-3(R)-vinyl-4(S)-piperidineacetic acid ester of Formula IXc, its antipode or racemate, respectively, utilizing an esterifying agent, for example, a lower alkanol, such as methanol, ethanol, propanol and the like in the presence of, for example, an inorganic acid such as hydrochloric acid, sulfuric acid and the like. When $R_4$ is hydrogen, however, the esterification is preceded by hydrolysis in the presence of, for example, an aqueous inorganic acid, such as hydrochloric acid, sulfuric acid and the like.

Compounds of Formula XIa, wherein $R_2$ is alkyl, for instance, ethyl, can be prepared as described in Scheme IV.

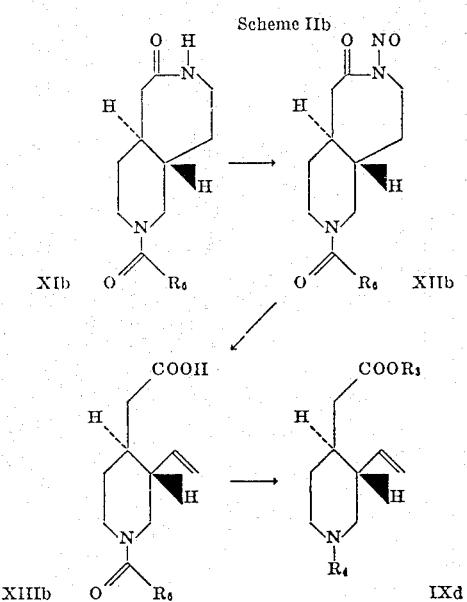

Scheme IIb

XIb, XIIb, XIIIb, IXd wherein $R_3$, $R_4$ and $R_6$ are as previously described.

In a like manner, in Reaction Scheme IIb, the conversion of 7-acyl-decahydro - 2H - pyrido[3(S),4(S) - d] azepin-2-one of Formula XIb, its antipode or racemate to 7-acyl-1-nitroso-decahydro - 2H - pyrido[3(S),4(S) - d] azepin-2-one of Formula XIIb, its antipode or racemate, respectively, is carried out. The compound of Formula XIIb is converted to 1-acyl-3(S)-vinyl-4(S) - piperidineacetic acid of Formula XIIIb, its antipode or racemate, respectively, by pyrolysis. The compound of Formula XIIIb is converted to 1-acyl(or 1-H)-3(S)-vinyl - 4(S)-piperidineacetic acid ester of Formula IXd, its antipode or racemate, respectively.

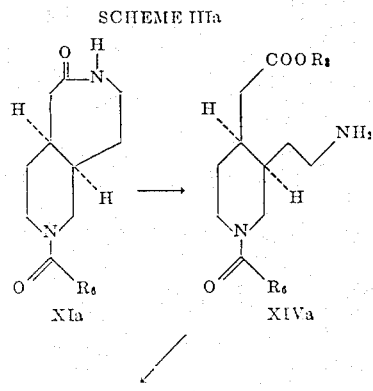

SCHEME IIIa

XIa, XIVa

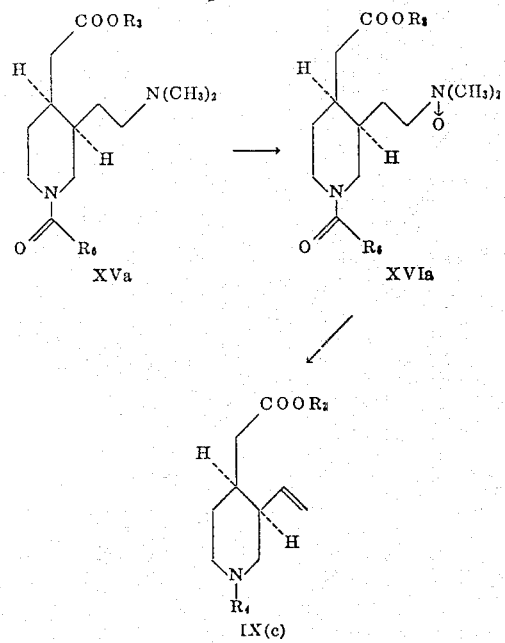

XVa, XVIa, IX(c)

wherein $R_3$, $R_4$ and $R_6$ are as previously described.

In Reaction Scheme IIIa, 7 - acyl - decahydro - 2H-pyrido[3(R),4(S) - d]azepin - 2 - one of Formula XIa, its antipode or racemate is converted to 1 - acyl - 3(R)-(2 - aminoethyl) - 4(S) - piperidineacetic acid ester of Formula XIVa, its antipode or racemate, respectively, utilizing an alcoholizing agent, for example, a lower alkanol such as methanol, ethanol, propanol and the like, in the presence of, for example, anhydrous inorganic acid such as hydrochloric acid, sulfuric acid and the like. Conveniently, the alcoholysis is conducted at a temperature within the range of about room temperature to about the boiling point of the alkanol.

The compound of Formula XIVa is converted to 1-acyl-3(R)-(2-dimethylaminoethyl)-4-(S)-piperidineacetic acid ester of Formula XVa, its antipode or racemate, respectively, utilizing a methylating agent such as, for example, formic acid/formaldehyde mixture or formaldehyde/Raney nickel. The N-methylation is conveniently conducted at a temperature within the range of about room temperature to about the boiling point of the methylating agent.

The compound of Formula XVa is converted to 1-acyl-3(R)-(2-dimethylaminoethyl)-4(S) - piperidinacetic acid ester N-oxide of Formula XVIa, its antipode or racemate, respectively, utilizing an oxidizing agent, for example, hydrogen peroxide or a perorganic acid such as, peracetic acid. The oxidation is conveniently conducted in the presence of a solvent, for example, lower alkanol, such as methanol, ethanol, propanol and the like, or a hydrocarbon such as benzene and the like. The oxidation is conveniently conducted at a temperature within the range of about 0° to about room temperature, preferably at 0° C.

The compound of Formula XVIa is converted to 1-acyl (or 1-H)-3(R)-vinyl - 4(S) - piperidineacetic acid ester of Formula IXc, its antipode or racemate, respectively, by pyrolysis. Such pyrolysis is conveniently conducted at a temperature in the range of about 80° to about 200° C., preferably at a temperature within the range of about 90° to about 125° C. When $R_4$ is hydrogen, however, the pyrolysis is followed by hydrolysis and reesterification.

SCHEME IIIb

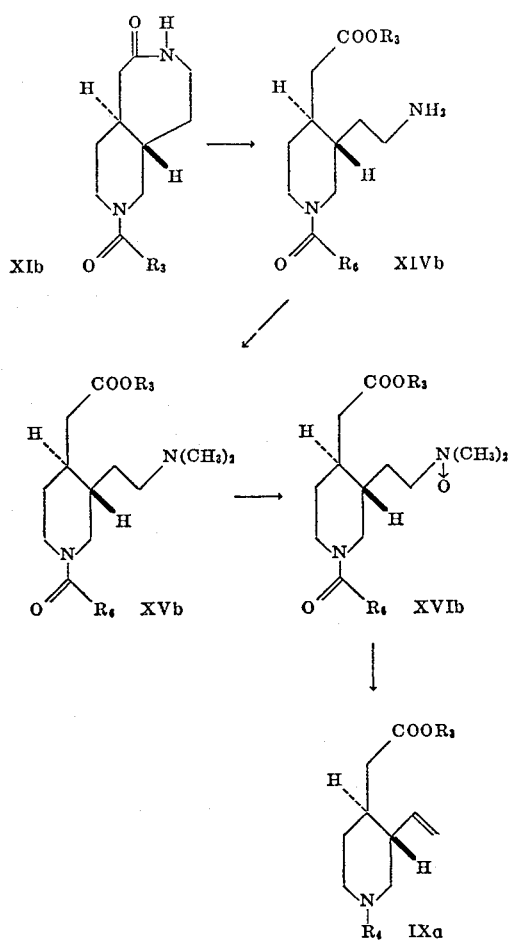

wherein $R_3$, $R_4$ and $R_6$ are as previously described.

In a like manner, in Reaction Scheme IIIb, 7-acyl-decahydro-2H-pyrido[3(S),4(S)-d]azepin-2-one of Formula XIb, its antipode or racemate is converted to 1-acyl-3(S)-(2-aminoethyl)-4(S)-piperidineacetic acid ester of Formula XIVb, its antipode or racemate, respectively. The compound of Formula XIVb is converted to 1-acyl-3(S)-(2-dimethylaminoethyl)-4(S)-piperidineacetic acid ester of Formula XVb, its antipode or racemate, respectively. The compound of Formula XVb is converted to 1-acyl-3(S)-(2-dimethylaminoethyl)-4(S)-piperidineacetic acid ester N-oxide of Formula XVIb, its antipode or racemate, respectively. The compound of Formula XVIb is converted to 1-acyl(or 1-H)-3(S)-vinyl-4(S)-piperidineacetic acid ester of Formula IXd, its antipode or racemate.

SCHEME IV

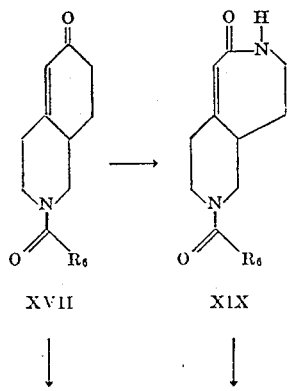

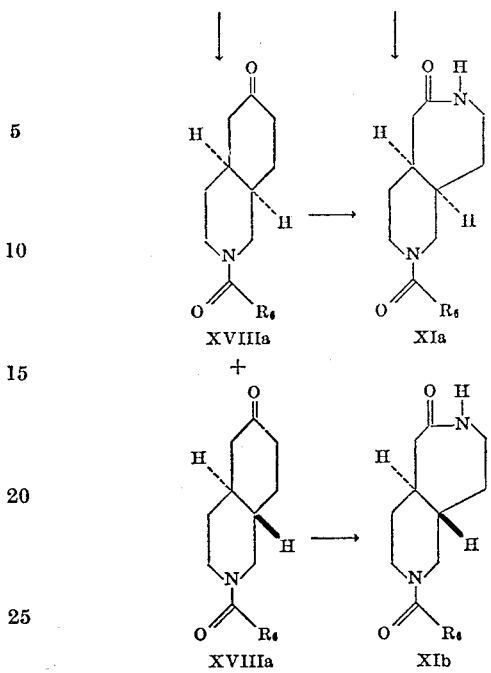

wherein $R_6$ is as previously described.

In the Reaction Scheme IV, racemic 2-acetyl-1,3,4,7,8,8a-hexahydro-6(2H)-isoquinolone of Formula XVII is converted to the racemic cis and trans 2-acyl-octahydro-6(2H)-isoquinolones of Formula XVIIIa and XVIIIb, respectively, utilizing a hydrogenating agent, for example, hydrogen in the presence of palladium or rhodium catalyst. Conveniently, the hydrogenation can be conducted in the presence of a solvent, for example, a lower alkanol such as methanol, ethanol, propanol and the like, with or without an inorganic acid such as hydrochalic acid, for example, hydrochloric acid and the like. The hydrogenation can be conveniently conducted at a temperature within the range of about room temperature and about 50° C.

The racemates of the compounds of Formula XVIIIa or XVIIIb are resolved to the corresponding optical antipodes by conventional methods which are further illustrated by Examples 3, 4, 5.

The conversion of 2-acyl-4a(S),8a(R)-octahydro-6(2H)-isoquinolone of Formula XVIIa, its antipode or racemate to 7-acyldecahydro-2H-pyrido[3(R),4(S)-d]azepin-2-one of Formula XIa, its antipode or racemate, respectively, is carried out utilizing the known Schmidt rearrangement, i.e., the reaction of the compound of Formula XVIIIa with sodium azide in the presence of an inorganic acid such as sulfuric acid or polyphosphoric acid, with or without solvent, at a temperature within the range of from about 0° to about 150° C.

In a like maner, 2-acetyl-4a(S),8a(S)-octahydro-6(2H)-isoquinolone of Formula XVIIIb, its antipode or racemate is converted to 7-acyl-decahydro-2H-pyrido[3(S),4(S)-d]azepin-2-one of Formula XIb, its antipode or racemate, respectively.

The racemic compound of Formula XVII is converted to the racemic 2-acyl-1,2,3,4,7,8,9,9a - octahydro - 6H-pyrido[3,4-d]azepin-6-one of Formula XIX utilizing the Schmidt rearrangement as hereinbefore described. The compound of Formula XIX is converted to the racemic compound of Formula XIa utilizing a hydrogenating agent such as hydrogen in the presence of a catalyst, such as rhodium or palladium, in a solvent, for example, an alkanol, such as ethanol, methanol and the like, in the presence of an inorganic acid, such as hydrochloric acid.

In another aspect, the invention relates to the compounds of Formulas Ib, IIb, IIIb, IVb, Va, Vb, VIa, VIb, VIIa, VIIb, VIIIa, VIIIb, IXb, XIa, XIb, XIIa, XIIb, XIIIb, XIVa, XIVb, XVa, XVb, XVIa, XVIb and XIX.

The compounds of Formulas Ib and IIb are useful as antimalarial and antiarrhythmic agents; all the other compounds listed in the above paragraph are useful intermediates.

In still another aspect, the invention relates to compounds of the formulas

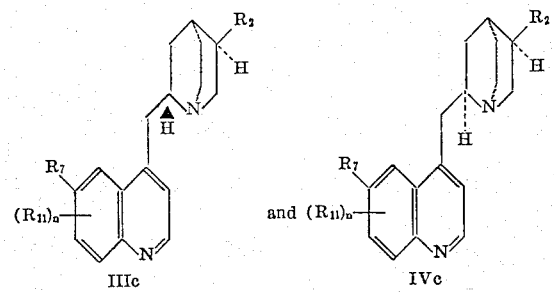

IIIc and IVc wherein $n$ is 0 to 2; $R_2$ is vinyl or lower alkyl; $R_{11}$ is hydrogen, hydroxy, lower alkyl, lower alkoxy, trifluoromethyl, halogen, or when $n$ is 2, $R_{11}$, taken together with an adjacent $R_{11}$, is also methylenedioxy; when $R_{11}$ is hydrogen, $R_7$ is $C_2-C_7$ alkoxy, lower alkyl, trifluoromethyl or halogen; when $R_{11}$ is other than hydrogen and $n$ is 1, $R_7$ is lower alkoxy, lower alkyl, hydroxy, hydrogen, trifluoromethyl, halogen, or taken together with an adjacent $R_{11}$, is methylenedioxy; and when $R_{11}$ is other than hydrogen and $n$ is 2, $R_7$ is hydrogen, and their antipodes and racemates.

Also included in the purview of the invention are compounds of the formulas

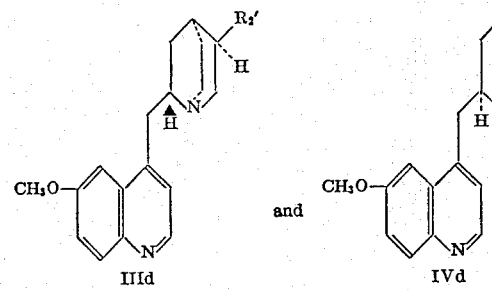

IIId and IVd wherein $R_2'$ is methyl or $C_3-C_7$ lower alkyl, their antipodes and racemates.

Compounds of Formulas IIIc, IIId, IVc and IVd are useful intermediates.

In still another aspect, the invention relates to compounds of the formulas

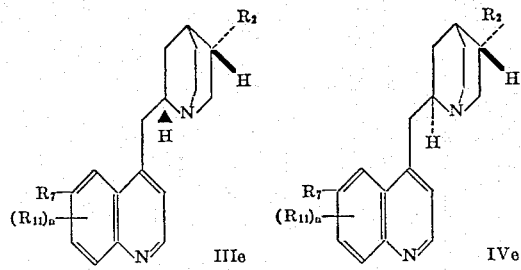

IIIe and IVe wherein $n$ is 0 to 2; $R_2$ is vinyl or lower alkyl; $R_{11}$ is hydrogen, hydroxy, lower alkyl, lower alkoxy, trifluoromethyl, halogen, or when $n$ is 2, $R_{11}$, taken together with an adjacent $R_{11}$, is also methylenedioxy; when $R_{11}$ is hydrogen, $R_7$ is $C_2-C_7$ alkoxy, lower alkyl, trifluoromethyl or halogen; when $R_{11}$ is other than hydrogen and $n$ is 1, $R_7$ is lower alkoxy, hydrogen, trifluoromethyl, halogen, or taken together with an adjacent $R_{11}$ is methylenedioxy; and when $R_{11}$ is other than hydrogen and $n$ is 2, $R_7$ is hydrogen and their antipodes and racemates.

As is evident from the above $R_7$ or $R_{11}$ or the like are individually selected from the various groupings herein-before described. Moreover, when $m$ or $n$ is 2, $R_7$ or $R_{11}$ or the like can additionally form with an adjacent $R_7$ or $R_{11}$ or the like the methylenedioxy radical. Thus, either when $m$ or $n$ is 1 or 2, $R_7$ or $R_{11}$ or the like can individually also represent hydrogen, hydroxy, halogen, lower alkyl, lower alkoxy or trifluoromethyl. Additionally, when $m$ or $n$ is 2, two adjacent groupings of $R_7$ or $R_{11}$ can together represent methylenedioxy.

In yet another aspect, the invention relates to compounds of the formulas

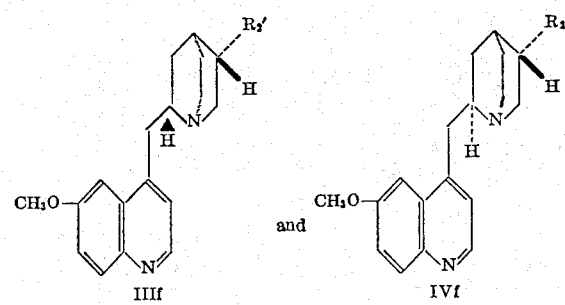

IIIf and IVf wherein $R_2'$ is methyl or $C_3-C_7$ lower alkyl, their antipodes and racemates.

Compounds of Formulas IIIe, IIIf, IVe and IVf are useful intermediates.

In a further aspect, the invention relates to compounds of the formulas

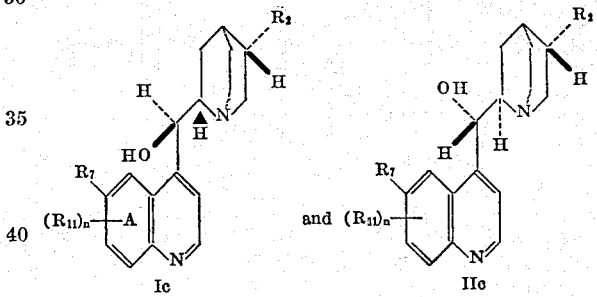

Ic and IIc wherein $n$ is 0 to 2; $R_2$ is vinyl or lower alkyl; $R_{11}$ is hydrogen, hydroxy, lower alkyl, lower alkoxy, trifluoromethyl or halogen, and when $n$ is 2, $R_{11}$, taken together with an adjacent $R_{11}$, is also methylenedioxy; when $R_{11}$ is hydrogen, $R_7$ is $C_2-C_7$ alkoxy, lower alkyl, trifluoromethyl or halogen; when $R_{11}$ is other than hydrogen and $n$ is 1, $R_7$ is lower alkoxy, lower alkyl, hydrogen, trifluoromethyl or halogen, or taken together with an adjacent $R_{11}$, is methylenedioxy; and when $R_{11}$ is other than hydrogen and $n$ is 2, $R_7$ is hydrogen, and their antipodes and racemates, and pharmaceutictlly acceptable acid addition salts.

Exemplary of the compounds of Formulas Ic and IIc are:

6,8-dimethoxy-α(R) - [5(S) - ethyl - 4(S)-quinuclidin-2(S)-yl]-4-quinolinemethanol [hereinafter referred to as 6',8'-dimethoxy-3-epi-dihydrocinchonidine] its antipode and racemic analog;

7 - chloro - α(R) - [5(S) - ethyl - 4(S) - quinuclidin-2(S)-yl]-4-quinolinemethanol [hereinafter referred to as 7'-chloro-3-epi-dihydrocinchonidine] its antipode and racemic analog;

6,7 - methylenedioxy - α(R) - [5(S) - ethyl - 4(S)-quinuclidin-2(S)-yl] - 4 - quinolinemethanol [hereinafter referred to as 6',7'-methylenedioxy-3-epi-dihydrocinchonidine] its antipode and racemic analog;

7 - trifluoromethyl - α(R) - [5(S) - ethyl - 4(S)-quinuclidin-2(S)-yl]-4-quinolinemethanol [hereinafter referred to as 7'-trifluoromethyl - 3 - epi-dihydrocinchonidine] its antipode and racemic analog;

6,8 - dimethoxy - α(S) - [5(S) - ethyl - 4(S) - quinuclidin - 2(R) - yl] - 4 - quinolinemethanol [ hereinafter referred to as 6',8'-dimethoxy-3-epi-dihydrocinchonine] its antipode and racemic analog;

7 - chloro - α(S) - [5(S) - ethyl - 4(S) - quinuclidin-2(R)-yl]-4-quinolinemethanol [hereinafter referred to as 7'-chloro-3-epi-dihydrocinchonine] its antipode and racemic analog;

6,7 - methylenedioxy - α(S) - [5(S) - ethyl - 4(S)-quinuclidin-2(R)-yl] - 4 - quinolinemethanol [hereinafter referred to as 6',7'-methylenedioxy-3-epi-dihydrocinchonine] its antipode and racemic analog;

7 - trifluoromethyl - α(S) - [5(S) - ethyl - 4(S)-quinuclidin-2(R)-yl]-4-quinolinemethanol [hereinafter referred to as 7'-trifluoromethyl-3-epi-dihydrocinchonine] its antipode and racemic analog.

Also included in the purview of the invention are compounds of the formulas

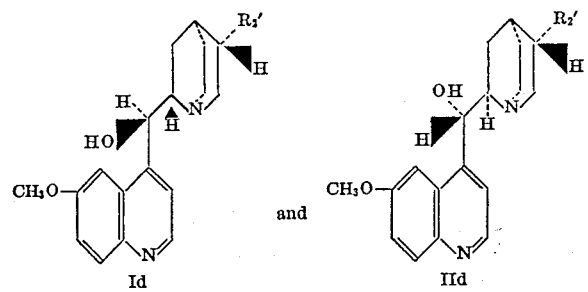

wherein $R_2'$ is vinyl, methyl or $C_3$–$C_7$ alkyl, their antipodes and racemates and pharmaceutically acceptable acid addition salts.

Also included in the purview of the invention are compounds of the formula:

The antipode of 6 - methoxy - α(R)-[5(S)-ethyl-4(S)-quinuclidin-2(S)-yl-4-quinolinemethanol [hereinafter referred to as 6'-methoxy-3-epi-dihydrocinchonidine or 3-epi-dihydroquinine] and its racemic analog (Compound A) and The antipode of 6 - methoxy - α(S)-[5(S)-ethyl-4(S)-quinuclidin-2(R)-yl]-4-quinolinemethanol [hereinafter referred to as 6'-methoxy-3-epi-dihydrocinchonine or 3-epi-dihydroquinidine] and its racemic analog (Compound B).

The compounds of Formulas Ic, Id, IIc and IId, as well as Compounds A and B, are useful also as antimalarial and antiarrhythmic agents.

The compounds of the Formula IXa have demonstrated cardiovascular activity, such as, hypotensive activity. The pharmacologically useful cardiovascular activity is demonstrated in warm-blooded animals utilizing standard procedures. For example, the test compound is administered to anesthetized (30 mg./kg. sodium pentobarbital), artificially respired (Palmer Pump) dogs. Femoral arterial blood pressure and respiratory resistance (measured in terms of pressure) are recorded on a direct writing oscillographic recorder. A series of "control" responses of the blood pressure and respiration are obtained and duplicated. The "control' procedures used are: intravenously administered norepinephrine (1 γ/kg.), histamine (1 γ/kg.), serotonin (25 γ/kg.) and hypertensin (0.5 γ/kg.), as well as the bilatrial occlusion of the carotid arteries and the electrical stimulation of the central portion of a severed vagus nerve (5 v., 50 c.p.s., 10 sec.). Each of the control procedures is administered at 5-minute intervals. Five minutes after the series of control responses, the drug to be tested is intravenously administered and its effects recorded. The series of control procedures is repeated after dosing to determine the effect of the compound on these standard responses. If the control responses are unaltered by the test drug, a second compound is administered and the procedure repeated. If the test compound alters the blood pressure or the control responses, the control procedures are repeated at convenient intervals until the animal has returned to its predose status or a new physiological status is established.

When meroquinene-t-butylester d-monotartrate of the formula

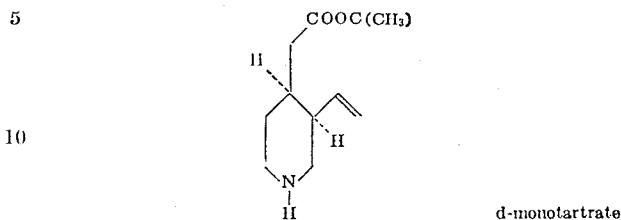

is utilized as the test substance at a dose of 4 mg./kg. intravenously, the following results are obtained:

blood pressure: —25 for 35 minutes
serotonin: N.E.
Central Vagus Stimulation: slight inhibition
Carotid Occlusion: blocking
Hypertension: N.E.
Norepinephrine: slight inhibition
Histamine: slight inhibition The compounds of Formula IXa also exhibit antiestrogenic activity. This useful estrogenic activity is demonstrated in warm-blooded animals. For example, the test compound is administered once daily for three consecutive days to groups of ten (10) immature female rats (40–50 grams). On the first treatment day, all rats are injected subcutaneously with 0.25 mcg. estradiol in sesame oil. On the fourth day, uteri are removed at autopsy and weighed on a torsion balance.

When meroquinene-t-butylester d-monotartrate is utilized as the test substance at a dosage of 1 mg./kg. p.o., an 11 percent antiestrogen inhibition is observed with a —12 percent uterine change.

The compounds of Formulas Ia, IIa, Ib and IIb, including compounds of the Formulas Ic, Id, IIc and IId, as well as compounds A and B, and their pharmaceutically acceptable acid addition salts possess antimalarial and antiarrhythmic properties and are therefore useful as antimalarial and antiarrhythmic agents. Their pharmacologically useful antiarrhythmic activity is demonstrated in warm-blooded animals utilizing standard procedures, for example, the test compound is administered to prepared mongrel dogs. The chest cavity of the experimental animal previously anesthetized using a combination of sodium barbitol, 300 mg./kg. and pentobarbitol, 15 mg./kg., i.e., is opened up through the third right interspace under artificial respiration and the pericardium is cut and sutured to the wall of the thorax so as to maintain the heart in a pericardial cradle throughout the course of the test procedures. Arterial pressure is monitored by inserting a polyethylene cannula into the aorta via the left carotid artery and is measured with an appropriate Statham pressure transducer. During the course of the experiment, electrical activity of the heart is viewed both on an oscilloscope and recorded on a Sanborn polyviso using standard ECG lead II. The heart is also observed visually. The antiarrhythmic assay of the test drug is undertaken using a modification of the method of Scherf and Chick, 1951. A dripping of 1 percent solution of acetylcholine is applied to the sinus node and the atrium is irritated by pinch withing a pair of forceps. This procedure produces a continuous artiral arrhythmia which mostly consists of atrial fibrillation. Since hypokalemia produces a susceptibility to atrial fibrillation (Leveque, 1964), 2 units/kg. of insulin is administered 30 minutes before the start of the acetylcholine drip. Once a trial fibrillation is established, there is a ten-minute waiting period before the test drug is administered. The test drugs are administered at the rate of 1 mg./kg./minute until normal sinus rhythm appears or until 30 mg./kg. of drug is administered.

When 6'-ethoxy-α(R) - [5(R)-ethyl-4(S)-quinuclidin-2(S)-yl-4'-quinoline methanol is utilized as the test substance at a dosage of about 4.0 mg./kg., an antifibrillatory effect is observed for more than 60 minutes.

Their pharmacological useful antimalarial activity is demonstrated in warm-blooded animals using standard procedures, for example, the test substance is administered to albino mice in variable amounts. Albino mice are inoculated with about 5–10 million red cells infected with P. Bergei. Treatment is started on the first day after inoculation, and the drug is administered "per os" during 4 consecutive days. On the seventh day of infection, smears are made, stained with giemsa and microscopically examine for P. Bergei.

When racemic 7'-methoxy-dihydrocinchonidine dihydrochloride or racemic 7-methoxy-dihydrocinchonine dihydrochloride is utilized as the test substance at dosages in the range of 125 mg./kg. to about 250 mg./kg., the microscopical examination of the blood smears is free of P. Berghei (negative). When 6'-methoxy-α(R)-[5(R)-ethyl-4(S)-quinuclidin-2(S) - yl] - 4 - quinolinemethanol [dihydroquinine] or 6-methoxy-α(R)-[5(R)-ethyl-4(S)-quinuclidin-2(S)-yl]-4-quinolinemethanol is utilized as the test substance at a dose of about 200 mg./kg., the microscopical examination of the blood smears is free of P. Berghei (negative). The compounds of Formulas Ia, IIa, Ib and IIb, including the compounds of Formulas Ic, Id, IIc and IId, as well as compounds A and B, and their pharmaceutically acceptable acid addition salts have effects qualitatively similar, for example, to those of quinine and quinidine, known for their therapeutic uses and properties. Thus, the compounds of the invention demonstrate a pattern of activity associated with antimalarials and antiarrhythmics of known efficacy and safety.

Furthermore, the compounds of the Formulas Ia, IIa, Ib and IIb, including the compounds of Formulas Ic, Id, IIc and IId, as well as compounds A and B, can be utilized as flavoring agents in beverages in the same manner as quinine is now used for this purpose.

The compounds of Formulas Ia, IIa, Ib and IIb, including the compounds of Formulas Ic, Id, IIc and IId, as well as compounds A and B, form acid addition salts and such salts are also within the scope of this invention. Thus, the compounds of Formulas Ia, IIa, Ib and IIb, including the compounds of Formulas Ic, Id, IIc and IId, as well as compounds A and B, form pharmaceutically acceptable addition salts with, for example, both pharmaceutically acceptable addition salts with, for example, both pharmaceutically acceptable organic and inorganic acids, such as acetic acid, succinic acid, formic acid, methanesulfonic acid, p-toluenesulfonic acid, hydrochloric acid, nitric acid, phosphoric acid, sulfuric acid, and the like.

The products of the invention can be incorporated into standard pharmaceutical dosage forms, for example, they are useful for oral or parenteral application with the usual pharmaceutical adjuvant materials, e.g., organic or inorganic inert carrier materials such as water, gelatin, lactose, starch, magnesium stearate, talc, vegetable oils, gums, polyalkyleneglycols, and the like. The pharmaceutical preparations can be employed in a solid form, e.g., as tablets, troches, suppositories, capsules, or in liquid form, e.g., as solutions, suspensions or emulsions. The pharmaceutical adjuvant material can include preservatives, stabilizers, wetting or emulsifying agents, salts to change the osmotic pressure or to act as buffers. They can also contain other therapeutically active materials.

The quantity of active medicament which is present in any of the above-described dosage forms is variable. The frequency with which any such dosage form will be administered will vary, depending upon the quantity of active medicament present therein, and the needs and requirements of the pharmacological situation.

Due to the possible different spatial arrangements of their atoms, it is to be understood that the compounds of this invention may be obtained in more than one possible stereoisomeric form. The novel compounds, as described and claimed, are intended to embrace all such isomeric forms. Accordingly, the examples included herein are to be understood as illustrative of particular mixtures of isomers or single isomers and not as limitations upon the scope of the invention. All temperatures are in degrees centigrade, unless otherwise mentioned.

EXAMPLE 1

Preparation of racemic cis 2-benzoyl-octahydro-6(2H)-isoquinolone from racemic 2-benzoyl-1,3,4,7,8,8a-hexahydro-6(2H)-isoquinolone To a solution containing 151 g. of racemic 2-benzoyl-1,3,4,7,8,8a-hexahydro-6(2H)-isoquinolone in 3000 ml. of absolute ethanol were added 300 ml. of 3 N aqueous hydrochloric acid and 30 g. of 5% rhodium on alumina catalyst. The mixture was hydrogenated at room temperature and atmospheric pressure until the uptake of hydrogen ceased. The catalyst was removed by filtration and washed thoroughly with ethanol. The filtrate was partially evaporated in vacuo, diluted with 3500 ml. of dichloromethane and washed with 3 N aqueous hydrochloric acid, saturated aqueous sodium bicarbonate and sodium chloride solutions. The organic phase was dried over anhydrous sodium sulfate and evaporated to dryness to yield a crystalline product. Gas chromatographic analysis indicated that it contained 61.9% of racemic cis 2-benzoyl-octahydro-6(2H)-isoquinolone and 13% of racemic trans 2-benzoyl-octahydro-6(2H)-isoquinolone. The product was recrystallized twice from benzene to give racemic cis 2-benzoyl-octahydro-6(2H)-isoquinolone having a melting point of 147–148.5°.

EXAMPLE 2

Preparation of racemic trans 2-benzoyl-octahydro-6(2H)-isoquinolone from racemic 2-benzoyl-1,3,4,7,8,8a-hexahydro-6(2H)-isoquinolone To a solution containing 25.5 g. of racemic 2-benzoyl-1,3,4,7,8,8a-hexahydro-6(2H)-isoquinolone in 1000 ml. of 95% ethanol were added 2.5 g. of 10% palladium on carbon catalyst and the mixture was hydrogenated at room temperature and 3 atmospheres pressure until the uptake of hydrogen ceased. The catalyst was removed by filtration and washed with 95% ethanol and dichloromethane. The filtrate was evaporated to dryness to yield an oil which crystallized on trituration with ether. The product was recrystallized twice from absolute ethanol to yield racemic trans 2-benzoyl-octahydro-6(2H)-isoquinolone, which after two additional recrystallizations from absolute ethanol, had a melting point of 157.5–159°.

EXAMPLE 3

Preparation of 2'-benzoyl-4(R),5(R)-dimethyl-1',2',3',4',4'a(S),7',8',8'a(S)-octahydrospiro[1,3-dioxolane - 2,6'-(5'H) - isoquinoline] and 2' - benzoyl - 4(R),5(R)-dimethyl - 1',2',3',4',4'a(R),7',8',8'a(R) - octahydrospiro[1,3-dioxolane-2,6'(5'H)-isoquinoline]

To a solution containing 23.4 g. of rac. trans-2-benzoyl-octahydro-6(1H)-isoquinolone in 2 l. of anhydrous benzene was added 2.24 g. of p-toluenesulfonic acid and 9.83 g. of (−)-butane-2(R),3(R)-diol. The resulting solution was refluxed for 3 hours and the water which formed was collected in a water separator. After the addition of 18 ml. of pyridine, the mixture was diluted to 4 l. with benzene, washed four times with 100 ml. of water, dried over anhydrous sodium sulfate and evaporated to dryness in vacuo. The last traces of pyridine were removed by codistillation with toluene in vacuo. The crystalline residue, 29.62 g., was fractionally crystallized by repeating several times the following system:

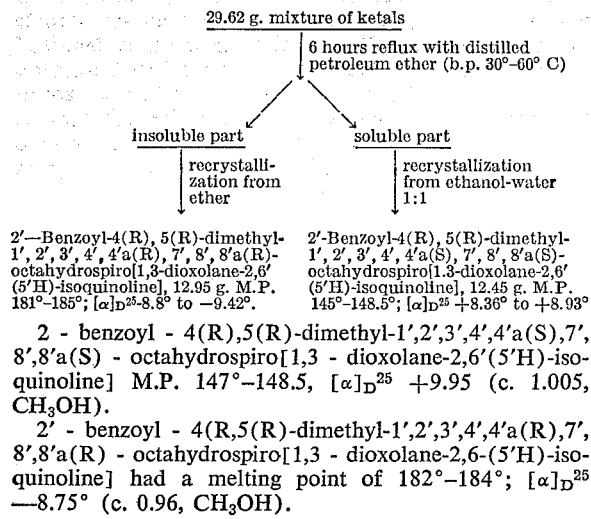

2′—Benzoyl-4(R), 5(R)-dimethyl-1′, 2′, 3′, 4′, 4′a(R), 7′, 8′, 8′a(R)-octahydrospiro[1,3-dioxolane-2,6′(5′H)-isoquinoline], 12.95 g. M.P. 181°–185°; [α]$_D^{25}$-8.8° to −9.42°.

2′-Benzoyl-4(R), 5(R)-dimethyl-1′, 2′, 3′, 4′, 4′a(S), 7′, 8′, 8′a(S)-octahydrospiro[1,3-dioxolane-2,6′(5′H)-isoquinoline], 12.45 g. M.P. 145°–148.5°; [α]$_D^{25}$ +8.36° to +8.93°

2 - benzoyl - 4(R),5(R)-dimethyl-1′,2′,3′,4′,4′a(S),7′,8′,8′a(S) - octahydrospiro[1,3 - dioxolane-2,6′(5′H)-isoquinoline] M.P. 147°–148.5, [α]$_D^{25}$ +9.95 (c. 1.005, CH$_3$OH).

2′ - benzoyl - 4(R,5(R)-dimethyl-1′,2′,3′,4′,4′a(R),7′,8′,8′a(R) - octahydrospiro[1,3 - dioxolane-2,6-(5′H)-isoquinoline] had a melting point of 182°–184°; [α]$_D^{25}$ −8.75° (c. 0.96, CH$_3$OH).

EXAMPLE 4

Preparation of 4a(S),8a(S)-2-benzoyloctahydro-6(2H)-isoquinolone

A solution containing 2.5 g. of 2′-benzoyl-4(R),5(R)-dimethyl - 1′,2′,3′,4′,4′a(S),7′,8′,8′a(S) - octahydrospiro-[1,3-dioxolane-2,6′(5′H)-isoquinoline] in 100 ml. of 70% acetic acid was heated at 100°–105° for 1.5 hours. The reaction mixture was evaporated in vacuo, diluted with 1 l. of benzene, washed with 100 ml. of 2 N aqueous sodium carbonate and three times with 100 ml. of water, dried over anhydrous sodium sulfate and evaporated in vacuo to yield 2 g. of 4a(S),8a(S)-2-benzoyloctahydro-6(2H)-isoquinolone, having a melting point of 151°–153° (from absolute ethanol); [α]$_D^{25}$ 61.8° (c. 1.01, CHCl$_3$).

EXAMPLE 5

Preparation of 4a(R),8a(R)-2-benzoyloctahydro-6(2H)-isoquinolone

A solution containing 0.329 g. of 2′-benzoyl-4(R), 5(R)-dimethyl - 1′,2′,3′,4′,4′a(R),7′,8′,8′a(R)octahydrospiro-[1,3-dioxolane-2,6′(5′H)-isoquinoline] in 50 ml. of 70% acetic acid was heated at 100°–105° for 4 hours and 40 minutes. The reaction mixture was evaporated in vacuo diluted with 500 ml. of benzene, washed with 50 ml. of 2 N aqueous sodium carbonate and 3 times with 50 ml. of water, dried over anhydrous sodium sulfate and evaporated in vacuo to yield 0.256 g. of 4a(R),8a(R)-2-benzoyl-octahydro-6(2H)-isoquinolone having a melting point of 151°–153° (from absolute ethanol); [α]$_D^{25}$ −62.60° (c. 1.005, CHCl$_3$).

EXAMPLE 6

Preparation of racemic cis 7-benzoyl-decahydro-2-H-pyrido[3,4-d]-azepin-2-one from racemic cis 2-benzoyl-octahydro-6(2H)-isoquinolone To a suspension containing 20.6 g. of finely ground racemic cis 2-benzoyl-octahydro-6(2H)-isoquinolone in 800 g. of polyphosphoric acid were added 10.0 g. of sodium azide, and the mixture was stirred 16 hours at 55–60°. After cooling at room temperature, the reaction mixture was poured onto crushed ice. The resulting solution was made alkaline with solid sodium carbonate at 0°, and was extracted thoroughly with dichloromethane. The organic phase was washed with water, dried over anhydrous sodium sulfate and evaporated to dryness in vacuo. The oily residue crystallized on trituration with acetone. Fractional crystallization of the crystalline product from acetone yielded cis 7-benzoyl-decahydro-2H-pyrido[3,4-d]azepin-2-one, which after one recrystallization from absolute ethanol and three recrystallizations from acetone had a melting point of 167–168.5°.

EXAMPLE 7

Preparation of racemic trans 7-benzoyl-decahydro-2H-pyrido[3,4-d]azepin-2-one from racemic trans 2-benzoyl-octahydro-6(2H)isoquinolone To a mixture containing 5.15 g. of trans 2-benzoyloctahydro-6(2H)-isoquinolone and 200 g. of polyphosphoric acid were added 2.5 g. of sodium azide and the reaction mixture was stirred at 55–60° for 16 hours. After cooling to room temperature, the polyphosphoric acid was hydrolyzed by addition of ice. The resulting solution was made alkaline with concentrated sodium carbonate solution and extracted thoroughly with dichloromethane. The extract was washed with water, dried over anhydrous sodium sulfate and evaporated to dryness to yield 5.45 g. of crystalline racemic trans 7-benzoyl-decahydro-2H-pyrido [3,4-d]azepin-2-one. After recrystallization from ethanol/ether it had a melting point of 187–189°.

EXAMPLE 8

Preparation of 5a(S),9a(S)-7-benzoyldecahydro-2H-pyrido[3,4-d]azepin-2-one

To a mixture of finely ground 2.57 g. of 4a(S),8a(S)-2-benzoyloctahydro-6(2H)-isoquinolone and 100 g. of polyphosphoric acid was added 1.3 g. of sodium azide. The reaction mixture was stirred at 55°–60° C. (bath) for 16 hours, cooled to room temperature and poured into ca. 380 g. of crushed ice. After the ice had melted, the resulting solution was made alkaline with 6 N aqueous sodium carbonate (370 ml.) and extracted 3 times with 300 ml. of methylene chloride. Methylene chloride extract was washed 3 times with 40 ml. of water, dried over anhydrous sodium sulfate and evaporated to dryness, to give 2.72 g. of crystalline 5a(S),9a(S)-7-benzoyldecahydro-2H-pyrido[3,4-d]azepin-2-one. From absolute ethanol it crystallized with one mole of ethanol, M.P. 200°–203° C., [α]$_D^{25}$ 37.83° (c. 1.0547, CHCl$_3$); on drying loses ethanol to give anhydrous form, M.P. 90°–100°.

EXAMPLE 9

Preparation of racemic 2-benzoyl-1,2,3,4,7,8,9,9a-octahydro - 6H - pyrido[3,4-d]azepin-6-one from racemic 2-benzoyl-1,3,4,7,8,8a-hexahydro-6(2H)-isoquinolone To a suspension containing 1.02 g. of finely ground racemic 2-benzoyl-1,3,4,7,8,8a-hexahydro-6(2H)-isoquinolone in 40 g. of polyphosphoric acid was added 0.5 g. of sodium azide and the reaction mixture was stirred at 120° for 30 minutes. After cooling to room temperature, ice was added. The resulting solution was made alkaline with saturated aqueous sodium carbonate at 0° and was extracted with dichloromethane. The dichloromethane extract was washed with water, dried over anhydrous sodium sulfate and evaporated to dryness. The product was crystallized by trituration with acetone to give racemic 2 - benzoyl - 1,2,3,4,7,8,9,9a - octahydro-6H-pyrido[3,4-d] azepin-6-one having a melting point of 219–221°.

EXAMPLE 10

Preparation of racemic cis 7-benzoyl-decahydro-2H-pyrido[3,4-d]azepin-2-one from racemic 2-benzoyl-1,2,3,4,7,8,9,9a-octahydro-6H-pyrido[3,4-d]azepin-6-one To a solution containing 5.4 g. of racemic 2-benzoyl-1,2,3,4,7,8,9,9a - octahydro-6H-pyrido[3,4-d]azepin-6-one in 450 ml. of absolute ethanol were added 10 ml. of 3 N aqueous hydrochloric acid and 5.4 g. of 5% rhodium on alumina catalyst. The reaction mixture was hydrogenated at room temperature and atmospheric pressure until the uptake of hydrogen ceased. Thereafter, the catalyst was removed by filtration and washed thoroughly with ethanol. The filtrate was neutralized with 2 N aqueous sodium carbonate and evaporated to a small volume in vacuo. The residue was extracted with 1000 ml. of dichloromethane.

The extract was washed with water, dried with anhydrous sodium sulfate and evaporated to dryness. The non-crystalline product exhibited an IR-spectrum identical to that of the racemic cis 7-benzoyl-decahydro-2H-pyrido[3,4-d] azepin-2-one of Example 6, and after being recrystallized twice from acetone, had a melting point of 162–165°.

EXAMPLE 11

Preparation of racemic cis 1-benzoyl-3-(2-aminoethyl)-4-piperidineacetic acid ethyl ester from racemic cis 7-benzoyl-decahydro-2H-pyrido[3,4-d]azepin-2-one A solution containing 2.8 g. of racemic cis 7-benzoyl-decahydro-2H-pyrido[3,4-d]azepin-2-one in 500 ml. of 5% ethanolic hydrochloric acid was refluxed for 100 hours. Thereafter, the solvent was removed by evaporation in vacuo. The residue was taken up in 1200 ml. of dichloromethane. The resulting solution was shaken with a solution containing 0.53 g. of sodium carbonate in 10 ml. of water, dried over anhydrous sodium sulfate and evaporated to yield oily racemic cis 1-benzoyl-3-(2-aminoethyl)-4-piperidineacetic acid ethyl ester.

EXAMPLE 12

Preparation of racemic trans 1-benzoyl-3-(2-aminoethyl)-4-piperidineacetic acid ethyl ester from racemic trans 7-benzoyl-decahydro-2H-pyrido[3,4-d]azepin-2-one A solution containing 2.0 g. of racemic trans 7-benzoyl-decahydro-2H-pyrido[3,4-d]azepin-2-one in 350 ml. of 5% ethanolic hydrogen chloride was refluxed for 65 hours. After the solvent was removed in vacuo, the residue was dissolved in water, made alkaline with 2 N aqueous sodium carbonate and evaporated to dryness in vacuo. The residue thus obtained was extracted with boiling dichloromethane. The extract was separated from inorganic salts by filtration and evaporated to dryness to yield racemic trans 1-benzoyl-3-(2-aminoethyl)-4-piperidineacetic acid ethyl ester.

EXAMPLE 13

Preparation of racemic cis 1-benzoyl - 3 - vinyl-4-piperidineacetic acid ethyl ester (racemic N-benzoylmeroquinene ethyl ester) from racemic cis 1-benzoyl-3-(2-aminoethyl)-4-piperidineacetic acid ethyl ester A mixture containing 1.91 g. of racemic cis 1-benzoyl-3-(2-aminoethyl) - 4 - piperidineacetic acid ethyl ester, 1.38 g. of formic acid and 1.05 g. of 37% formaldehyde was heated for 1 hour at 100°. After cooling to room temperature, 3.5 ml. of concentrated hydrochloric acid were added and the mixture thus obtained was evaporated to dryness in vacuo. The residue was dissolved in 50 ml. of water. The solution was washed by shaking with ether, made alkaline to about a pH 8 with 2 N sodium carbonate and extracted thoroughly with dichloromethane. The extract was washed with water, dried over anhydrous sodium sulfate and evaporated to dryness in vacuo to give oily racemic cis 1-benzoyl-3-(2-dimethylaminoethyl) - 4 - piperidineacetic acid ethyl ester. To the stirred solution containing this product in 10 ml. of methanol were added 2 ml. of 30% aqueous hydrogen peroxide at 0°. The reaction mixture was warmed to room temperature and stirred for 16 hours. The excess of hydrogen peroxide was decomposed by addition of platinum black with stirring for 1 hour at 0°. The platinum black was separated by filtration and washed with methanol. The filtrate was evaporated to dryness in vacuo to yield racemic cis 1-benzoyl-3-(2-dimethylaminoethyl) - 4 - piperidineacetic acid ethyl ester N-ozide as an oil. Heating of this product in vacuo at a temperature from 90° to 125° C. over a period of 25 minutes yielded racemic N-benzoylmeroquinene ethyl ester, which, after purification by preparative thin layer chromatography and recrystallization from hexane, had a melting point of 66–68°.

EXAMPLE 14

Preparation of racemic trans 1-benzoyl-3-(2 - dimethylaminoethyl) - 4 - piperidineacetic acid ethyl ester from racemic trans 1-benzoyl-3-(2-aminoethyl)-4-piperidineacetic acid ethyl ester A mixture containing 1.4 g. of racemic trans 1-benzoyl-3-(2-aminoethyl) - 4 - piperidineacetic acid ethyl ester, 1.4 g. of formic acid and 1.1 g. of 37% aqueous formaldehyde was heated at 95–100°. The reaction mixture became a clear solution and a vigorous evolution of gas occurred, which ceased after 1.5 hours. After cooling to room temperature, 1 ml. of concentrated hydrochloric acid was added and the mixture was evaporated in vacuo. The residue was dissolved in 100 ml. of water, washed by shaking with ether, made alkaline with 2 N aqueous sodium carbonate and extracted thoroughly with dichloromethane. The extract was dried over anhydrous sodium sulfate and evaporated to yield racemic trans 1-benzoyl-3-(2 - dimethylaminoethyl) - 4 - piperidine acetic acid ethyl ester.

EXAMPLE 15

Preparation of racemic trans 1-benzoyl - 3 - (2-dimethylaminoethyl) - 4 - piperidineacetic acid ethyl ester N-oxide from racemic trans 1-benzoyl - 3 - (2-dimethylaminoethyl)-4-piperidineacetic acid ethyl ester To a stirred solution containing 0.73 g. of racemic trans 1-benzoyl - 3 - (2-dimethylaminoethyl)-4-piperidineacetic acid ethyl ester in 10 ml. of methanol was added 1 ml. of 30% hydrogen peroxide at 0°. The reaction mixture was allowed to warm to room temperature and was then stirred overnight. The excess of hydrogen peroxide was decomposed by stirring with platinum black for 2 hours at 0° C. The platinum black was removed by filtration and the filtrate evaporated to dryness yielding racemic trans 1-benzoyl - 3 - (2 - dimethylaminoethyl)-4-piperidineacetic acid ethyl ester N-oxide.

EXAMPLE 16

Preparation of racemic trans 1-benzoyl - 3 - vinyl-4-piperidineacetic acid ethyl ester from racemic trans 1-benzoyl - 3 - (2-dimethylaminoethyl) - 4 - piperidineacetic acid ethyl ester N-oxide A flask containing 0.63 g. of racemic trans 1-benzoyl-3 - (2 - dimethylaminoethyl) - 4 - piperidineacetic acid ethyl ester N-oxide was pyrolyzed at 90–120° for 20 minutes. The product was chromatographed on a 400 g. silica gel column with ether to yield racemic trans 1-benzoyl - 3 - vinyl - 4 - piperidineacetic acid ethyl ester as a glass.

EXAMPLE 17

Preparation of racemic cis 7-benzoyl - 1 - nitroso-decahydro - 2H - pyrido[3,4-d]azepin-2-one from racemic cis 7-benzoyl-decahydro-2H-pyrido[3,4-d]azepin-2-one To a solution containing 5.521 g. of nitrogen tetroxide in 360 ml. of carbon tetrachloride at —70° were added 9.84 g. of anhydrous sodium acetate. The mixture was allowed to warm to 0° and a solution containing 10.88 g. of racemic cis 7 - benzoyl-decahydro - 2H - pyrido-[3,4-d]azepin-2-one in 40 ml. of dichloromethane was added with stirring. After 30 minutes at 0°, the mixture was poured into a slurry of ice and water. The resulting mixture was placed in a separatory funnel and the organic phase was separated. The aqueous phase was extracted thoroughly with ice-cold dichloromethane. The combined organic phases were washed with water, dried over anhydrous sodium sulfate, and evaporated to dryness at 0° C. in vacuo to yield oily racemic cis 7-benzoyl-1-nitroso-decahydro-2H-pyrido[3,4-d]azepin-2-one.

EXAMPLE 18

Preparation of racemic trans 7-benzoyl - 1 - nitroso-decahydro-2H - pyrido[3,4-d]azepin - 2 - one from racemic trans 7 - benzoyl-decahydro-2H-pyrido[3,4-d]azepin-2-one To 100 ml. of carbontetrachloride solution containing 1.31 g. of nitrogentetroxide at —70° were added 2.46 g. of anhydrous sodium acetate. The mixture was allowed to warm to 0°, and 2.6 g. of racemic trans 7-benzoyl-decahydro - 2H - pyrido[3,4-d]azepin-2-one in 50 ml. of dichloromethane were added with stirring. The reaction mixture was maintained at 0° for 30 minutes. Thereafter, it was poured into a slurry of ice and water, transferred to a separatory funnel and the organic phase was removed. The aqueous phase was extracted with three 250 ml. portions of dichloromethane. The organic phases were combined, washed with water, dried over anhydrous sodium sulfate and evaporated to dryness to yield racemic trans 7-benzoyl - 1 - nitroso-decahydro - 2H - pyrido-[3,4-d]azepin-2-one, a green yellow powder. All operations were carried out at 0°.

EXAMPLE 19

Preparation of racemic N-benzoyl-meroquinene [racemic cis 1-benzoyl-3-vinyl-4-piperidineacetic acid] from racemic cis 7-benzoyl-1-nitroso-decahydro-2H-pyrido-[3,4-d]azepine-2-one The racemic cis 7-benzoyl-1-nitroso-decahydro-2H-pyrido-[3,2-d]azepine-2-one from Example 17 was placed in a flask fitted with a reflux condenser and heated under nitrogen on an oil bath maintained at 125° for about 1 hour. The residue was taken up in 50 ml. of 1 N potassium hydroxide, diluted with 50 ml. of water and washed by shaking with ether. The aqueous phase was neutralized with 50 ml. of 1 N hydrochloric acid and extracted with ether. The ether phase was washed with water, dried over anhydrous magnesium sulfate and evaporated to dryness to yield racemic N-benzoyl-meroquinene, as an oil.

EXAMPLE 20

Preparation of racemic trans 1-benzoyl-3-vinyl-4-piperidineacetic acid from racemic trans 7-benzoyl-1-nitroso-decahydro-2H-pyrido-[3,4-d]azepin-2-one The product of Example 18, i.e., racemic trans 7-benzoyl-1-nitroso-decahydro-2H-pyrido[3,4-d]azepin-2-one was heated at 125° under nitrogen for 1 hour. The product was taken up in 13 ml. of 1 N aqueous potassium hydroxide and 30 ml. of water, washed with four 100 ml. portions of ether, neutralized with 13 ml. of 1 N aqueous hydrochloric acid and extracted with four 200 ml. portions of ether. The ethereal extract was washed with 70 ml. of water, which was combined with aqueous phase, dried over anhydrous magnesium sulfate and evaporated to yield oily racemic trans 1-benzoyl-3-vinyl-4-piperidineacetic acid.

EXAMPLE 21

Preparation of 1-benzoyl-3(S)-vinyl-4(S)-piperidineacetic acid

To 143 ml. of 0.15 M solution of dinitrogen tetroxide in carbontetrachloride immersed in a Dry Ice-acetone bath were added 3.51 g. of anhydrous sodium acetate, and the mixture was allowed to warm to 0° C. A solution containing 3.86 g. of 5a(S),9a(S)-7-benzoyldecahydro-2H-pyrido[3,4-d]azepin-2-one in 50 ml. of methylene chloride was added with stirring, and after standing for 30 minutes at 0° C. the mixture was poured into a slurry of ice and water (280 ml.). The resulting mixture was placed in a separatory funnel and the organic phase was removed. The aqueous phase was extracted 3 times with 430 ml. of methylene chloride. The combined organic phases were washed with 100 ml. of water, dried over anhydrous sodium sulfate and evaporated in vacuo. All these operations were carried out at 0° C. It gave quantitative yield of pale yellow powder, 1-nitroso-5a(S),9a(S)-7-benzoyl-decahydro-2H-pyrido[3,4-d]azepin - 2 - one, which was processed immediately further.

The nitroso product was heated at 125° C. (bath) under nitrogen. Initially violent reaction ceased slowly after 30 minutes. The residue (3.92 g.) was taken up in 19 ml. of 1 N aqueous potassium hydroxide, diluted with water (60 ml.) and washed 4 times with 150 ml. of ether. It was then neutralized with 19 ml. of 1 N aqueous hydrochloric acid and extracted 4 times with 300 ml. of ether. The ethereal extract was washed with 60 ml. of water, dried over anhydrous magnesium sulfate and evaporated in vacuo to give 2.34 g. of oily 1-benzoyl-3(S)-vinyl-4(S)-piperidineacetic acid which contained minor impurities (tLc).

EXAMPLE 22

Preparation of racemic N-benzoylmeroquinene methyl ester [racemic cis 1-benzoyl-3-vinyl-4-piperidineacetic acid methyl ester] from racemic N-benzoylmeroquinene [racemic cis 1-benzoyl-3-vinyl-4-piperidineacetic acid]

To a stirred solution containing 5.29 g. of racemic N-benzoylmeroquinene in 500 ml. of ether was added 1 g. of diazomethane in 50 ml. of ether. Stirring was continued for 15 minutes. The excess diazomethane was decomposed by a dropwise addition of glacial acetic acid until the yellow color disappeared. The reaction mixture was diluted to 1000 ml. with ether, washed with 2 N sodium carbonate and water, dried over anhydrous magnesium sulfate and evaporated in vacuo to yield oily N-benzoyl-meroquinene methyl ester.

EXAMPLE 23

Preparation of 1 - benzoyl - 3(R)-vinyl-4(S)-piperidineacetaldehyde from 1-benzoyl-3(R)-vinyl-4(S)-piperidineacetic acid methyl ester To a Dry Ice cooled solution of 1.48 g. (0.005 mole) of 1-benzoyl-3(R)-vinyl-4(S)-piperidineacetic acid methyl ester in 100 ml. of toluene was added dropwise (5 min.) with stirring 8 ml. (ca. 0.012 mole) of a 25% solution of diisobutyl aluminum hydride in toluene. Stirring was continued for 30 min. at —78°, then 5 ml. of methanol-water (1:1) was added, and stirring at —78° was continued. After 90 min., 0.6 ml. (0.005 mole) of benzoylchloride and 4 g. of solid sodium carbonate was added, the Dry Ice bath was removed, and the mixture was stirred for 60 min. The inorganic solids were removed by filtration, washed with methanol, and the combined organic phases evaporated to dryness. The crude product was dissolved in 100 ml. of dichloromethane, washed (1× 1 N sodium carbonate, 1× water), dried (sodium sulfate) and evaporated. The crude product (1.7 g.) was separated by preparative layer chromatography to give 0.235 g. (17.5%) of 1-benzoyl-3(R)-vinyl-4(S)-piperidineacetaldehyde as a colorless oil.

EXAMPLE 24

Preparation of rac. trans 1-benzoyl-3-vinyl-4-piperidineacetic acid methyl ester To the solution of 0.476 g. of rac. trans 1-benzoyl-3-vinyl-4-piperidineacetic acid in 4 ml. of methanol was added 9 ml. of diazomethane solution in ether (concentration ca. 3 g./130 ml.). After few minutes an additional 9 ml. of diazomethane solution was added, and then stirred at room temperature for 1 hour. The excess of diazomethane was destroyed by addition of several drops glacial acetic acid, and thus resulted mixture was evaporated to dryness in vacuo, leaving 0.5 g. of oily residue. The crude product was chromatographed on 7 Brinkman silica gel preparative plates with benzene-ether 1:1 mixture. Elution with 95% ethanol gave 0.201 g. of oily rac. trans 1-benzoyl-3-vinyl-4-piperidineacetic acid methyl ester.

EXAMPLE 25

Preparation of 1-benzoyl-3(S)-vinyl-4(S)-piperidineacetic acid methyl ester

To a cooled solution containing 2.34 g. of 1-benzoyl-3(S)-vinyl-4(S)-piperidineacetic acid in 20 ml. of methanol was added 20 ml. of diazomethane solutiin in ether (concentration ca. 3 g./130 ml.). After few minutes an additional 20 ml. of diazomethane solution was added and then stirred at room temperature for 5 minutes. The excess of diazomethane was destroyed by addition of several drops of glacial acetic acid, and thus resulted mixture was evaporated to dryness in vacuo, leaving 2.9 g. of oily residue. The crude product was chromatographed on 26 Brinkman silica gel preparative plates with benzene-ether 1:1 mixture. Elution with 95% ethanol gave 1.059 g. of oily 1 - benzoyl-3(S)-vinyl-4(S)-piperidineacetic acid methyl ester, $[\alpha]_D^{25}$ —1.61° (c. 1.1193, $CHCl_3$).

EXAMPLE 26

Preparation of racemic 3-(α-benzyloxycarbonylcyanomethyl)glutaric acid diethyl ester To the boiling solution of 37.24 g. of glutaconic acid diethyl ester and 70.08 g. of benzylcyanoacetate in 100 ml. of anhydrous tetrahydrofuran was added dropwise 22.4 g. (0.20 mole) of potassium t-butoxide in 300 ml. of anhydrous tetrahydrofuran over a hour-hour period. The reaction mixture was stirred and refluxed for 12 hours. The solvent was removed by distillation in vacuo. To the residue was added 100 ml. of water and extracted with 3 l. of benzene. The benzene extract was washed four times with 100 ml. of water, dried over anhydrous sodium sulfate and evaporated in vacuo. The crude product was fractionally distilled to give 42.55 g. of racemic 3-(α-benzyloxycarbonylcyanomethyl)glutaric acid diethyl ester, B.P. 167°–174° at 0.15 mm. Hg. Large scale runs average to 61% yield.

EXAMPLE 27

Preparation of racemic 3-(1-benzyloxycarbonyl-1-cyanopropyl)glutaric acid diethyl ester The mixture of 18 g. of racemic 3-(α-benzyloxycarbonylcyanomethyl)glutaric acid diethyl ester, 15.6 g. of ethyliodide and 6.72 g. of potassium t-butoxide in 200 ml. of anhydrous tetrahydrofuran was stirred and refluxed for 3 hours, which it became neutral. The precipitate formed during the reaction was separated by filtration and washed with tetrahydrofuran. The combined filtrates were evaporated to dryness, and after addition of 20 ml. of water, extracted with 1 l. of benzene. The benzene extract was washed with water, dried over anhydrous sodium sulfate and evaporated to dryness. The crude product was fractionally distilled to give 11.35 g. of racemic 3 - (1-benzyloxycarbonyl-1-cyanopropyl)glutaric acid diethyl ester, B.P. 154°–159° at 25 microns. Large scale runs average to 70% yield.

EXAMPLE 28

Preparation of racemic 3-(1-cyanopropyl)glutaric acid diethyl ester

To the solution of 23.4 g. (0.06 mole) of 3-(1-benzyloxycarbonyl-1-cyanopropyl)glutaric acid diethyl ester in 600 ml. of 95% ethanol was added 3 g. of 10% palladium on carbon, and hydrogenated at room temperature and atmospheric pressure. After uptake of 0.06 mole of hydrogen, the reaction ceased. Catalyst was removed by filtration through celite, and the filtrate was evaporated to dryness. The residue, 2032 g., was heated at 170°–180° in vacuo for 1 hour. After cooling to room temperature, it was dissolved in 1 l. of ether. The ethereal solution was washed three times with 50 ml. of concentrated aqueous solution of sodium bicarbonate, and water, dried over anhydrous magnesium sulfate and evaporated to dryness to give 14.17 g. of racemic 3-(1-cyanopropyl)glutaric acid diethyl ester, B.P. 84°–86° at 20 microns.

EXAMPLE 29

Preparation of racemic cis 4 - ethoxycarbonylmethyl-5-ethyl-2-piperidone and racemic trans 4-ethoxycarbonylmethyl-5-ethyl-2-piperidone To a solution of 101.23 g. (0.395 mole) of 3-(1-cyanopropyl)glutaric acid diethyl ester in 1200 ml. of absolute ethanol was added 31.8 g. of Raney nickel, and hydrogenated at 110 atm and temperature, which in the course of three hours rose slowly from room to 152° C. After cooling to room temperature, the catalyst was separated by filtration through celite and the filtrate evaporated to dryness in vacuo. On trituration with ether, 57.6 g. of racemic trans 4 - ethoxycarbonylmethyl-5-ethyl-2-piperidone, M.P. 86°–88° was obtained. After one recrystallization from methylene chloride-ether, M.P. was 89°–91°.

The mother liquors were evaporated to give 23.5 g. of oily residue, which was chromatographed on a 2 kg. silica gel column. The elution with ethanol-chloroform mixture gave 16 g. of racemic cis 4-ethoxycarbonylmethyl-5-ethyl-2-piperidone.

EXAMPLE 30

Preparation of racemic trans 3-ethyl-4-piperidineacetic acid ethyl ester

The solution of 0.640 g. of racemic trans 4-ethoxycarbonylmethyl-5-ethyl - 2 - piperidone and 0.684 g. of triethyloxonium fluoroborate in 20 ml. of anhydrous methylene chloride was stirred at room temperature 65 hours, and then evaporated in vacuo. The crude enolether was dissolved in 20 ml. of absolute ethanol, the solution was cooled to 0° C. and 0.25 g. (0.0066 mole) of sodium borohydride was added in portions. The reaction mixture was stirred for 23 hours at room temperature, then diluted with 50 ml. of water and extracted with 1 l. of methylene chloride. Methylene chloride extract was washed with water (3× 50 ml.), dried over anhydrous sodium sulfate and evaporated to dryness. The residue was dissolved in 7 ml. of ice-cold 1 N hydrochloric acid, the resulting solution diluted with 100 ml. of water and washed 5 times by shaking with 50 ml. of ether. It was then made alkaline with 8 ml. of 1 N sodium hydroxide and extracted with 1 l. of methylene chloride. Methylene chloride extract was washed three times with 50 ml. of water, dried over anhydrous sodium sulfate and evaporated to dryness, to give 0.591 g. (99%) of racemic trans 3-ethyl-4-piperidineacetic acid ethyl ester B.P. 91°–92° (bath) at 0.5 mm. Hg.

EXAMPLE 31

Preparation of racemic cis 6-methoxy-4-{3-[1-benzoyl-3-vinyl-4-piperidyl] - 2 - oxopropyl}quinoline from 6-methoxylepidine and racemic N-benzoylmeroquinene methyl ester [cis 1 - benzoyl-3-vinyl-4-piperidineacetic acid methyl ester]

To a solution containing about 0.032 mole of lithium diisopropyl amide [prepared at 20° in an atmosphere of dry nitrogen by the addition of 6 ml. of dry diisopropylamine to 15.5 ml. of phenyllithium in benzene-ether (7:3)] were added dropwise a solution containing 5.6 g. of 6-methoxylepidine in 60 ml. of anhydrous tetrahydrofuran. The reaction mixture was stirred for 20 minutes. To the practically homogeneous, dark-brown solution of 6-methoxylepidyl lithium thus obtained was added dropwise over a period of 20 minutes a solution containing 4.6 g. of racemic N-benzoylmeroquinene methyl ester in 60 ml. of anhydrous tetrahydrofuran. After the addition was completed, stirring was continued for 60 minutes. During the whole operation the reaction temperature was maintained at 20°. Thereafter, ice and water were added and the reaction mixture was neutralized to a pH 8 with acetic acid and 10% sodium bicarbonate. The aqueous phase was extracted thoroughly with ether. The ethereal extract was washed with water, dried over anhydrous magnesium sulfate and evaporated. The residue was adsorbed on a 550 g. neutral alumina column (activity II). After elution of unreacted 6-methoxylepidine with benzene, the amorphous racemic cis-6-methoxy-4-{3-[1-benzoyl-3-vinyl-4-piperidyl] - 2 - oxopropyl}quinoline was eluted with benzene containing 20–50% of ethyl acetate.

EXAMPLE 32

Preparation of 6-methoxy - 4{3 - [1-benzoyl-3(R)-vinyl-4(S)-piperidyl] - 2 - oxopropyl}quinoline from 6-methoxy-1-lepidine and N-benzoyl meroquinene ethyl ester To a solution of ca. 0.07 mole of lithium diisopropyl amide [prepared by addition of 15 ml. of dry diisopropyl amine in 10 ml. of toluene to 35 ml. of ca. 2 molar n-butyl lithium in hexane, at —78° under nitrogen] was added dropwise (10 min.) with stirring a solution of 13 g. (0.075 mole) of 6-methoxy-lepidine in 120 ml. of tetrahydrofuran. The mixture was stirred at —78° for 30 min., and there was added dropwise (10 min.) a solution of 10.5 g. (0.0345 mole) of N-benzoylmeroquinene ethyl ester in 150 ml. of tetrahydrofuran. Stirring was continued at —78° for 30 min. The cooling bath was removed and the stirring was continued for another 30 min. Water was added, the aqueous layer was neutralized (pH ca. 8) with acetic acid and extracted thoroughly with ether. The ethereal phase was washed (water), dried (magnesium sulfate) and evaporated in vacuo. The residue was absorbed on 600 g. of neutral alumina, activity II; after elution of excess 6-methoxy-lepidine with benzene, elution with benzene-ethyl acetate (1:1) afforded amorphous 6-methoxy-4{3-[1-benzoyl-3(R)-vinyl-4(S)-piperidyl] - 2 - oxopropyl}-quinoline; $[\alpha]_D^{24}+27.3°$ (c. 205; chloroform).

EXAMPLE 33

Preparation of 6 - methoxy-4{3-[1-benzoyl-3(R)-vinyl-4(S)-piperidyl] - 2 - oxopropyl}quinoline from 6-methoxylepidine and N-benzoyl-meroquinene methyl ester A condensation reaction carried out in analogous way as in Example 30a with 1.8 g. (0.0104 mole) of 6-methoxylepidine and 1.49 g. (0.0052 mole) of N-benzoylmeroquinene methyl ester (phenyl lithium was used instead of n-butyl lithium) yielded after a similar technique and separation by column chromatography 6-methyl-4{3-[1-benzoyl-3(R)-vinyl-4(S)-piperidyl] - 2 - oxopropyl} quinoline.

EXAMPLE 34

Preparation of 7-chloro-4-{3-[1-benzoyl-3(R)-vinyl-4(S)-piperidyl]-2-oxopropyl}-quinoline from 7 - chlorolepidine and N-benzoyl-meroquinene ethyl ester To a Dry Ice cooled solution of ca. 0.061 mole of lithium diisopropyl amide [prepared in an atmosphere of dry nitrogen by addition of 10 ml. (ca. 0.07 mole) of diisopropylamine in 30 ml. of tetrahydrofuran to 30 ml. of ca. 2 M n-butyllithium in hexane] was added dropwise (20 min.) a solution of 11 g. (0.061 mole) of 7-chlorolepidine in 60 ml. of tetrahydrofuran. The resulting brown suspension was stirred at —78° for 30 min., then there was added a solution of 9.2 g. (0.0305 mole) of N-benzoyl-meroquinene ethyl ester in 60 ml. of tetrahydrofuran. Stirring was continued at —78° for 40 min. After removing the cooling bath, stirring was continued for another 40 min. After addition of 50 ml. of water, the mixture was neutralized with acetic acid and the pH was adjusted to ca. 8 by addition of 10% sodium bicarbonate. The aqueous phase was extracted thoroughly with ether, the ethereal phases were washed (2× 10% sodium bicarbonate), dried (magnesium sulfate) and evaporated to dryness. Crystallization from acetone-ether afforded crystalline 7 - chloro-4-{3-[1-benzoyl-3(R)-vinyl-4(S)-piperidyl]-2-oxopropyl}quinoline; the mother liquor was absorbed on 300 g. of neutral alumina, activity II, and elution with ethyl acetate afforded additional amounts of 7-chloro-4-{3-[1-benzoyl - 3(R)-vinyl - 4(S)-piperidyl]-2-oxopropyl}quinoline; M.P. 147–148° (acetone); $[\alpha]_D^{25}$ +38.7° (c. 1.00, chloroform).

EXAMPLE 35

Preparation of epimeric 7-chloro-4-{3-[3(R)-vinyl-4(S)-piperidyl]-2-hydroxypropyl}-quinolines from 7-chloro-4-{3-[1-benzoyl-3(R)-vinyl-4(S)-piperidyl] - 2 - oxopropyl}quinoline To an ice cold solution of 7.84 g. (0.018 mole) of 7-chloro-4-{3-[1-benzoyl - 3(R) - vinyl-4(S)-piperidyl]-2-oxopropyl}quinoline in 200 ml. of methanol was added excess solid sodium borohydride, and the solution was stirred for 60 min. at 0°. Fifty ml. of water was added, the methanol was evaporated in vacuo, and the aqueous residue was extracted thoroughly with dichloromethane. The organic extracts were washed (sat. sodium chloride); dried (sodium sulfate) and evaporated to give epimeric 7-chloro - 4 - {3-[1-benzoyl-3(R)-vinyl-4(S)-piperidyl]-2-hydroxypropyl}quinolines. The crude, dried product was dissolved in 200 ml. of dry toluene and 50 ml. of dry tetrahydrofuran, the solution was cooled to —78°, and 25 ml. (ca. 0.04 mole) of a 25% solution of diisobutyl aluminum hydride in toluene was added dropwise (15 min.). The homogeneous solution was stirred at —78° for 40 min., 60 ml. of methanol-water (1:1) was added, and stirring was continued for 20 min. at —78°, then for 2 hrs. without cooling. The inorganic precipitate was removed by filtration and washed thoroughly with methanol. The combined filtrates were evaporated to dryness and the residue was partitioned between ether and 1 N hydrochloric acid. The acidic extracts were made alkaline (conc. ammonia) and extracted thoroughly with dichloromethane. The organic phase was washed (sat. sodium chloride), dried (sodium sulfate) and evaporated to give amorphous epimeric 7-chloro - 4 - {3-[3(R)-vinyl-4(S)-piperidyl]-2-hydroxypropyl}quinolines.

EXAMPLE 36

Racemic trans 6,8-dimethoxy-4-[3-(3-ethyl-4-piperidyl)-2-oxopropyl] quinoline from 6,8-dimethoxy lepidine and racemic trans 3-ethyl-4-piperidineacetic acid ethyl ester To a Dry Ice cooled solution of ca. 0.036 mole of lithium diisopropyl amide (prepared by addition of 6 ml. of diisopropyl amine in 10 ml. of toluene to 16 ml. of ca. 2 M n-butyl lithium in hexane, at —78° in an atmosphere of dry nitrogen) was added dropwise (5 min.) with stirring a solution of 7.3 g. (0.036 mole) of 6,8-dimemethoxy-lepidine in 50 ml. of dry tetrahydrofuran. The inhomogeneous mixture containing 6,8-dimethoxy lepidyl lithium was stirred for 15 min., then a solution of 3.65 g. (0.018 mole) of trans 3-ethyl - 4 - piperidineacetic acid ethyl ester in 50 ml. of tetrahydrofuran was added dropwise (30 min.). Stirring was continued for 60 min. at —78°. 50 ml. of water was added, the aqueous phase was neutralized with acetic acid (pH ca. 8) and extracted thoroughly with ether. The ethereal phase was washed (ca. 1% sodium bicarbonate solution), dried (sodium sulfate), and evaporated to give a crude product (ca. 6 g.), containing only traces of ketone 4 as indicated by thin layer chromatography. The combined aqueous phases were saturated with sodium chloride and extracted thoroughly with chloroform-ethanol (19:1), the organic extracts were dried (sodium sulfate) and evaporated in vacuo to give 5 g. (ca. 75%) of practically pure racemic trans 6,8 - dimethoxy - 4 - [3-(3-ethyl-4-piperidyl)-2-oxopropyl] quinoline as a yellow oil.

EXAMPLE 37

Preparation of 6 - methoxy - 4{3-[3(R)-vinyl-4(S)-piperidyl]-2-oxopropyl} quinoline from 6-methoxylepidine and meroquinene ethyl ester [3(R)-vinyl-4(S)-piperidineacetic acid ethyl ester]

To a solution containing about 0.034 mole of lithium diisopropyl amide [prepared at 80° in an atmosphere of dry nitrogen by addition of 6 ml. of dry diisopropylamine to 16 ml. of about 2.14 molar phenyllithium in benzene-ether (7:3)] was added dropwise a solution containing 6 g. of 6-methoxylepidine in about 25 ml. of anhydrous tetrahydrofuran and the reaction mixture was stirred at 0° for 20 minutes. To the practically homogeneous, dark-brown solution of 6-methoxylepidyl lithium thus obtained, was added dropwise a solution containing 3.5 g. of meroquinene ethyl ester in 40 ml. of dry tetrahydrofuran with stirring at 0° for 60 minutes. After the addition of 50 ml. of water, the reaction mixture was neutralized with acetic acid-sodium acetate to pH≃9 and extracted thoroughly with ether. The ethereal extract was washed with water, dried over anhydrous magnesium sulfate and evaporated. The residue was absorbed on a 350 g. neutral alumina column (activity II) after elution of unreacted 6-methoxylepidine with dichloromethane, amorphous 6-methoxy-4-{3-[3(R)-vinyl-4(S)-piperidyl]-2-oxopropyl} quinoline was eluted with dichloromethane containing 1 to 10% of methanol.

EXAMPLE 38

Preparation of 7 - chloro - 4-{3-[3(R)-vinyl-4(S)-piperidyl]-2-oxopropyl} quinoline from 7-chlorolepidine and meroquinene ethyl ester [3(R)-vinyl-4(S)-piperidineacetic acid ethyl ester]

To a solution containing about 0.0075 mole of lithium diisopropylamide [prepared in an atmosphere of dry nitrogen by addition of 1.3 ml. of dry diisopropylamine in 4 ml. of anhydrous tetrahydrofuran to 3.5 ml. of about 2.1 molar phenyllithium in benzene-ether (7:3)], cooled on a Dry Ice bath, was added dropwise with stirring a solution containing 1.33 g. of dry 7-chlorolepidine in 30 ml. of anhydrous tetrahydrofuran. The reaction mixture was stirred at −75° for 20 minutes. To the stirred, practically homogeneous, reddish-brown solution of 7-chlorolepidyl lithium thus obtained, was added dropwise a solution containing 0.70 g. of dry meroquinene ethyl ester in 20 ml. of anhydrous tetrahydrofuran. The dry-ice bath was removed and the solution was stirred at −75 to +20° for 3 hours. After the addition of 10 ml. of water, the reaction mixture was neutralized (pH about 8) by addition of acetic acid and 10% sodium bicarbonate, and extracted thoroughly with ether. The ethereal extracts were washed with water, dried over anhydrous magnesium sulfate and evaporated. The residue, a yellow oil, was adsorbed on a 70 g. neutral alumina (activity II) column. After elution of unreacted 7-chlorolepidine with dichloromethane, yellow amorphous 7 - chloro-4-(3-[3(R)-vinyl-4(S)-piperidyl]-2-oxopropyl} quinoline was eluted with dichloromethane containing 2 to 10% of methanol. The monohydrochloride of 7-chloro-4-{3-[3(R)-vinyl-4(S)-piperidyl]-2-oxopropyl} quinoline was recrystallized from methanol-acetone having a melting point of 236–237° (dec.), [α]$_D^{25}$ +26.9° (c. 1.02 CH$_3$OH).

EXAMPLE 39

Preparation of epimeric 6-methoxy - 4 - {3-[3(R)-vinyl-4(S)-piperidyl]-2-hydroxypropyl} quinolines from racemic cis 6-methoxy-4-(3-[1-benzoyl-3-vinyl-4-piperidyl]-2-oxopropyl) quinoline To a stirred solution containing 2.8 g. of racemic cis 6 - methoxy - 4 - {3 - [1 - benzoyl-3-vinyl-4-piperidyl]-2-oxopropyl}-quinoline in 150 ml. of dry toluene at 0°, was added dropwise a solution containing 25% diisobutyl aluminum hydride in toluene, while the course of the reaction was checked by tLc. After 12 ml. were added, the reaction was quenched by the addition of 10 ml. of an ice cold mixture of water-methanol (1:1). The resulting mixture was stirred at 20°. The alumina which precipitated was then removed by filtration, washed thoroughly with methanol, and the combined filtrates were evaporated to dryness. The residue was dissolved in dichloromethane, washed with 1 N sodium hydroxide and water, dried over anhydrous sodium sulfate and evaporated. The product, racemic epimaric cis 6-methoxy-4-{3-[3-vinyl-4-piperidyl]-2-hydroxypropyl} quinolines was dissolved in 40 ml. of acetone, and added to the solution containing 1 g. of dibenzoyl-(d)-tartaric acid in 10 ml. of methanol. Crystallization yielded the corresponding dibenzoyl-(d)-tartrate. The mother liquor was converted to the free base which was purified by filtration on a 20 g. neutral alumina column (activity II). Elution with dichloromethane-methanol (9:1) gave additional product which could not be crystallized as the neutral dibenzoyl-(d)-tartrate.

To complete resolution, the above-mentioned crystalline dibenzoyl-(d)-tartrate was recrystallized 4 times from methanolacetone to give the neutral dibenzoyl-(d)-tartrates of the epimeric 6-methoxy-4-{3-[3(R)-vinyl-4(S)-piperidyl]-2-hydroxypropyl}quinolines having a melting point of 189–190°; [α]$_D^{25}$=−27.4° (c. 0.82, methanol).

EXAMPLE 40

Racemic, epimeric trans6,8-dimethoxy-4-[3-(3-ethyl-4-piperidyl)-3-hydroxypropyl]quinolines from racemic trans 6,8-dimethoxy-4-[3 - (3-ethyl-4-piperidyl)-2-oxopropyl]quinoline To a stirred, ice cold solution of 5 g. (0.014 mole) of racemic trans6,8-dimethoxy-4-[3-(3-ethyl-4-piperidyl)-2-oxopropyl]quinoline in 150 ml. of methanol was added 0.9 g. of solid sodium borohydride. After stirring for 60 min., 50 ml. of water was added and the methanol was removed by evaporation. The aqueous residue was saturated with sodium chloride and extracted thoroughly with chloroform-ethanol (9:1). The extracts were dried (sodium sulfate) and evaporated to give 5 g. (quantitative recovery) of racemic, epimeric trans6,8-dimethoxy-4-[3-(3-ethyl-4 - piperidyl)-2-hydroxypropyl]quinolines as a crude oil.

EXAMPLE 41

Preparation of epimeric 6-methoxy-4-{3-[3(R)-vinyl-4(S)-piperidyl]-2-hydroxypropyl}quinolines from 6-methoxy-4-{3-[3(R)-vinyl - 4(S) - piperidyl]-2-oxopropyl}quinoline A solution containing 1.8 g. of 6-methoxy-4-{3-[3(R)-vinyl-4(S)-piperidyl]-2-oxopropyl}quinoline in 20 ml. of methanol was added to an ice cold solution containing 1 g. of sodium borohydride in 100 ml. of methanol. The solution was stirred at 0° to 20° for 90 minutes. After addition of 50 ml. of water, the methanol was removed by distillation. The remaining aqueous phase was extracted with dichloromethane. The extract was washed with 1 N aqueous sodium hydroxide and water, dried over anhydrous sodium sulfate and evaporated to dryness. The residue was dissolved in a small volume of methanol, and added to a solution containing 0.98 g. of dibenzoyl-(d)-tartaric acid in acetone. Crystallization yielded the neutral dibenzoyl-(d)-tartrates of the epimeric 6-methoxy-4-{3-[3(R)-vinyl-4(S)-piperidyl]-2-hydroxypropyl}quinolines having a melting point of 189–190° after recrystallization from methanol-acetone; [α]$_D^{25}$=−27.0° (c. 1.09, methanol).

The free base, epimeric 6-methoxy-4-{3-[3(R)-vinyl-4(S)-piperidyl] - 2-hydroxypropyl}quinolines, was obtained as a viscous, colorless oil; [α]$_D^{25}$ +39.6° (c. 1.425, chloroform).

EXAMPLE 42

Preparation of epimeric 7-chloro-4-{3-[3(R)-vinyl-4(S)-piperidyl]-2-hydroxypropyl}quinolines from 7-chloro-4-{3-[3(R)-vinyl-4(S) - piperidyl]-2-oxopropyl}quinoline To a stirred, ice cold solution containing 1.98 g. of 7-chloro-4-{3-[3(R)-vinyl - 4(S) - piperidyl]-2-oxopropyl}quinoline in 60 ml. of methanol was added 1 g. of sodium borohydride in portions. After stirring for 10 minutes, 20 ml. of water were added and the methanol was evaporated. The remaining mixture was made alkaline with 1 N sodium hydroxide and extracted thoroughly with dichloromethane. The extract was washed with water, dried over anhydrous sodium sulfate and evaporated to yield 1.61 g. of epimeric 7-chloro-4-{3-[3(R)-vinyl-4(S)-piperidyl] - 2 - hydroxypropyl}quinolines. The neutral dibenzoyl-(d)-tartrate had a melting point of 198–199° after recrystallization from dichloromethanemethanol.

EXAMPLE 43

Preparation of epimeric 6-methoxy-4-{3-[1-benzoyl-3(R)-vinyl-4(S)-piperidyl] - 2 - hydroxypropyl}quinolines from 6-methoxylepidine and 1-benzoyl-3(R)-vinyl-4(S)-piperidineacetaldehyde To ca. 0.0055 mole of lithium diisopropyl amide [prepared in an atmosphere of dry nitrogen by addition of 0.8 ml. (ca. 0.06 mole) of diisopropyl amine to 2.6 ml. of 2.14 M phenyl lithium in hexane] was added with stirring a solution of .95 g. (0.0055 mole) of 6-methoxylepidine in 7 ml. of benzene and 25 ml. of tetrahydrofuran. After stirring at room temperature for 20 minutes a solution of 0.95 g. (0.0037 mole) of 1-benzoyl-3(R)-vinyl-4(S)-piperidineacetaldehyde in 14 ml. of tetrahydrofuran was added dropwise (30 min.), and the resulting mixture was stirred at room temperature for 15 hours. Water (50 ml.) was added, the aqueous phase was extracted thoroughly with ether. The ethereal phase was washed (2×aq. sodium chloride), dried (sodium sulfate) and evaporated to dryness. The crude product (2.4 g.) was absorbed on 100 g. of neutral alumina, activity II, and elution with ethyl acetate containing 1% of methanol afforded 0.88 g. (55%) of epimeric 6-methoxy-4-{3-[1-benzoyl - 3(R)-vinyl-4(S)-piperidyl]-2-hydroxypropyl}quinolines as a colorless oil.

EXAMPLE 44

Preparation of epimeric 6-methoxy-4-{3-[3(R)-vinyl-4(S)-piperidyl]-2-hydroxypropyl}quinolines from epimeric 6-methoxy-4-{3-[1-benzoyl - 3(R)-vinyl-4(S)-piperidyl]-2-hydroxypropyl}quinolines To a solution of 0.145 g. (0.00033 mole) of epimeric 6-methoxy-4-{3-[1-benzoyl-3(R) - vinyl-4(S)-piperidyl]-2-hydroxypropyl}quinolines in 20 ml. of tetrahydrofuran was added 0.008 g. (0.0015 mole) of sodium aluminum hydride, and the mixture was stirred at room temperature for 80 min. Ca. 20 ml. of 1 N sodium hydroxide was added, the aqueous phase was extracted thoroughly with ether, the ethereal extracts were washed with water, dried (sodium sulfate) and evaporated to give 0.11 g. (over 90% recovery) of crude epimeric 6-methoxy-4-{3-[3(R)-vinyl-4(S)-piperidyl] - 2-hydroxypropyl}quinolines.

EXAMPLE 45

Preparation of epimeric 6-methoxy-4-{3-[3(R)-vinyl-4(S)-piperidyl]-2-acetoxypropyl}quinoline from epimeric 6-methoxy-4-{3-[3(R)-vinyl - 4(S)-piperidyl]-2-hydroxypropyl}quinolines To a solution containing 1.15 g. of epimeric 6-methoxy-4-{3-[3(R) - vinyl-4(S)-piperidyl] - 2 - hydroxypropyl}quinolines in 40 ml. of glacial acetic acid were added 4 ml. of freshly distilled borontrifluoride etherate. The solution was kept at 50° for 18 hours. Thereafter, the reaction mixture was concentrated in vacuo to about 10 ml., and, after addition of ice, neutralized (pH ca. 8) with 6 N sodium hydroxide. The ice cold, alkaline phase was extracted thoroughly with dichloromethane, and the extracts were washed with water, dried over anhydrous sodium sulfate and evaporated to yield epimeric 6-methoxy-4-{3-[3(R) - vinyl-4(S)-piperidyl]-2-acetoxypropyl}quinolines as colorless glass; $[\alpha]_D^{25}$ +21.4° (c. 0.835, chloroform).

EXAMPLE 46

Racemic, epimeric trans6,8-dimethoxy-4-[3-(3-ethyl-4-piperidyl)-2-acetoxypropyl]quinolines from racemic, epimeric trans6,8-dimethoxy-4-[3-(3-ethyl-4-piperidyl)-2-hydroxypropyl]-quinolines To a solution of a crude mixture of 5 g. (ca. 0.014 mole) of racemic, epimeric trans6,8-dimethoxy-4-[3-(3-ethyl-4-piperidyl)-2-hydroxypropyl] quinolines in 200 ml. of glacial acetic acid was added 20 ml. of highly distilled borontrifluoride etherate, and the solution was kept at 50° for 15 hours. The acetic acid was stripped off, ice-water was added, the aqueous solution was neutralized with conc. ammonium hydroxide to pH ca. 8 and extracted thoroughly with dichloromethane. The organic extracts were washed (saturated sodium chloride), dried (sodium sulfate) and evaporated to dryness to give 4.5 g. (ca. 80 percent) of racemic, epimeric trans6,8-dimethoxy-4-[3-(3-ethyl-4-piperidyl)-2-acetoxypropyl] quinolines as a crude oil.

EXAMPLE 47

Preparation of epimeric 7-chloro-4-{3-[3(R)-vinyl-4(S)-piperidyl]-2-acetoxypropyl}quinolines from epimeric 7-chloro-4-{3([3(R)(vinyl-4(S)-piperidyl} - 2 - hydroxypropyl]quinolines To a solution containing 0.656 g. of epimeric 7-chloro-4-{3-[3(R)-vinyl-4(S) - piperidyl] - 2 - hydroxypropyl}quinolines in 30 ml. of glacial acetic acid were added 3 ml. of freshly distilled borontrifluoride etherate. The solution was kept at 50° for 19 hours. Thereafter, the reaction mixture was concentrated in vacuo to about 10 ml. Ice was added and the ice cold mixture was neutralized (pH ca. 8) with 6 N sodium hydroxide and thoroughly extracted with dichloromethane. The organic layer was washed with water, dried over anhydrous sodium sulfate and evaporated to dryness. The residue was purified by preparative thin layer chromatography [chloroform-triethylamine (9:1)] to yield epimeric 7-chloro-4-{3-[3(R)-vinyl-4(S)-piperidyl]-2-acetoxypropyl}quinolines as a viscous oil.

EXAMPLE 48

Preparation of cis and trans 6-methoxy-4-{3-[3(R)-vinyl-4(R)-piperidyl]prop-1-enyl}quinolines from epimeric 6-methoxy-4-{3-[3(R) - vinyl - 4(S) - piperidyl]-2-hydroxypropyl}quinolines To an ice cold solution containing 0.6 g. of epimeric 6 - methoxy - 4 - {3 - [3(R) - vinyl - 4(S) - piperidyl]-2-hydroxypropyl}quinolines in 20 ml. of pyridine was added 1.0 ml. of thionyl chloride. The resulting reddish-brown solution was kept at 0 to 20° for 4 hours. Water was added and the aqueous phase was neutralized with acetic acid to a pH≃7 and extracted thoroughly with dichloromethane. The organic extracts were washed with water, dried over anhydrous sodium sulfate and evaporated to yield amorphous mixture of cis and trans 6-methoxy-4-{3-[3(R) - vinyl - 4(R)-piperidyl]-prop-1-enyl}quinolines.

EXAMPLE 49

Preparation of desoxyquinine [6-methoxy-4-{α-[5(R)-vinyl - 4(S) - quinuclidin - 2(S) - yl] - methyl}quinoline] and desoxyquinidine [6-methoxy-4-{α-[5(R)-vinyl-4(S)-quinucldin - 2(R) - yl]-methyl}quinoline] from epimeric 6-methoxy-4{-3-[3(R)-vinyl-4(S)-piperidyl]-2-acetoxypropyl}quinolines (a) With benzene+5% acetic acid+sodium acetate.—To a solution containing 1.241 g. of the pimeric 6-methoxy - 4 - {3 - [3(R) - vinyl - 4(S) - piperidyl] - 2-acetoxypropyl}quinolines in 150 ml. of benzene and 7.5 ml. of glacial acetic acid were added 17 g. of sodium acetate trihydrate. The mixture was heated under gentle reflux with stirring for 14 hours. After cooling, 100 ml. of ice water were added and the resulting mixture was made alkaline by addition of 6 N sodium hydroxide. The aqueous phase was extracted thoroughly with ether and the ethereal extracts were washed with water, dried over anhydrous magnesium sulfate and evaporated. The residue was adsorbed on 30 g. of neutral alumina column (activity II); the fractions eluted with ethyl acetate were further purified by preparative thin layer chromatography to yield a mixture of desoxyquinine and desoxyquinidine as a colorless viscous oil having a specific rotation of $[\alpha]_D^{25}$ +76.3° (c. 1.21, CHCl$_3$).

(b) With benzene+10 percent acetic acid.—A solution containing 0.656 g. of the epimeric 6-methoxy-4-{3-[3(R)-vinyl-4(S) - piperidyl]-2-acetoxypropyl}quinolines in 50 ml. of benzene and 5 ml. of acetic acid was heated under gentle reflux for 22 hours. Thereafter, the reaction mixture was worked up as in (a), and a mixture of desoxyquinine and desoxyquinidine was separated by preparative thin layer chromatography (chloroform-triethylamine, 9:1).

EXAMPLE 50

Racemic 6,8-dimethoxy-3-epi-desoxydihydrocinchonidine and racemic 6,8 - dimethoxy - 3 - epi-desoxydihydrocinchonine from racemic, epimeric trans 6,8-dimethoxy - 4 - [3 - (3 - ethyl - 4 - piperidyl) - 2 - acetoxypropyl]-quinolines To a solution of 4.2 g. of crude racemic, epimeric trans-6,8-dimethoxy - 4 - [3-(3-ethyl-4-piperidyl)-2-acetoxypropyl]quinolines in 300 ml. of benzene was added 30 ml. of glacial acetic acid and 50 g. of sodium acetate trihydrate, and the mixture was heated with stirring under gentle reflux for 12 hours. After cooling, 200 ml. of ice-water was added, the aqueous phase was neutralized with conc. ammonium hydroxide to pH ca. 8, separated from the benzene layer, and extracted thoroughly with dichloromethane. The combined organic layers were dried (sodium sulfate) and evaporated in vacuo to give 3.6 g. of crude reaction product. Absorption on 100 g. of neutral alumina, activity II, and elution with ethyl acetate afforded 2.15 g. (ca. 60 percent) of a mixture of racemic 6,8-dimethoxy - 3 - epi-desoxydihydrocinchonidine and racemic 6,8-dimethoxy-3-epi-desoxydihydrocinchonine as a colorless oil.

EXAMPLE 51

Preparation of 7'-chlorodesoxycinchonine [7-chloro-4{α-[5(R) - vinyl-4(S)-quinuclidin-2(R)-yl]methyl}quinoline] and 7'-chlorodesoxycinchonidine [7-chloro-4-{α-[5(R) - vinyl-4(S)-quinuclidin-2(S)-yl]-methyl}quinoline] from epimeric 7-chloro-4-{3-[3(R)-vinyl-4(S)-piperidyl]-2-acetoxypropyl}quinolines To a solution containing 0.363 g. of epimeric 7-chloro-4 - {3-[3(R)-vinyl-4(S)-piperidyl]-2-acetoxypropyl}quinolines in 50 ml. of benzene were added 2.5 ml. of glacial acetic acid and 5.5 g. of sodium acetate trihydrate. The mixture was heated under gentle reflux with stirring for 11 hours. After cooling, 100 ml. of ice water were added, the mixture was made alkaline with 6 N potassium hydroxide and extracted thoroughly with ether. The ethereal extract was washed with water, dried over anhydrous sodium sulfate and evaporated to dryness. The residue was purified by preparative thin layer chromatography [chloroform-triethylamine (9:1)] to yield a mixture of 7'-chlorodesoxycinchonine and 7'chlorodesoxycinchonidine.

EXAMPLE 52

Preparation of desoxyquinine [6-methoxy-4-{α-[5(R)-vinyl-4(S)-quinuclidin-2(S)-yl]methyl}quinoline] and desoxyquinidine [6-methoxy 4-{α-[5(R)-vinyl-4(S)-quinuclidin-2(R)-yl]methyl}-quinoline] from epimeric 6 - methoxy - 4 - {3-[3(R)-vinyl-4(S)-piperidyl]-2-hydroxypropyl}quinolines (a) In benzene-acetic acid (4:1).—A solution containing 0.350 g. of epimeric 6-methoxy-4-{3-[3(R)-vinyl-4(S)-piperidyl]-2-hydroxypropyl}quinolines in 50 ml. of benzene-acetic acid (4:1) was heated under gentle reflux for 29 hours. After the addition of water (about 50 ml.), the aqueous phase was made alkaline with 6 N NaOH and extracted thoroughly with ether. The etherel aextract was washed with water, dried over anhydrous magnesium sulfate and evaporated to dryness. The residue was separated by preparative thin layer chromatography (chloroform-triethylamine, 9:1) to yield a mixture of desoxyquinine and desoxyquinidine.

(b) In benzene-acetic acid (9:1).—A solution containing 176 mg. of the epimeric 6-methoxy-4-{3-[3(R)-vinyl-4(S)-piperidyl]-2-hydroxypropyl}quinolines in 50 ml. of benzene-acetic acid (9:1) was heated under gentle reflux for 67 hours. Thereafter, the reaction mixture was worked-up as in (a) to yield a mixture of desoxyquinine and desoxyquinidine.

EXAMPLE 53

Preparation of desoxyquinine and desoxyquinidine from cis and trans 6-methoxy-4-{3-[3(R)-vinyl-4(R)-piperidyl]prop-1-enyl}-quinolines A solution containing 0.11 g. of a crude mixture of cis and trans 6-methoxy-4-{3-[3(R)-vinyl-4(R)-piperidyl]-prop-1-enyl}quinolines in 10 ml. of benzene and 1 ml. of acetic acid was heated under gentle reflux for 4 and ½ hours. Water, about 10 ml., was added. The aqueous phase was made alkaline with 6 N aqueous sodium hydroxide and extracted thoroughly with ether. The ethereal extracts were washed with water, dried over anhydrous magnesium sulfate and evaporated to dryness. The residue was separated by preparative thin layer chromatography [chloroform-triethylamine (9:1)] to yield a pure mixture of desoxyquinine and desoxyquinidine.

EXAMPLE 54

Preparation of quinine [6-methoxy-α(R)-[5(R)-vinyl-4(S) - quinuclidin-2(S)-yl]-4-quinolinemethanol] and quinidine [6 - methoxy-α(S)-[5(R)-vinyl-4(S)-quinuclidin-2(R)-yl]-4-quinolinemethanol] from desoxyquinine and desoxyquinidine A solution containing 0.826 g. of a mixture of desoxyquinine and desoxyquinidine in 40 ml. of dimethylsulfoxide-t-butanol (4:1) was stirred under an atmosphere of dry oxygen at 20° for about 10 minutes (no O$_2$-uptake was observed). To this solution was added 0.6 g. of dry potassium-t-butoxide, and the resulting red-brown solution was stirred at 20° while the uptake of oxygen was measured. An almost constant uptake of about 2.5 ml./minute was observed until the total uptake reached 68 ml. Whereupon, the rate of O$_2$ consumption slowed down. When 71.5 ml. of oxygen were consumed, the reaction was quenched by addition of water and few drops of acetic acid. The resulting light yellow solution was evaporated to dryness in vacuo (0.1 mm.). The residue was dissolved in dichloromethane and extracted thoroughly with 2 N sulfuric acid. The acidic extracts were made alkaline and extracted with dichloromethane. The organic phase was washed with water, dried over anhydrous sodium sulfate and evaporated. The bases thus obtained were crystallized from ethanol to yield quinidine. The mother liquor was separated by preparative thin layer chromatography (chloroform-triethylamine-methanol, 85:10:5) to yield quinine and quinidine.

Quinidine was crystallized from ethanol and had a melting point and mixed melting point of 170–171° (after drying at 90°); $[\alpha]_D^{25}+259.0°$ (c. 1.095, ethanol). Quinine was crystallized as its neutral (d)-tartrate monohydrate and had a melting point and mixed melting point of 207–209° (dec., crystals start to soften above about 180°); $[\alpha]_D^{25}$ −154.1° (c. 0.855, methanol).

EXAMPLE 55

Racemic 6,8 - dimethoxy-3-epi-dihydrocinchonidine and racemic 6,8-dimethoxy-3-epi-dihydrocinchonine from racemic 6,8 - dimethoxy-3-epi-desoxydihydrocinchonidine and racemic 6,8-dimethoxy-3-epi-desoxydihydrocinchonine The reaction was carried out in a 250 ml. three-neck flask connected with a gas burette and fitted with a gas outlet, an Erlenmeyer flask attached by means of a piece of gooch rubber, and a magnetic stirrer. A solution of 1.97 g. (0.0058 mole) of a mixture of racemic 6,8-dimethoxy-3-epi-desoxydihydrocinchonidine and racemic 6,8-dimethoxy-3-epi-desoxydihydrocinchonidine in 80 ml. of dimethylsulfoxide-t-butanol (4:1) was first stirred in an atmosphere of dry oxygen at 20° for several minutes (no oxygen uptake observed). Then .975 g. (0.0087 mole) of solid potassium t-butoxide was added in one batch. The uptake of oxygen was measured while the solution was stirred. After consumption of 145 ml. (ca. 1 molar equivalent, 22 min.), 5 ml. of water was added, the pH was adjusted to ca. 8 by addition of acetic acid and the solution was evaporated in vacuo. The crystalline residue was dissolved in 100 ml. of dichloromethane, washed with 10 percent sodium bicarbonate (2× 20 ml.) and with wath (1× 20 ml.), dried (sodium sulfate), and evaporated to dryness. The crude product was separated by preparative layer chromatography into .826 g. (40 percent) of racemic 6,8-dimethoxy-3-epi-dihydrocinchonidine (M.P. 170–175°, from acetone) and .697 g. (33 percent) of racemic 6,8-dimethoxy-3-epi-dihydrocinchonine (M.P. 113–117°, as monohydrate from acetone).

EXAMPLE 56

Preparation of 7'-chlorocinchonine [7-chloro-α(S)-[5(R)-vinyl-4(S)-quinuclidin - 2(R) - yl]-4-quinolinemethanol] and 7'-chlorocinchonidine [7-chloro-α(R)-[5(R)-vinyl-4(S)]quinuclidin-2(S)-yl]-4-quinolinemethanol] from 7'-chlorodesoxycinchonine and 7'-chlorodesoxycinchonidine The hydroxylation reaction was run in a 100 ml. three-neck flask connected with a gas burette and equipped with a gas outlet, an Erlenmeyer flask attached by means of a piece of rubber tubing, and a magnetic stirrer. A solution containing 0.164 g. of a mixture of 7'-chlorodesoxycinchonine and 7'-chlorodesoxycinchonidine in 10 ml. of dimethylsulfoxide-t-butanol (4:1) was stirred in this flask in an atmosphere of dry oxygen at 20° for 10 minutes (no O₂ uptake observed). To this solution was added 0.12 g. of potassium t-butoxide and the uptake of oxygen was measured. 11.8 ml. of oxygen (about 1 molar equivalent) was consumed, and no further O₂-uptake was observed for 2 minutes. Whereupon, the reaction was quenched by the addition of 2 ml. of water and a few drops of acetic acid. The resulting yellowish solution was evaporated to dryness in vacuo (0.1 mm). The residue was dissolved in dichloromethane and washed with 1 N aqueous sodium hydroxide and water, dried over anhydrous sodium sulfate and evaporated. The residue was separated by preparative thin layer chromatography [chloroform-triethylamine-methanol (85:10:5)] to yield 7'-chlorocinchonine and 7'-chlorocinchonidine.

7'-chlorocinchonidine, crystallized from acetone-ether, had a melting point of 165–169° (softens 145°); $[\alpha]_D^{25}$ −67° (c. 0.90, ethanol). 7'-chlorocinchonine, crystallized from ethanol-acetone, had a melting point of 247–250°; $[\alpha]_D^{25}$ +196° (c. 0.88, ethanoldichloromethane, 4:1).

EXAMPLE 57

In a manner analogous to that of Examples 54 and 55, one can obtain:

7-methoxy-α(S)-[5(R)-ethyl-4(S)-quinuclidin-2(R)-yl]-4-quinolinemethanol, M.P. 231–233° and its racemate, M.P. 217–219°;

7-methoxy-α(R)-[5(R)-ethyl-4(S)-quinuclidin-2(S)-yl]-4-quinolinemethanol, M.P. 162–165° and its racemate, M.P. 160°;

6,7-dimethoxy-α(S)-[5(R)-ethyl-4(S)-quinuclidin-2(R)-yl]-4-quinolinemethanol, M.P. 116–118° and its racemate (dihydrochloride M.P. 221–225°);

6,7-dimethoxy-α(R)-[5(R)-ethyl-4(S)-quinuclidin-2(S)-yl]-4-quinolinemethanol (dihydrochloride M.P. 190–195°) and its racemate (dihydrochloride M.P. 208–210°);

6-methyl-α(S)-[5(R)-ethyl-4(S)-quinuclidin-2(R)-yl]-4-quinolinemethanol, racemate M.P. 153.5–155°;

6-methyl-α(R)-[5(R)-ethyl-4(S)-quinuclidin-2(S)-yl]-4-quinolinemethanol, racemate M.P. 216–218°;

6-chloro-α(S)-[5(R)-ethyl-4(S)-quinuclidin-2(R)-yl]-4-quinolinemethanol, M.P. 98–100°, and its racemate, M.P. 172.5–173.5°;

6-chloro-α(R)-[5(R)-ethyl-4(S)-quinuclidin-2(S)-yl]-4-quinolinemethanol, M.P. 196–198°, and its racemate, M.P. 100–102°;

6-methoxy-α(R)-[5(R)-ethyl-4(S)-quinuclidin-2(S)-yl]-4-quinolinemethanol, M.P. 172–173°, its antipode, M.P. 164–166°, and racemate, M.P. 173–175°;

6-methoxy-α(S)-[5(R)-ethyl-4(S)-quinuclidin-2(R)-yl]-4-quinolinemethanol, M.P. 169–170°, its antipode, M.P. 169–170°, and racemate, M.P. 152–154.5°;

6,7-methylenedioxy-α(R)-[5(R)-vinyl-4(S)-quinuclidin-2(S)-yl]-4-quinolinemethanol racemate, M.P. 224–225°;

6,7-methylenedioxy-α(S)-[5(R)-vinyl-4(S)-quinuclidin-2(R)-yl]-4-quinolinemethanol racemate, M.P. 228–229°;

6,7-methylenedioxy-α(R)-[5(R)-ethyl-4(S)-quinuclidin-2(S)-yl]-4-quinolinemethanol racemate, M.P. 232–233°;

6,7-methylenedioxy-α(S)-[5(R)-ethyl-4(S)-quinuclidin-2(R)-yl]-4-quinolinemethanol racemate, M.P. 234–235°;

6,8-dichloro-α(R)-[5(R)-ethyl-4(S)-quinuclidin-2(S)-yl]-4-quinolinemethanol racemate (M.P. of dihydrochloride 226–227°);

6,8-dichloro-α(S)-[5(R)-ethyl-4(S)-quinuclidin-2(R)-yl]-4-quinolinemethanol racemate, M.P. 172–173°.

EXAMPLE 58

Preparation of epimeric 6-methoxy-4-{3-[1-benzoyl-3(R)-vinyl-4(S)-piperidyl]-1ξ-bromo - 2 - oxopropyl}quinolines from 6-methoxy-4-{3-[1-benzoyl-3(R)-vinyl-4(S)-piperidyl]-2-oxopropyl}quinoline To a solution of 3.0 g. 6-methoxy-4-{3-[1-benzoyl-3(R)-vinyl-4(S)-piperidyl]2-oxopropyl}-quinoline in 300 ml. of dry carbontetrachloride in a 500 ml. Pyrex flask was added 1.72 g. of solid N-bromosuccinimide and a few crystals of dibenzoylperoxide and the mixture was irradiated by means of a 250-watt IR heating lamp with stirring. After irradiation for 90 min., the refluxing mixture was cooled, filtered, the filter cake washed with carbontetrachloride, and the combined filtrates were evaporated to dryness to give 3.9 g. of a crude amorphous mixture of epimeric 6-methoxy-4-{3-[1-benzoyl-3(R)-vinyl-4(S)-piperidyl}-1ξ-bromo-2-oxopropyl]quinolines.

EXAMPLE 59

Preparation of diastereomeric 6-methoxy-4-{3-[1-benzoyl-3(R)-vinyl-4(S)-piperidyl]-1ξ,2ξ- oxapropyl}quinolines from epimeric 6-methoxy-4-{3-[1-benzoyl-3(R)-vinyl-4(S)-piperidyl]-1ξ-bromo-2-oxopropyl}quinolines To a solution of 3.9 g. of the crude epimeric 6-methoxy-4-{3-[1-benzoyl-3(R)-vinyl - 4(S)-piperidyl]-1ξ-bromo-2-oxopropyl}quinolines in 300 ml. of methanol was added an excess of solid sodium borohydride. The solution was stirred at room temperature for 30 min., 50 ml. of water was added and stirring was continued for 12 hours. The methanol was evaporated, the aqueous residue was extracted thoroughly with dichloromethane and the organic extracts were washed ($H_2O$), dried ($Na_2SO_4$) and evaporated to give 2.7 g. of crude product which absorbed on 90 g. of neutral alumina, activity II. Elution with benzene containing 10–50 percent of ethyl acetate afforded 1.4 g. (40 percent calculated on the basis of ketone) of an amorphous inseparable mixture of the diastereomeric 6-methoxy-4-{3-[1-benzoyl-3(R)-vinyl-4(S)-piperidyl]-1ξ,2ξ-oxapropyl}quinolines; $[\alpha]_D^{25}$ +12.4° (c. 1.33, chloroform).

EXAMPLE 60

Preparation of diastereomeric 6-methoxy-4-{3-[3(R)-vinyl-4(S)-piperidyl]-1ξ,2ξ-oxopropyl}quinolines from diastereomeric 6-methoxy-4-{3-[1-benzoyl-3(R)-vinyl-4(S)-piperidyl]-1ξ,2ξ-oxopropyl}-quinolines To a stirred Dry Ice-cold solution of 1.2 g. of diastereomeric 6-methoxy-4-{3-[1-benzoyl-3(R)-vinyl-4(S)-piperidyl]-1ξ,2ξ-oxopropyl}-quinolines in 100 ml. of dry toluene in an atmosphere of dry nitrogen was added 2 ml. of a ca. 1.5 molar solution of diisobutyl aluminum hydride in toluene. Stirring was continued for 45 min. at −78°, 5 ml. of methanol-water (1:1) was added and the mixture was stirred for 90 min. at 20°. The precipitate was filtered off, washed with methanol, and the combined filtrates were evaporated to dryness. The crude product (1.1 g.) was separated by preparative layer chromatography (silica gel $GF_{254}$; chloroform:triethylamine:methanol 85:10:15) to give 0.578 g. (63 percent yield) of an amorphous inseparable mixture of the diastereomeric 6-methoxy-4-{3-[3(R)-vinyl-4(S)-piperidyl]-1ξ,2ξ-oxapropyl}-quinolines.

EXAMPLE 61

Preparation of quinine, quinidine, epiquinine, epiquinidine from a mixture of diastereomeric 6-methoxy-4-{3-[3(R)-vinyl-4(S)-piperidyl]-1ξ,2ξ-oxapropyl}-quinolines A solution of 0.356 g. of diastereomeric 6-methoxy-4-{3 - [3(R)-vinyl-4(S)-piperidyl]-1ξ,2ξ-oxapropyl}-quinolines in 50 ml. of toluene and 2 ml. of ethanol was heated under gentle reflux for 24 hours. The solvent was evaporated and the residue was separated by preparative thin layer chromatography to give: 0.49 g. of quinine [neutral (d)-tartrate: M.P. 207–209°, dec. >200°; $[\alpha]_D^{25}$ −153.3° (c. 0.90, methanol)]; 0.087 g. (24 percent) of quinidine [M.P. 171–172°; $[\alpha]_D^{25}$ +256.0° (c. 0.82, ethanol)]; 0.068 g. (18 percent) of epiquinine [neutral dibenzoyl-(d)-tartrate: M.P. 187–189°; $[\alpha]_D^{25}$ +67.7° (c. 0.93, ethanol-chloroform, 3:2)]; 0.065 g. (18 percent) of epiquinidine [neutral dibenzoyl-(d)-tartrate: M.P. 167–168°; $[\alpha]_D^{25}$ +2.4° (c. 0.90, ethanol-chloroform 4:1)].

EXAMPLE 62

Racemic trans 6-methoxy-4-[3-(1-benzoyl-3-ethyl-4-piperidyl)-2-oxopropyl]-quinoline from 6-methoxy-lepidyl lithium and racemic trans 1-benzoyl-3-ethyl-4-piperidineacetic acid ethyl ester To a Dry Ice cooled solution of about 0.053 mole of lithium diisopropyl amide (prepared by the addition of 10.9 ml. of diisopropyl amine to 26.5 ml. of 2 M n-butyl lithium in hexane at −70° in an atmosphere of dry nitrogen) was added dropwise (30 min.) with stirring a solution of 8.95 g. (0.0518 mole) of 6-methoxy-lepidine in 100 ml. of dry tetrahydrofurans. This was followed by stirring at the same temperature for additional 30 minutes. To the solution of 6-methoxy-lepidyl lithium was added dropwise (40 min.) a solution of 7.86 g. (0.0259 mole) of racemic trans 1-benzoyl-3-ethyl-4-piperidine acetic acid ethyl ester in 160 ml. dry tetrahydrofurans. The reaction mixture was then stirred at −70° for 90 minutes, Dry Ice was removed, and stirring continued for 30 minutes. After addition of 180 ml. of water and neutralization with acetic acid (∼pH 8), the resulted mixture was extracted thoroughly with methylene chloride. The organic phase was shaken with saturated sodium chloride solution, dried over sodium sulfate anhydrous and evaporated to give 17 g. of crude product. This crude product was chromatographed on a 500 g. alumina column. Elution gave 5.03 g. (∼45 percent) of oily yellow racemic trans 6-methoxy - 4[3-(1-benzoyl-3-ethyl-4-piperidyl)-2-oxopropyl]-quinoline.

EXAMPLE 63

Racemic, epimeric trans 6-methoxy-4-[3-(1-benzoyl-3-ethyl-4-piperidyl)-2ξ-hydroxypropyl]-quinolines from racemic trans 6-methoxy-4-[3-(1-benzoyl-3-ethyl-4-piperidyl)-2-oxopropyl]-quinoline To a stirred ice-cold solution of 4.82 g. (0.0112 mole) of racemic trans 6-methoxy-4-[3-(1-benzoyl-3-ethyl-4-piperidyl)-2-oxopropyl]-quinoline in 160 ml. 95% ethanol was added 0.455 g. of solid sodium borohydride. After stirring for 60 min., 0.093 g. additional sodium borohydride was added and the stirring was continued for 15 min. 50 ml. of water was then added and ethanol was removed by distillation. The aqueous residue was saturated with sodium chloride and extracted thoroughly with methylene chloride. The extract was dried over sodium sulfate anhydrous and evaporated to give 4.71 g. (93%) of crude oily racemic, epimeric trans 6-methoxy-4-[3-(1-benzoyl-3-ethyl-4-piperidyl)-2ξ-hydroxypropyl]-quinolines.

EXAMPLE 64

Racemic, epimeric trans 6-methoxy-4-[3-(3-ethyl-4-piperidyl)-2ξ-hydroxypropyl]-quinolines from racemic, epimeric trans 6-methoxy-4-[3-(1-benzoyl-3-ethyl-4-piperidyl)-2ξ-hydroxypropyl]-quinolines The solution of 4.71 g. of racemic epimeric trans 6-methoxy-4-[3-(1-benzoyl-3-ethyl-4-piperidyl)-2ξ-hydroxypropyl]-quinolines in 100 ml. 6 N hydrochloric acid was refluxed for 6½ hours and then neutralized to pH 8 with conc. ammonium hydroxide and extracted with methylene chloride. The extract was dried over sodium sulfate anhydrous and evaporated. The residue was purified by chromatography to give 3.50 g. (97 percent) of racemic epimeric trans 6-methoxy-4-[3-(3-ethyl-4-piperidyl)-2ξ-hydroxypropyl]-quinolines.

EXAMPLE 65

Racemic, epimeric trans 6-methoxy-4-[3-(3-ethyl-4-piperidyl)-2ξ-acetoxypropyl]-quinolines from racemic, epimeric trans 6-methoxy-4-[3-(3-ethyl-4-piperidyl)-2ξ-hydroxypropyl]-quinolines To the solution of 3.5 g. of racemic epimeric trans 6 - methoxy - 4 - [3 - (3-ethyl-4-piperidyl)-2ξ-hydroxypropyl]-quinolines in 120 ml. glacial acetic acid was added 12 ml. of freshly distilled boron trifluoride etherate and the mixture was kept at 47° for 19 hours. Acetic acid was removed by distillation and to the residue was added 100 ml. ice cold water. The aqueous solution thus obtained was neutralized with conc. ammonium hydroxide and extracted thoroughly with methylene chloride. The extract was washed with saturated sodium chloride, dried over sodium sulfate anhydrous and evaporated to dryness to give 3.31 g. (84 percent) of crude racemic, epimeric trans 6-methoxy-4-[3-(3-ethyl-4-piperidyl)-2ξ-acetoxypropyl]-quinolines.

EXAMPLE 66

Mixture of racemic 3-epi-desoxydihydroquinine and 3-epi-desoxydihydroquinidine from racemic, epimeric trans 6-methoxy - 4[3-(3-ethyl-4-piperidyl)-2$\xi$-acetoxypropyl]-quinolines To a solution of 3.31 g. of crude racemic, epimeric trans 6 - methoxy-4-[3-(3-ethyl-4-piperidyl)-2$\xi$-acetoxypropyl]-quinolines in 390 ml. benzene and 20 ml. glacial acetic acid was added 40 g. of sodium acetate trihydrate and heated with stirring under gentle reflux for 23½ hours. After addition of 270 ml. of ice water and neutralization with conc. ammonium hydroxide to pH~8, the mixture was separated. The aqueous phase was extracted thoroughly with methylene chloride, the extract was combined with benzene layer, dried over sodium sulfate anhydrous and evaporated. This gave 1.99 g. of crude product, which was purified by chromatography (150 g. alumina activity II, eluted with ethyl acetate and ethyl acetate-methanol 95:5) to give 1.8 g. (52%) of the mixture of 3-epi-desoxydihydroquinine and 3-epi-desoxydihydroquinidine.

EXAMPLE 67

Racemic 3-epi-dihydroquinine and racemic 3-epi-dihydroquinidine from the mixture of racemic 3-epi-desoxydihydroquinine and 3-epi-desoxydihydroquinidine A solution of 2.38 g. of a mixture of racemic 3-epi-desoxydihydroquinine and 3-epi-desoxydihydroquinidine in 125 ml. of dimethylsulfoxide-tert. butanol (4:1) was first stirred in an atmosphere of dry oxygen at 20° for several minutes, then 1.3 g. of solid potassium tert. butoxide was added. The uptake of oxygen was measured while the solution was stirred. After consumption of 199 ml. (approximately 1 molar equivalent) in the course of 13 minutes, the pH of the reaction mixture was adjusted to approximately 8 by addition of acetic acid and the solution was evaporated in vacuo. The residue was dissolved in 120 ml. of methylene chloride, washed with 10% aqueous sodium bicarbonate (2× 18 ml.) and water (1× 18 ml.), dried over sodium sulfate anhydrous and evaporated to dryness. The crude product was separated by preparative layer chromatography to give 0.82 g. (33%) of racemic 3-epi-dihydroquinine, M.P. 169–170° C. from ethanol-water; dihydrochloride, M.P. 228–231° (from ethanol) and racemic 3-epi-dihydroquinidine, M.P. 81–85° (from ethanol-water); dihydrochloride, M.P. 244° with decomposition (from ethanol).

EXAMPLE 68

Racemic trans 6,7-methylenedioxy-4-[3-(3-ethyl-4-piperidyl)-2-oxopropyl]-quinoline from 6,7-methylenedioxy-lepidine and racemic trans cincholoipon ethyl ester To a stirred, Dry-Ice-cold solution of about 0.042 mole of lithium diisopropyl amide (prepared by addition of 4.5 g. of diisopropyl amine to 27.5 ml. of about 1.6 molar n-butyllithium in hexane, at −78° under nitrogen) was added dropwise (20 minutes) a solution 6.64 g. of 6,7-methylenedioxylepidine in 150 ml. of anhydrous tetrahydrofuran, and the resulting suspension of 6,7-methylenedioxylepidyl lithium was stirred at −78° for 30 minutes. A solution of 3.52 g. of racemic trans cincholoipon ethyl ester in 150 ml. of anhydrous tetrahydrofuran was added dropwise (30 minutes), stirring was continued for 175 minutes at −78°, then at ambient temperature for 105 minutes. After the addition of 150 ml. of water, the aqueous phase was adjusted to a pH of about 8 with acetic acid, and extracted twice with 250 ml. of ether. The combined organic phases were extracted four times with 250 ml. of 7% sodium bicarbonate solution. The combined aqueous phases were extracted three times with 250 ml. of chloroform. The combined ether phases were reextracted with 7% sodium bicarbonate solution (ten times with 100 ml.) and thus obtained aqueous phases were extracted three times with 250 ml. of chloroform. All the chloroform phases were combined, dried over sodium sulfate anhydrous, and evaporated to give 3.9 g. (about 65%) of crude racemic trans 6,7-methylenedioxy-4-[3-(3-ethyl-4-piperidyl)-2-oxopropyl)-quinoline.

EXAMPLE 69

Racemic, epimeric trans 6,7-methylenedioxy-4-[3-(3-ethyl-4-piperidyl)-2-hydroxypropyl]-quinolines from racemic trans 6,7 - methylenedioxy-4-[3-(3-ethyl-4-piperidyl)-2-oxopropyl]-quinoline To a stirred, ice cold solution of 4.66 g. of racemic trans 6,7 - methylenedioxy-4-[3-(3-ethyl-4-piperidyl)-2-oxopropyl]-quinoline in 150 ml. of 95% ethanol was added 0.78 g. of solid sodium borohydride in portions. After stirring for 45 minutes, 75 ml. of water was added, and the ethanol was removed by distillation in vacuo. The aqueous residue was extracted thoroughly with dichloromethane, extracts were dried over sodium sulfate anhydrous, and evaporated to give 5.2 g. of crude racemic, epimeric trans 6,7-methylenedioxy-4-[3-(3-ethyl-4-piperidyl)-2-hydroxypropyl]-quinolines.

EXAMPLE 70

Racemic epimeric trans 6,7-methylenedioxy-4-[3-(3-ethyl-4-piperidyl)-2-acetoxypropyl]-quinolines from racemic epimeric trans 6,7 - methylenedioxy - 4-[3-(3-ethyl-4-piperidyl)-2-hydroxypropyl]-quinolines To a solution of 5.2 g. of crude racemic epimeric trans 6,7-methylenedioxy-4-[3-(3-ethyl-4-piperidyl)-2-hydroxypropyl]-quinolines in 182 ml. of glacial acetic acid was added 19.2 ml. of freshly distilled boron trifluoride etherate, and the solution was kept at 50° for 16 hours. Acetic acid was removed by distillation, 100 ml. ice-water was added, the aqueous solution was neutralized with conc. ammonium hydroxide to pH 8, and extracted thoroughly with dichloromethane. The organic extracts were dried over anhydrous sodium sulfate and evaporated to give about 5.2 g. of crude product. This crude product was chromatographed on 450 g. of silica gel column with eluting solvent chloroform-triethylamine 9:1 to give 4.4 g. of racemic epimeric trans 6,7-methylenedioxy-4-[3-(3-ethyl-4-piperidyl)-2-acetoxypropyl]-quinolines as an oil.

EXAMPLE 71

Racemic 6',7' - methylenedioxy - 3 - epi-desoxydihydrocinchonidine and racemic 6',7'-methylenedioxy-3-epi-desoxydihydrocinchonine from racemic epimeric trans 6,7 - methylenedioxy - 4 - [3-(3-ethyl-4-piperidyl)-2-acetoxypropyl]-quinolines To a solution of 4.4 g. of racemic epimeric trans 6,7-methylenedioxy - 4 - [3-(3-ethyl-4-piperidyl)-2-acetoxypropyl]-quinolines in about 500 ml. of benzene was added 26 ml. of glacial acetic acid and 59 g. of sodium acetate trihydrate. The resulting mixture was heated with stirring under gentle reflux for 40 hours. After cooling, 300 g. of ice water was added, the aqueous phase was neutralized with conc. ammonium hydroxide to pH of about 8, separated from the benzene layer, and extracted thoroughly with benzene. The combined organic phases were dried over sodium sulfate anhydrous and evaporated in vacuo to give 3.72 g. of crude product. This crude product was chromatographed on a 450 g. silica gel ($PF_{254}$—0.05–0.2 mm., 11:3) with eluting solvent chloroform-triethylamine 19:1 to give 0.8 g. (21%) of the mixture of racemic 6',7'-methylenedioxy - 3 - epi - desoxydihydrocinchonidine and racemic 6',7'-methylenedioxy-3-epi-desoxydihydro-cinchonine.

EXAMPLE 72

Racemic 6',7' - methylenedioxy-3-epi-dihydrocinchonidine and racemic 6',7'-methylenedioxy-3-epi-dihydrocinchonine from racemic 6',7'-methylenedioxy-3-epi-desoxydihydrocinchonidine and racemic 6',7'-methylenedioxy-3-epi-desoxydihydrocinchonine The reaction was carried out in a 250 ml. 3-neck flask connected with a gas burette and fitted with a gas outlet; an Erlenmeyer flask attached by means of a piece of gooch rubber, and a magnetic stirrer. A solution of 1.02 g. of a mixture of racemic 6',7'-methylenedioxy-3-epi-desoxydihydrocinchonidine and racemic 6',7'-methylenedioxy-3-epi-desoxydihydrocinchonine in 100 ml. of dimethylsulfoxide-tert. butanol (4:1) was first stirred in an atmosphere of dry oxygen at room temperature for several minutes. Then, 0.348 g. (0.0031 mole) of potassium t-butoxide and the resulting dark-reddish solution was stirred vigorously. The uptake of oxygen was measured. After rapid uptake of one molar equivalent of oxygen, the reaction turned to light brown and was quenched by addition of water. The solution was adjusted to about pH 6 with acetic acid, and evaporated to dryness in vacuo. The residue was dissolved in dichloromethane, washed with 7% sodium bicarbonate solution and water, dried over sodium sulfate anhydrous and evaporated. The crude product was fractionated by a combination of crystallization from methanol-acetone and preparative layer chromatography. It gave 0.3 g. of racemic 6',7' - methylenedioxy-3-epi-desoxydihydrocinchonidine; 29% yield; M.P. 282–283°; dihydrochloride, M.P. 233–235° (dec., from methanol) and 0.23 g. of racemic 6',7' - methylenedioxy - 3 - epi - desoxydihydrocinchonine; 23% yield; M.P. 202–204° from acetone; dihydrochloride, M.P. 195.5–198° (from methanol).

EXAMPLE 73

Racemic trans 7'-chloro-4-[3-(1-benzoyl-3-ethyl-4-piperidyl)-2-oxopropyl]-quinoline from 7-chlorolepidine and trans 1 - benzoyl - 3 - ethyl-4-piperidineacetic acid ethyl ester To a suspension of about 0.074 mole of lithium diisopropylamide [prepared by addition of 10 ml. of dry diisopropylamine to 37 ml. of about 0.2 molar solution of n-butyl lithium in hexane at −78° under nitrogen] was added dropwise to a solution of 13 g. of 7-chlorolepidine in 150 ml. of tetrahydrofuran, and the resulting mixture was stirred at −78° for 30 minutes. A solution of 11.2 g. of racemic 1-benzoyl-3-ethyl-4-piperidineacetic acid ethyl ester in 150 ml. of tetrahydrofuran was added dropwise (30 minutes), and the mixture was stirred at −78° for 60 minutes, then at ambient temperature for 90 minutes. 150 ml. of water was added, the aqueous layer was neutralized with acetic acid to pH about 8, separated from organic layer and extracted thoroughly with dichloromethane. The combined organic phases were dried over sodium sulfate anhydrous and evaporated to give 23.7 g. of crude reaction product which was adsorbed on 700 g. of neutral alumina, grade II; after elution of 8 g. of unreacted 7-chlorolepidine and 1.6 g. of trans 1-benzoyl-3-ethyl-4-piperidineacetic acid ethyl ester with benzene containing various amounts of ethyl acetate, elution with ethyl acetate afforded 11.0 g. of crystalline, racemic trans 7-chloro-4 - [3 - (3 - ethyl-4-piperidyl)-2-oxopropyl]-quinoline (69% yield).

EXAMPLE 74

Racemic, epimeric trans 7-chloro-4-[3-(1-benzoyl-3-ethyl-4-piperidyl)-2-hydroxypropyl]-quinolines from racemic 7-chloro - 4 - [3-(1-benzoyl-3-ethyl-4-piperidyl)-2-oxopropyl]-quinolines To an ice-cold solution of 21 g. of racemic 7-chloro-4-[3 - (1 - benzoyl - 3 - ethyl-4-piperidyl)-2-oxopropyl]-quinolines in 700 ml. of 95% ethanol was added in portions 2.1 g. of sodium borohydride with stirring. After stirring for 30 minutes, 50 ml. of water was added, the ethanol was stripped off, and the aqueous residue was extracted thoroughly with chloroform. The extract was dried and evaporated. 21 g. of crystalline racemic, epimeric trans 7 - chloro - 4 - [3-(1-benzoyl-3-ethyl-4-piperidyl)-2-hydroxypropyl]-quinolines were obtained.

EXAMPLE 75

Racemic, epimeric trans 7-chloro-4-[3-(3-ethyl-4-piperidyl)-2-acetoxypropyl]quinolines from racemic, epimeric trans 7-chloro-4-[3-(1-benzoyl-3-ethyl-4-piperidyl)-2-hydroxypropyl]-quinolines A solution of 20.4 g. of racemic, epimeric trans 7-chloro-4-[3-(1-benzoyl-3-ethyl - 4 - piperidyl) - 2 - hydroxypropyl]-quinolines in 250 ml. of 6 N aqueous hydrochloric acid was heated under gentle reflux for 28 hours. The cold solution was neutralized with conc. ammonium hydroxide (to pH about 9) and the aqueous phase was extracted thoroughly with chloroform-ethanol (9:1) to give after usual work-up 15 g. (over 95% yield) of a crude oil containing a mixture of racemic, epimeric trans 7-chloro - 4 - [3 - (3-ethyl-4-piperidyl)-2-hydroxypropyl]-quinolines and its dehydration product. The crude mixture was dissolved in 500 ml. of glacial acetic acid and 50 ml. of boron trifluoride etherate, the resulting solution was kept at 50° for 17 hours, then the acetic acid was evaporated in vacuo. The residue was treated with ice, the aqueous phase made alkaline with conc. ammonium hydroxide and extracted thoroughly with chloroform. Usual work-up afforded 16 g. of a mixture of racemic, epimeric trans 7-chloro-4 - [3 - (3 - ethyl-4-piperidyl)-2-actoxypropyl]-quinolines and the dehydration product as a yellow oil.

EXAMPLE 76

Racemic 7' - chloro-3-epi-desoxydihydrocinchonidine and racemic 7'-chloro-3-epi-desoxydihydrocinchonine from racemic, epimeric trans 7-chloro-4-[3-(3-ethyl-4-piperidyl)-2-acetoxypropyl]-quinolines A solution of 16 g. of racemic, epimeric trans 7-chloro-4 - [3-(3-ethyl-4-piperidyl)-2-acetoxypropyl]-quinolines in 1000 ml. of benzene containing 50 ml. of glacial acetic acid and 150 g. of sodium acetate trihydrate was heated under gentle reflux for 18 hours. To the cooled reaction mixture was added 200 ml. of water, the aqueous phase was made alkaline (pH about 9) by addition of conc. ammonium hydroxide and the phases were separated. The aqueous phase was extracted thoroughly with dichloromethane, and the combined organic phases were worked up as usual. The crude product (about 15 g.) was absorbed on 500 g. of neutral alumina, grade II. Elution with benzene afforded the mixture of racemic 7'-chloro-3-epi-desoxydihydrocinchonidine and racemic 7'-chloro-3-epi-desoxydihydrocinchonine.

EXAMPLE 77

Racemic 7'-chloro-3-epi-dihydrocinchonidine and racemic 7' - chloro - 3-epi-dihydrocinchonine from a mixture of racemic 7'-chloro-3-epi-desoxydihydrocinchonidine and racemic 7'-chloro-3-epi-desoxydihydrocinchonine 13 g. of a mixture of racemic 7'-chloro-3-epi-desoxydihydrocinchonidine and racemic 7'-chloro-3-epi-desoxydihydrocinchonine was oxygenated in two batches as follows: to about a 0.1 M solution in anhydrous dimethylsulfoxide-tert.-butanol (4:1) was added 1.25 molar equivalents of anhydrous potassium t-butoxide and the resulting dark-reddish solution was stirred vigorously in an atmosphere of dry oxygen while the gas consumption was measured. After the rapid uptake of one molar equivalent of oxygen, the reaction was quenched by addition of water, the solution was neutralized with acetic acid to pH about 6, the solvents stripped in vacuo, and the residue was partitioned between dichloromethane and 10% sodium bicarbonate.

The crude product was crystallized from acetonitrile and the mother liquors purified by preparative layer chromatography (silica-gel GF$_{254}$; chloroform-triethyl-amine-methanol 89:10:1) to give 9.8 g. of a mixture, which was fractionated as follows. Racemic 7'-3-epi-dihydrocinchonidine was separated from this mixture by crystallization from absolute ethanol; total yield, including the additional amount obtained from separation of mother liquors by preparative layer chromatography, was 4.76 g. or 35%; after recrystallization from chloroform-ethanol; M.P. 28–230°. Dihydrochloride, crystallized from methanol-ether, M.P. 214–216° dec. And, racemic 7'-chloro-3-epi-dihydrocinchonine obtained by crystallization from dichloromethaneacetone, and purification of mother liquors by preparative layer chromatography, 3.21 g. (24%), M.P. 211–213°. Dihydrochloride, crystallized from methanol-ether, M.P. 222–224° dec.

EXAMPLE 78

Racemic trans 7' - trifluoromethyl - 4-[3-(3-ethyl-4-piperidyl) - 2 - oxopropyl]-quinoline from 7-trifluoromethyllepidine and racemic trans cincholoipon ethyl ester To a stirred, Dry-Ice cold solution of about 0.1 mole of lithium diisopropyl amide (prepared by addition of 11 g. of diisopropyl amine to 62.5 ml. of about 1.6 molar n-butyllithium in hexane, at —78° under nitrogen) was added dropwise (28 min.) a solution of 21 g. of 7-trifluoromethyllepidine in 250 ml. of tetrahydrofuran anhydrous, and the resulting red-orange solution of 7-trifluoromethyllepidyl lithium was stirred for 25 min. at —78° under nitrogen. A solution of 10 g. of racemic cincholoipon ethyl ester in 250 ml. of tetrahydrofuran was added dropwise (33 min.), stirring was continued for 2½ hours at —78°, then 18½ hours at —25°. This was followed by addition of 10 ml. of saturated sodium sulfate solution to hydrolyze the resulting lithium enolate. After drying over sodium sulfate anhydrous, the mixture was evaporated. The residue was taken in 500 ml. of chloroform, washed twice with 50 ml. of water, dried over sodium sulfate anhydrous and evaporated. The crude product was chromatographed on a 450 g. silica gel column to give 9.70 g. (55 percent) of racemic trans 7'-trifluoromethyl-4-[3-(3-ethyl-4-piperidyl)-2-oxopropyl]-quinoline as yellow oil.

EXAMPLE 79

Racemic, epimeric trans 7'-trifluoromethyl-4-[3-(3-ethyl-4-piperidyl)-2-hydroxypropyl]-quinolines from racemic trans 7' - trifluoromethyl - 4-[3-(3-ethyl-4-piperidyl)-2-oxopropyl]-quinoline To a stirred, ice cold solution of 9.75 g. of racemic trans 7' - trifluoromethyl - 4 - [3-(3-ethyl-4-piperidyl)-2-oxopropyl]-quinoline in 300 ml. of 95 percent ethanol was added 1.5 g. of sodium borohydride in portions. After stirring for 1½ hours 100 ml. of water was added and ethanol was removed in vacuo. The aqueous residue was saturated with sodium chloride and thoroughly extracted with chloroform. The chloroform extract was dried over sodium sulfate anhydrous and evaporated to give 9.45 g. (96.5 percent) of crude racemic epimeric trans 7'-trifluoromethyl 4-[3-(3-ethyl-4-piperidyl)-2-hydroxypropyl]-quinoline.

EXAMPLE 80

Racemic, epimeric trans 7'-trifluoromethyl-4-[3-(3-ethyl-4-piperidyl)-2-acetoxypropyl]-quinolines from racemic, epimeric trans 7' - trifluoromethyl-4-[3-(3-ethyl-4-piperidyl)-2-hydroxypropyl]-quinolines To a solution of 9.45 g. of crude racemic, epimeric trans 7' - trifluoromethyl - 4-[3-(3-ethyl-4-piperidyl)-2-hydroxypropyl]-quinolines in 290 ml. of glacial acetic acid was added 29 ml. of freshly distilled boron trifluoride etherate, and the resulting mixture was kept at 50° for 16 hours. The acetic acid was removed by distillation in vacuo, and after addition of 150 g. of ice-water, the aqueous solution was adjusted to pH 8 with conc. ammonium hydroxide and extracted thoroughly with dichloromethane. This extract was dried over sodium sulfate anhydrous and evaporated to dryness. It gave 10.63 g. of crude racemic, epimeric trans 7' - trifluoromethyl - 4 - [3-(3-ethyl-4-piperidyl)-2-acetoxypropyl]-quinolines as a viscous oil.

EXAMPLE 81

Racemic 7' - trifluoromethyl-3-epi-desoxydihydrocinchonidine and racemic 7'-trifluoromethyl-3-epi-desoxydihydrocinchonine from racemic, epimeric trans 7'-trifluoromethyl - 4 - [3-(3-ethyl-4-piperidyl)-2-acetoxypropyl]-quinolines To a solution of 10.14 g. of crude racemic epimeric trans 7' - trifluoromethyl-4-[3-(3-ethyl-4-piperidyl)-2-acetoxypropyl]-quinolines in 1 l. of benzene was added 50 ml. of glacial acetic acid and 120 g. of sodium acetate trihydrate, and the resulting mixture was heated with stirring under reflux for 22 hours. After cooling, 600 g. of ice-water was added, the pH was adjusted to about 8 with conc. ammonium hydroxide. The aqueous phase was extracted thoroughly with dichloromethane. The combined organic phases were dried over sodium sulfate anhydrous and evaporated to give 8.53 g. of crude reaction product. The crude product was chromatographed on a 450 g. silica gel column. Elution with 9:1 chloroform triethyl amine afforded 3.48 g. (about 40 percent) of an amorphous mixture of racemic 7'-trifluoromethyl-3-epi-desoxydihydrocinchonidine and racemic 7'-trifluoromethyl-3-epi-desoxydihydrocinchonine.

EXAMPLE 82

Racemic 7'-trifluoromethyl-3-epi-dihydrocinchonidine and racemic 7' - trifluoromethyl - 3 - epi-dihydrocinchonine from racemic 7' - trifluoromethyl-3-epi-desoxydihydrocinchonidine and racemic 7'-trifluoromethyl-3-epi-desoxydihydrocinchonine The reaction was carried out in a 250 ml. 3-neck flask connected with a gas burette and fitted with a gas outlet; an Erlenmeyer flask attached by means of a piece of gooch rubber, and a magnetic stirrer. A solution of 3.48 g. of a mixture of racemic 7'-trifluoromethyl-3-epi-desoxydihydrocinchonidine and racemic 7'-trifluoromethyl-3-epi-desoxydihydrocinchonine in 170 ml. of dimethylsulfoxide-t-butanol (4:1) was added 1.69 g. of potassium t.-butoxide and the resulting solution was stirred vigourously under an atmosphere of dry oxygen. The uptake of oxygen was 1.2 mole-equivalent. The reaction mixture turned to light brown and was quenched by the addition of water. The resulting solution was neutralized with acetic acid and the solvents were stripped in vacuo. The residue was dissolved in 500 ml. of dichloromethane, washed with 7 percent aqueous solution of sodium bicarbonate (3× 25 ml.) and water (1× 25 ml.), dried over sodium sulfate anhydrous and evaporated. The crude products were separated by column chromatography [silica gel PF$_{254}$—0.2–0.05 (1:3) eluted with chloroform-triethyl aminemethanol 85:10:5] to give 1.4 g. (39 percent) of racemic 7'-trifluoromethyl-3-epi-dihydrocinchonidine, M.P. 192–193.5° (from acetone). And, 1.04 g. (29 percent) of racemic 7'-trifluoromethyl - 3-epi-dihydrocinchonine, M.P. 182–184° (from acetone).

EXAMPLE 83

6 - chloro - 4{3-[1-benzoyl-3(R)-vinyl-4(S)-piperidyl]-2-oxopropyl}-quinoline from 6-chlorolepidine and N-benzoylmeroquinene ethyl ester To a solution of about 0.166 mole of lithium diisopropylamide (prepared by addition of 23 ml. of diisopropyl amine in 50 ml. of toluene to 74 ml. of ca. 2.2 molar n-butyllithium in hexane, at —78° under nitrogen) was added dropwise (10 min.) a solution of 29.4 g. of 6-chlorolepidine in 250 ml. of anhydrous tetrahydrofuran, and the resulting mixture was stirred at —78° for 30 min.

A solution of 37.3 g. of N-benzoylmeroquinene ethyl ester in 240 ml. of anhydrous tetrahydrofuran was added dropwise (60 min.), stirring was continued for 60 min. at −78°, then at ambient temperature for 2 hrs. 150 ml. of water was added, the aqueous layer was neutralized (pH about 8) with acetic acid separated from the organic layer and extracted twice with 25 ml. of ether. The combined organic phases were washed (brine), dried (magnesium sulfate) and evaporated in vacuo. The residue (66 g.) was absorbed on 2 kg. of neutral alumina, activity II and separated into the following fractions: 16.2 g. of 6-chlorolepidine (benzene), 13.6 g. of N-benzoylmeroquinene ethyl ester (benzene-ethyl acetate 98:2, neutral material), 6.6 g. of phenyl-(6-chloro-4-quinolyl)methyl ketone (M.P. 135–136°; benzene-ethyl acetate 98:2; acid soluble material) and 24.3 g. (46% yield) of amorphous 6-chloro-4-{3 - [1 - benzoyl-3(R)-vinyl-4(S)piperidyl]-2-oxopropyl}-quinoline (ethyl acetate).

EXAMPLE 84

Epimeric 6 - chloro - 4-{3-[3(R)-vinyl-4-(S)-piperidyl]-2-hydroxypropyl}-quinolines from 6 - chloro-4-{3-[1-benzoyl-3(R)-vinyl-4(S)-piperidyl]-2-oxopropyl}quinoline To a stirred, ice cold solution of 27.2 g. of 6-chloro-4-{3 - [benzoyl - 3(R)-vinyl-4(S)-piperidyl]-2-oxopropyl}-quinoline in 500 ml. of 95% ethanol was added 24 g. of solid sodium borohydride in portions. After stirring for 60 min., 100 ml. of water was added, and the ethanol was removed in vacuo. The aqueous residue was extracted thoroughly with dichloromethane, extracts dried (sodium sulfate) and evaporated to give 27 g. of crude alcohol. The dried product was dissolved in 500 ml. of absolute toluene, the resulting solution was cooled to −78°, and 92 ml. of about 1.5 M diisobutyl aluminum hydride in toluene was added dropwise (15 min.). The homogeneous solution was stirred at −78° for 60 min., 20 ml. of 50% aqueous methanol was added, and stirring was continued at ambient temperature for 60 min. The inorganic precipitate was filtered off, washed with methanol, and the combined filtrates evaporated to dryness. The residue was partitioned between ether and 1 N hydrochloric acid, the acidic aqueous phase was made alkaline with conc. NaOH, and extracted thoroughly with dichloromethane, the organic extracts were washed (brine), dried (sodium sulfate) and evaporated to give 21.6 g. of amorphous epimeric 6 - chloro - 4-{3-[3(R)-vinyl-4(S)-piperidyl]-2-hydroxypropyl} - quinolines. Neutral dibenzoyl-(d)-tartrate (21.6 g.): M.P. 173–174° (cryst. from dichloromethane-acetone); $[\alpha]_D^{22}$ −27.6° (c. 0.98, methanol). From the mother liquors of the free base was recovered additional 1.9 g. of pure epimeric 6-chloro-4-{3-[3(R)-vinyl-4(S)-piperidyl]-2-hydroxypropyl}-quinolines after purification on an alumina column; total yield 76%.

EXAMPLE 85

6'-chlorodesoxycinchonidine and 6'-chlorodesoxycinchonine from epimeric 6 - chloro - 4-{3-[3(R)-vinyl-4(S)-piperidyl]-2-hydroxypropyl}-quinolines To a solution of 17.8 g. of epimeric 6-chloro-4-{3-[3-(R)-vinyl-4(S)-piperidyl]-2-hydroxypropyl}-quinolines in 800 ml. of glacial acetic acid was added 80 ml. of freshly distilled boron trifluoride etherate, and the solution was kept at 50° for 15 hours. The acetic acid was stripped off, ice-water was added, the aqueous solution was neutralized with conc. ammonium hydroxide to pH about 8, and extracted thoroughly with dichloromethane. The organic extracts were washed (water), dried (sodium sulfate) and evaporated to dryness to give about 20 g. of epimeric 6-chloro-4-{3-[3-(R)-vinyl-4(S)-piperidyl] - 2 - acetoxypropyl}-quinolines, as a crude, viscous oil.

To the solution of the crude product in 1 l. of benzene was added 50 ml. of glacial acetic acid, and 150 g. of sodium acetate trihydrate, and the resulting mixture was heated with stirring under gentle reflux for 18 hours. After cooling, 200 ml. of ice-water was added, the pH was adjusted to ca. 8 with conc. ammonium hydroxide, the phases were separated, and the aqueous phase was extracted thoroughly with dichloromethane. The combined organic layers were dried (sodium sulfate) and evaporated in vacuo to give 18.6 g. of crude reaction product, which was absorbed on 600 g. of neutral alumina, activity II. Elution with ethyl acetate afforded 11.6 g. of an inseparable amorphous mixture of 6'-chlorodesoxycinchonidine and 6'-chlorodesoxycinchonine; elution with methanol gave about 5.6 g. of more polar material which, after combination with 1.9 g. of additional epimeric 6 - chloro-4-{3-[3-(R)-vinyl-4(S)-piperidyl]-2-acetoxypropyl}-quinolines and treatment under the same conditions, afforded additional 4 g .of an amorphous mixture of 6'-chlorodesoxycinchonidine and 6'-chlorodesoxycinchonine; total yield: 15.6 g., about 80%.

EXAMPLE 86

6'-chlorocinchonidine and 6'-chlorocinchonine from 6'-chlorodesoxycinchonidine and 6'-chlorodesoxycinchonine 15.6 g. of a mixture of 6'-chlorodesoxycinchonidine and 6'-chlorocinchonine was hydroxylated in two batches as follows: to about 0.1 M solution in dimethylsulfoxide-t-butanol (4:1) is added 1.5 molar equivalent of dry potassium t-butoxide and the resulting dark-reddish solution is stirring vigorously in an atmosphere of dry oxygen. After rapid uptake of one molar equivalent of oxygen, the reaction (color turned to light brown) is quenched by addition of water. The solution is neutralized (pH about 6) with acetic acid, the solvents are stripped in vacuo, and the residue is partitioned between dichloromethane and 10% sodium bicarbonate.

The crude products obtained from the organic phases after drying (sodium sulfate) and evaporation, were separated by a combination of fractional crystallization and preparative layer chromatography. 6'-chlorocinchonidine (5.3 g.; 32%), obtained in pure form by crystallization of the crude mixture from ethanol and by preparative layer chromatography of mother liquors (silica gel GF$_{254}$; chloroform-triethylamine=9:1); after recrystallization from acetonitrile; M.P. 193–194°; $[\alpha]_D^{25}$ −127.8° (c. 0.98, methanol). Dihydrochloride, crystallized from ethanol-acetone as sesquihydrate: M.P. 181–183°; $[\alpha]_D^{25}$ −143.5° (c. 0.98, methanol). 6'-chlorocinchonine (5.5 g.; 33% yield), obtained by crystallization from acetone of mixtures enriched with 6'-chlorocinchonine and by preparative layer chromatography of mother liquors (silica gel GF$_{254}$; chloroform - triethylamine=9:1); after recrystallization from acetone: M.P. 154–155°; $[\alpha]_D^{25}$ +210.8° (c. 1.13, methanol). Dihydrochloride, crystallized from methanol-acetone at three quarter hydrate: M.P. 183–184°; $[\alpha]_D^{25}$ +200.6° (c. 1.01, methanol).

EXAMPLE 87

6'-chlorodihydrocinchonidine from 6'-chlorocinchonidine

To a solution of 2.39 g. of 6'-chlorocinchonidine in 100 ml. of absolute methanol was added 1.5 g. of 99% hydrazine hydrate (4 molar equivalents) and about 20 mg. of cupric acetate. The mixture was stirred in an open flask at 20° for 3 days, filtered through celite, the filtrate evaporated and the crude product was crystallized from acetonitrile to give 1.9 g. of crystalline 6'-chlorodihydrocinchonidine; after recrystallization from acetonitrile: M.P. 196–197°; $[\alpha]_D^{25}$ −111.9° (c. 0.94, methanol). Dihydrochloride, crystallized from ethanol-acetone: M.P. 215–216° (dec.); $[\alpha]_D^{25}$ −115° (c. 1.02 methanol).

EXAMPLE 88

6'-chlorodihydrocinchonine from 6'-chlorocinchonine

To a solution of 1.3 g. of 6'-chlorocinchonine in 50 ml. of absolute methanol was added 0.8 g. of 99% hydrazine hydrate (4 molar equivalents) and about 10 mg. of cupric acetate.

The mixture was stirred in an open flask for 3 days at 20°, filtered through celite, the filtrate was evaporated, and the crude product crystallized from acetone. The first crop (0.49 g.) was combined with mother liquors purified by prep. layer chromatography and recrystallized from acetone to give 0.94 g. (about 72% yield) of 6'-chlorodihydrocinchonine; M.P. 98–100°; $[\alpha]_D^{25}$ +185.2° (c. 1.0, methanol); dihydrochloride, crystallized from ethanol-acetone as three quarter hydrate: M.P. 172–174°; $[\alpha]_D^{25}$ +171° (c. 0.94, methanol).

EXAMPLE 89

Racemic cis-7-trifluoromethyl-4-[3-(3-ethyl-4-piperidyl)-2-oxopropyl]-quinoline from 7-trifluoromethyllepidine and cis-3-ethyl-4-piperidine acetic acid methyl ester To a Dry Ice cooled solution of about 0.206 mol of lithium diisopropylamide (prepared by addition of 13 ml. of diisopropylamine to 130 ml. of ca. 1.6 M n-butyl lithium in hexane, at −78° in an atmosphere of dry nitrogen) was added dropwise (20 min.) with stirring a solution of 43.5 g. of 7-trifluoromethyllepidine in 150 ml. of tetrahydrofuran. The brownish mixture containing 7-trifluoromethyllepidyl lithium was stirred at −78° for 30 min., then a solution of 19.0 g. of racemic cis 3-ethyl-4-piperidine acetic acid methyl ester in 140 ml. of tetrahydrofuran was added dropwise (60 min.). Stirring at −78° was continued for 1 hr., then at −25° for 5 hours. 1 N aqueous hydrochloric acid was added to pH 7, and the resulting mixture was extracted thoroughly with ether (to remove unreacted 7-trifluoromethyllepidine), the ethereal phases washed 3 times with water containing 5% of methanol. The combined aqueous phases were basified by addition of conc. ammonium hydroxide, saturated with sodium chloride, and extracted thoroughly with chloroform. Usual work-up gave about 30 g. of a viscous yellow oil which was converted to the dihydrochloride. Crystallization from ethanol afforded 26.4 g. of racemic cis-7-trifluromethyl - 4 - [3-(3-ethyl-4-piperidyl)-2-oxopropyl]-quinoline dihydrochloride. The free base of the mother liquor was absorbed on 500 g. of silica gel Merck, 0.05–0.2 mm., and elution with chloroform-methanol-ammonia 89:10:1 afforded another 3.2 g. of racemic cis-7-trifluoromethyl-4-[3-(3-ethyl - 4 - piperidyl)-2-oxopropyl]-quinoline (total yield 66%).

EXAMPLE 90

Mixture of racemic 7'-trifluoromethyl-desoxydihydrocinchonidine and racemic 7'-trifluoromethyl-desoxydihydrocinchonine from racemic cis 7-trifluoromethyl-4-[3-(3-ethyl-4-piperidyl)-2-oxopropyl]-quinoline To an ice cooled solution of 14.6 g. of racemic cis 7-trifluoromethyl - 4 - [3 - (3 - ethyl - 4 - piperidyl) - 2-oxopropyl]-quinoline in 200 ml. of ethanol was added 1.5 g. of solid sodium borohydride. After stirring for 15 min., 100 ml. of water was added, and the ethanol was evaporated in vacuo. The aqueous residue was extracted thoroughly with chloroform, and usual work-up gave about 15 g. of amorphous, racemic epimeric cis 7-trifluoromethyl - 4 - [3 - (3 - ethyl - 4 - piperidyl) - 2 - hydroxypropyl]-quinolines. This crude product was dissolved in 500 ml. of glacial acetic acid, 50 ml. of boron trifluoride etherate was added, and the homogeneous solution was kept at 50° for 18 hours. The solvent was stripped in vacuo, and the residue was partitioned between aqueous ammonium hydroxide and chloroform to give, after usual workup, about 16 g. of the amorphous, racemic epimeric cis-7-trifluoromethyl-4-[3-(3-ethyl-4-piperidyl)-2-acetoxypropyl]-quinolines. Without further purification, this epimeric mixture was heated under gentle reflux for 17 hours in 1 l. of benzene containing 50 ml. of acetic acid and 150 g. of sodium acetate trihydrate. To the cold mixture was added 20 ml. of ice-water, the aqueous phase was neutralized with conc. ammonium hydroxide to pH of about 8, then separated from the benzene layer, and extracted thoroughly with chloroform. The combined organic layers were washed with water, dried over sodium sulfate and evaporated to dryness to give about 15 g. of crude product. Absorption on 540 g. of neutral alumina, activity II, and elution with ethyl acetate afforded about 10 g. of a mixture of racemic 7'-trifluoromethyldesoxydihydrocinchonidine and racemic 7'-trifluoromethyldesoxydihydrocinchonine and elution with methanol gave about 3 g. of a mixture of starting material and product, which was subject to the same conditions of cyclization and workup. The combined products were further purified by partition between 1 N aqueous hydrochloric acid and dichloromethane, and extraction of the basified aqueous phase with dichlomethane followed by usual workup. Total yield 12.7 g. (90%) of a crystalline mixture of racemic 7' - trifluoromethyldesoxydihydrocinchonidine and racemic 7'-trifluoromethyldesoxydihydrocinchonine; after recrystallization from ether-petroleum ether: M.P. 85–86°.

EXAMPLE 91

Racemic 7'-trifluoromethyldihydrocinchonidine and racemic 7'-trifluoromethyldihydrocinchonine from a mixture of racemic 7'-trifluoromethyldesoxydihydrocinchonidine and racemic 7'-trifluoromethyldesoxydihydrocinchonine The reaction was carried out in a 500 ml., 3-necked flask connected with a gas burette and fitted with a gas outlet, an erlenmeyer flask attached by means of a piece of gooch rubber, and a magnetic stirrer. A solution of 12.3 g. of a mixture of racemic 7'-trifluoromethyldesoxydihydrocinchonidine and racemic 7'-trifluoromethyldesoxydihydrocinchonine in 300 ml. of anhydrous dimethylsulfoxide-t-butanol (4:1) was first stirred in an atmosphere of dry oxygen at 20° for several minutes (no $O_2$ uptake observed), then 2 g. (about 0.5 molar equivalent) of solid potassium t-butoxide was added in one batch. The resulting reddish solution was stirred while uptake of oxygen was measured. After consumption of 800 ml. of oxygen (about 1 molar equivalent; after about 30 min.) 50 ml. of water was added, and the pH was adjusted to ca. 7 by addition of acetic acid. The reaction mixture was evaporated to dryness in vacuo, the residue was partitioned between dichloromethane and 1 N aqueous hydrochloric acid, the latter phase was neutralized with conc. ammonium hydroxide (pH ca. 8), and extracted thoroughly with chloroform. Usual workup afforded 12.8 g. of crude, crystalline product. Crystallization from dichloromethane-acetone afforded 5.21 g. of predominantly racemic 7'-trifluoromethyldihydrocinchonine in two crops. The mother liquors were converted to the hydrochloride, and crystallization from ethanol afforded 3.81 g. of predominantly racemic 7'-trifluoromethyldihydrocinchonidine as monohydrochloride. The free base of the mother liquors was absorbed on 400 g. of Merck silica gel, 0.05–0.2 mm., and elution with chloroform - triethylamine-methanol (89:10:1) afforded in the following sequence: 1.3 g. of a mixture of racemic threo bases, 0.4 g. of racemic 7'-trifluoromethyldihydrocinchonine and 1.1 g. of racemic 7'-trifluoromethyldihydrocinchonidine.

Racemic 7'-trifluoromethyldihydrocinchonidine, total yield about 35%; after crystallization and recrystallization from acetone, M.P. 175–176°. Monohydrochloride: 265–267°, dec., racemic 7'-trifluoromethyl-dihydrocinchonine, total yield 40%; after recrystallization from dichloromethane-acetone, M.P. 218–219°.

EXAMPLE 92

Racemic cis 7-chloro-4-[3-(3-ethyl-4-piperidyl)-2-oxopropyl]-quinoline from 7-chlorolepidine and racemic cis-3-ethyl-4-piperidine acetic acid methylester.

To a Dry Ice cooled solution of about 16 mmol of lithium diisopropylamide (prepared by addition of 2.2 ml. of diisopropylamine to 10 ml. of about 1.6 M n-butyl lithium in hexane, at —78° in an atmosphere of dry nitrogen) was added dropwise over a period of 10 min. with stirring 2.8 g. (16 mmol) of 7-chlorolepidine in 25 ml. of tetrahydrofuran. The brownish mixture containing the lepidyl lithium was stirred at —78° for 20 min., then a solution of 1.4 g. of racemic cis-3-ethyl-4-piperidine acetic acid methyl ester in 25 ml. of tetrahydrofuran was added dropwise over a period of 15 min. Stirring at —78° was continued for 60 min., then at ambient temperature for 2½ hours. 1 N aqueous hydrochloric acid was added until the mixture was neutral, the pH was then adjusted to about 7.5 by addition of 10% aqueous sodium bicarbonate solution, and the aqueous layer was extracted thoroughly with ether to remove the excess 7-chlorolepidine. The aqueous phase was then saturated with sodium chloride, and extracted thoroughly with chloroform-ethanol (95:5). Usual workup afforded 2.6 g. of crude crystalline product, which was recrystallized from isopropanol to give 2.13 g. (72%) of racemic cis 7-chloro-4-[3-(3-ethyl-4-piperidyl)-2-oxopropyl]-quinoline as its monohydrochloride; after further recrystallization from isopropanol ether it had a M.P. of 215–216°.

EXAMPLE 93

Racemic, epimeric cis 7-chloro-4-[3-(3-ethyl-4-piperidyl)-2-hydroxypropyl]-quinolines from 7-chlorolepidine and racemic cis-3-ethyl-4-piperidine acetic acid methyl ester 1.5 g. of racemic cis-3-ethyl-4-piperidine acetic acid methyl ester was condensed with 7-chlorolepidine using the identical reaction conditions described in Example 62. The reaction was worked up as follows: excess of alcoholic aqueous sodium borohydride solution was added to the reaction mixture, and the resulting mixture was kept at 20° overnight. The mixture was then neutralized and the excess borohydride destroyed by addition of acetic acid (to pH of about 8), and the solvents were removed in vacuo. The residue was partitioned between ether (to separate unreacted 7-chlorolepidine) and water containing 5% of methanol, the latter phase was then saturated with sodium chloride and extracted thoroughly with chloroform-ethanol 95:5. Usual workup afforded 2.06 g. of crude racemic, epimeric cis 7-chloro-4-[3-(3-ethyl-4-piperidyl-2-hydroxypropyl]-quinolines (crude yield 77%). A sample was converted to the monohydrochloride, and recrystallized from methanol: M.P. 199–201°.

EXAMPLE 94

Mixture of racemic 7'-chlorodesoxydihydrocinchonidine and racemic 7'-chlorodesoxydihydrocinchonine from racemic, epimeric cis-7-chloro-4-[3-(3-ethyl-4 - piperidyl)-2-hydroxypropyl]-quinolines To a solution of 9.0 g. of racemic, epimeric cis 7-chloro-4-[3-(3-ethyl-4-piperidyl)-2-hydroxypropyl]-quinolines in 250 ml. of acetic acid was added 25 ml. of boron trifluoride etherate and the homogeneous solution was kept at 50° for 17 hrs. The solvent was stripped in vacuo, ice-water was added to the residue. The aqueous phase was neutralized (to pH of about 8) by addition of conc. ammonium hydroxide and extracted thoroughly with chloroform. The organic extracts were dried over sodium sulfate, evaporated in vacuo, and the crude product was heated under gentle reflux for 17 hours in 500 ml. of benzene in presence of 50 ml. of acetic acid and 24 g. of sodium trihydrate. Ice-water was added to the cold reaction mixture, the pH was adjusted to about 8 by addition of conc. ammonium hydroxide, and the organic layer was separated. The aqueous phase was extracted thoroughly with chloroform, and the combined organic layers were worked up. The crude product was adsorbed on 270 g. of neutral alumina, activity II and the fractions eluted with ethylacetic were dissolved in 1 N aqueous hydrochloric acid and washed thoroughly with dichloromethane. The aqueous layer was neutralized (to pH of about 8) by addition of conc. ammonium hydroxide, and extracted thoroughly with dichloromethane to give, after usual work up, 8.3 g. (95% yield) of an amorphous mixture of racemic 7'-chlorodesoxydihydrocinchonidine and racemic 7'-chlorodesoxydihydrocinchonine.

EXAMPLE 95

Racemic 7' - chlorodihydrocinchonidine and racemic 7'-chlorodihydrocinchonine from a mixture of racemic 7'-chlorodesoxydihydrocinchonidine and racemic 7'-chlorodesoxydihydrocinchonine A total of 13.4 g. of a mixture of racemic 7'-chlorodesoxydihydrocinchonidine and racemic 7'-chlorodesoxydihydrocinchonine was oxygenated in three batches as follows: 0.07 M solutions in dimethylsulfoxide-t-butanol (4:1) were stirred at 20° under normal pressure in an atmosphere of dry oxygen in presence of 1 to 2 molar equivalent of potassium-t-butoxide until one molar equivalent of oxygen was consumed. The reactions were quenched by addition of water followed by neutralization with acetic acid. The solvents were stripped in vacuo, the residues dissolved in chloroform-ethanol 95:5, washed with 10% sodium bicarbonate and water and concentrated to dryness. The combined, crystalline, slightly soluble, crude products were repeatedly crystallized as follows: (1) dissolution in boiling chloroform-ethanol, removal of the chloroform by distillation, and crystallization of the less soluble racemic 7'-chlorodihydrocinchonine (4.17 g.; 30%) from hot ethanol; (2) conversion of the mother liquors to the hydrochlorides and crystallization of racemic 7'-chlorodihydrocinchonidine as the less soluble dihydrochloride (4.03 g.; 24%) from ethanol; racemic 7'-chlorodihydrocinchonidine; after recrystallization from dichloromethane-acetone, M.P. 192–193; the dihydrochloride after recrystallization from ethanol had a M.P. 216–219°; racemic 7'-chlorodihydrocinchonine, after recrystallization from chloroform-ethanol, M.P. 251–253°; dihydrochloride, after recrystallization from ethanol, M.P. 207–210°.

EXAMPLE 96

Mixture of racemic 7'-chlorodihydrocinchonidinone and racemic 7'-chlorodihydrocinchoninone from a mixture of racemic 7'-chlorodihydrocinchonidine and racemic 7'-chlorodihydrocinchonine To a solution of 2.6 g. of a crude mixture of racemic 7'-chlorodihydrocinchonidine and racemic 7'-chlorodihydrocinchonine in 150 ml. of dry benzene and 50 ml. of dry tetrahydrofuran was added 3.6 g. of fluorenone and 1.8 g. (16 mmol) of potassium t-butoxide, and the resulting dark solution was heated under gentle reflux for 90 min. in an atmosphere of dry nitrogen. The cold solution was extracted thoroughly with 1 N aqueous hydrochloric acid, the combined aqueous phase was neutralized (to pH ca. 8) by addition of concentrated ammonium hydroxide and extracted thoroughly with chloroform. Usual work up gave 2.2 g. of crude acid soluble material which was adsorbed on 22 g. of neutral alumina, activity II. Elution with benzene-ethylacetate 1:1 gave 2 g. of pure ketone which was crystallized from ether to give 1.26 g. of racemic 7'-chlorodihydrocinchonidinone containing some racemic 7'-chlorodihydrocinchoninone in three crops; M.P. 124–127°.

EXAMPLE 97

Unnatural, (+)-7'-chlorodihydrocinchonidine by resolution of racemic 7'-chlorodihydrocinchonidine 5.15 g. of racemic 7'-chlorodihydrocinchonidine was converted to the neutral (—)-tartrate and crystallized from about 100 ml. of methanol at 20° after seeding with an authentic sample of the less soluble (—)-7'-chlorodihydrocinchonidine neutral (—)-tartrate. The crystals (about 25% by weight) were removed by filtration, the mother liquors were converted to the neutral (+)-tartrates and crystallized in the same manner. The procedure was repeated about 5 times each (the racemic free base was once purified by crystallization in between crystallizations), the corresponding tartrates were combined (some fractions after recrystallization from ethanol) to give: 2.55 g. (about 40% of natural, (−)-7′-chlorodihydrocinchonidine neutral (−)-tartrate, M.P. 223–224°; $[\alpha]_D^{25}$ −84.3° (c. 1.05; chloroform-methanol 1:1); free base: M.P. 224–225°. $[\alpha]_D^{25}$ −94.46° (c. 0.9337; methanol); and 2.51 g. (about 40%) of unnatural, (+)-7′-chlorodihydrocinchonidine neutral (+)-tartrate, M.P. 220–222°; $[\alpha]_D^{25}$ +83.7° (c. 0.96; chloroform-methanol 1:1); free base: M.P. 224–225°; $[\alpha]_D^{25}$ +94.51° (c. 0.9607; methanol).

EXAMPLE 98

Unnatural, (−)-7′-chlorodihydrocinchonine from unnatural 7′-chlorodihydroanchonidine To a solution of 2.0 g. of unnatural, (+)-7′-chlorodihydroanchonidine in 150 ml. of dry benzene and 50 ml. of tetrahydrofuran was added 2.8 g. of fluorenone and 1.4 g. of potassium t-butoxide, and the resulting dark solution was heated under gentle reflux for 3 hours under an atmosphere of dry nitrogen. The cold reaction mixture was partitioned between benzene and 1 N aqueous hydrochloric acid, the combined aqueous layers were neutralized (to pH about 8) by addition of concentrated ammonium hydroxide, and extracted thoroughly with chloroform. Usual work up gave about 2 g. of amorphous, crude acid soluble material which was dried by azeotroping with dry benzene.

To a solution of the crude ketone (about 6 mmol) in 100 ml. of dry benzene was added with stirring at 20° one molar equivalent (about 4 ml.) of about 1.5 M diisopropyl alumminum hydride in toluene. After 30 min., 5 ml. of water was added and the mixture was evaporated to dryness. The residue was partitioned between chloroform containing 5% of ethanol and 1 N aqueous sodium hydroxide. Usual work up gave about 2 g. of crystalline product which was separated by crystallization as described above into: 0.803 g. of unnatural, (−)-7′-chlorodihydrocinchonine; M.P. 278–280° (after recrystallization from ethanol); $[\alpha]_D^{25}$ −166.8° (c. 0.73 in ethanol-acetic acid 9:1); dihydrochloride, after crystallization from ethanol, M.P. 194–198° $[\alpha]_D^{25}$ −144.78° (c. 0.8772, methanol); and 0.70 g. of unnatural, (+)-7′-chlorodihydrocinchonidine dihydrochloride; after recrystallization from ethanol-acetone, M.P. 204–207°; $[\alpha]_D^{25}$ +82.98° (c. 0.9376, methanol).

EXAMPLE 99

Preparation of 7-trifluoromethyl-4-{3-[3(R)-ethyl-4(S)-piperidyl] - 2 - oxopropyl}quinoline from 7-trifluoromethyllepidine and 3(R)-ethyl-4(S)-piperidineacetic acid methyl ester To 34.1 ml. of about 1.6 M n-butyl lithium in hexane, at −78° and under an atmosphere of dry nitrogen, was added 6.1 g. of diisopropylamine. To the lithium diisopropylamide thus prepared was added dropwise (30 min.) with stirring a solution of 10.46 g. of 7-trifluoromethyllepidine in 40 ml. of tetrahydrofuran. The brownish mixture containing 7-trifluoromethyllepidyl lithium was stirred at −78° for 30 min., then a solution of 5.28 g. of 3(R)-ethyl-4(S)-piperidineacetic acid methyl ester in 40 ml. of tetrahydrofuran was added dropwise (30 min.). Stirring at −78° was continued for 2 hours, then at −25° for 3 hours. Acetic acid was added to pH∼6. This was followed by addition of 5 g. of KHCO₃. After standing overnight, the mixture was filtered and the solid on the filter was washed with methanol. The filtrate was evaporated, and the residue was taken in 300 ml. of chloroform and was washed with 50 ml. 3N potassium hydroxide and 50 ml. of water. The chloroform solution was dried and evaporated. The crude product was purified by chromatography on a 420 g. silica gel column with 89:10:1 chloroform-methanol-ammonium hydroxide to give 6.04 g. (56 percent) of amorphous 7-trifluoromethyl-4-{3-[3-(R)-ethyl-4(S)-piperidyl]-2-oxopropyl}quinoline.

Analysis for $C_{20}H_{23}F_3N_2O$ (364.414).—Calcd. (percent): C, 65.92; H, 6.36; F, 15.64; N, 7.68. Found (percent): C, 65.87; H, 6.62; F, 13.99; N, 7.68.

EXAMPLE 100

Preparation of epimeric 7-trifluoromethyl-4-{3-[3(R)-ethyl - 4(S)-piperidyl] - 2 - hydroxypropyl}quinolines from 7 - trifluoromethyl - 4 - {3-[3(R)-ethyl-4(S)-piperidyl]-2-oxopropyl}quinoline To an ice cooled solution of 16.5 g. of 7-trifluoromethyl - 4 - {3-[3(R)-ethyl-4(S)-piperidyl]-2-oxopropyl} quinoline in 400 ml. of 95 percent ethanol was added 1.87 g. of sodium borohydride. After the reaction mixture was stirred for 2 hours, 0.45 g. of sodium borohydride was added, and the stirring was continued for 1 hour. The excess of sodium borohydride was then decomposed by the addition of acetic acid. After the addition of 200 ml. of water, the mixture was made basic (pH∼8) with concentrated ammonium hydroxide and the ethanol was evaporated. The pH was adjusted to about 11 with 3 N potassium hydroxide, and the aqueous mixture extracted with chloroform (3 × 100 ml.). The chloroform extract was washed with water, dried over sodium sulfate anhydrous, filtered and evaporated to give 15.95 g. (97 percent) of crude epimeric 7 - tribuoromethyl - 4 - {3-[3(R)-ethyl-4(S)-piperidyl]-2-hydroxypropyl}quinolines.

EXAMPLE 101

Preparation of epimeric 7 - trifluoromethyl - 4-{3-[3(R)-ethyl - 4(S)-piperidyl] - 2 - acetoxypropyl}quinolines from epimeric 7 - trifluoromethyl - 4 - {3-[3(R)-ethyl-4(S)-piperidyl]-2-hydroxypropyl}quinolines To the solution of 15.5 g. of epimeric 7-trifluoromethyl-4 - {3 - [3(R) - ethyl-4(S)-piperidyl]-2-hydroxypropyl} quinolines in 600 ml. of glacial acetic acid was added 60 ml. of boron trifluoride etherate, and the homogeneous reaction mixture was kept at 50° for 17 hours. Thereafter, the solvent was evaporated in vacuo and 200 g. of ice was added. After the pH was adjusted to about 8 with concentrated ammonium hydroxide, the aqueous mixture was extracted three times with 250 ml. portions of methylene chloride. The extract was dried over sodium sulfate anhydrous, filtered and evaporated to give 15.7 g. (91 percent) of crude epimeric 7 - trifluoromethyl-4-{3-[3(R)-ethyl-4(S)-piperidyl]2-acetoxypropyl}quinolines.

EXAMPLE 102

Preparation of a mixture of 7′-trifluoromethyl-desoxydihydrocinchonidine and 7′ - trifluoromethyl-desoxydihydrocinchonine from epimeric 7-trifluoromethyl-4-{3-[3(R)-ethyl - 4(S)-piperidyl] - 2-acetoxypropyl}quinolines The mixture of 15.2 g. of crude epimeric 7-trifluoromethyl - 4 - {3 - [3(R)-ethyl-4(S)-piperidyl]-2-acetoxypropyl}quinolines, 1000 ml. of benzene, 50 ml. of glacial acetic acid and 150 g. of sodium acetate trihydrate was refluxed under nitrogen for 16 hours. To the cooled mixture was added 600 g. of ice, and the pH was adjusted to about 8 with concentrated ammonium hydroxide. The aqueous layer was separated from benzene and extracted three times with 500 ml. of methylene chloride. This extract was combined with the benzene layer and washed with 50 ml. of water, dried over sodium sulfate anhydrous and evaporated to give 14.12 g. of crude product, which was chromatographed on a 400 g. silica gel column with 9:1 chloroformtriethylamine solvent system. At first, 5.63 g. of the mixture of 7′-trifluoromethyl-desoxydihydrocinchonidine and 7′ ≞ trifluoromethyl-desoxydihydrocinchonine was eluted. This was followed by elution of 5.65 g. of intermediate olefins, which were subjected to the same conditions of cyclization and workup. This gave an additional 1.57 g. of a mixture of 7'-trifluoromethyl-desoxydihydrocinchonidine and 7'-trifluoromethyl-desoxydihydrocinchonine or total 7.2 g. (54 percent yield).

EXAMPLE 103

Preparation of 7'-trifluoromethyl-dihydrocinchonidine and 7'-trifluoromethyl-dihydrocinchonine from the mixture of 7'-trifluoromethyl - desoxydihydrocinchonidine and 7'-trifluoromethyl-desoxydihydrocinchonine The reaction was carried out in a 500 ml., 3-neck flask connected with a gas burette and fitted with a gas outlet, an Erlenmeyer flask attached by means of a piece of Gooch rubber, and a magnetic stirrer.

A solution of 7.2 g. of a mixture of 7'-trifluoromethyl-desoxydihydrocinchonidine and 7' - trifluoromethyl - desoxydihydrocinchonine in 250 ml. of anhydrous dimethylsulfoxide-t-butanol (4:1) was first stirred in an atmosphere of dry oxygen at 20° for several minutes (no $O_2$ uptake observed), then 3.5 g. of solid potassium t-butoxide was added in one batch. The resulting reddish solution was stirred while uptake of oxygen was measured. After consumption of 555 ml. of oxygen (20 min., theory 465 ml. as one mole equivalent), the reaction mixture was quenched by addition of 5 ml. of water, and the pH was adjusted to about 7 by the addition of acetic acid. The reaction mixture was evaporated to dryness in vacuo, and the residue was taken up in 500 ml. of methylene chloride. This was then washed with 7.5 percent sodium bicarbonate (3× 50 ml.), water (1× 50 ml.), dried over anhydrous sodium sulfate, filtered and evaporated. The crude product was separated by chromatography on a 600 g. silica gel column with a 85:10:5 hexane-triethylamine-isopropanol eluent. The less polar fraction gave 1.9 g. (25 percent) of 7'-trifluoromethyl - dihydrocinchonine, M.P. 227–230° (from acetone).

Analysis for $C_{20}H_{23}F_3H_2O$ (364.414).—Calcd (percent): C, 65.92; H, 6.36; F, 15.64; N, 7.69. Found (percent): C, 65.79; H, 6.36; F, 15.41; N, 7.78.

Dihydrochloride of 7' - trifluoromethyl-dihydrocinchonine, M.P. >174° decomposition (from ethanol); $[\alpha]_D^{22}+129.5°$ (c. 1.00, $CH_3OH$).

Analysis for $C_{20}H_{23}F_3N_2O.2HCl$ (437.33).—Calcd (percent): C, 54.93; H, 5.76; Cl, 16.21; F, 13.03; N, 6.40. Found (percent): C, 55.07; H, 5.74; Cl, 15.97; F, 12.79; N, 6.33.

The more polar fraction gave 1.86 g. (24.7 percent) of 7'-trifluoromethyl - dihydrocinchonidine, M.P. 163–164° (from methanol-water); $[\alpha]_D^{25}$ −66.7° (c. 0.9, $CH_3OH$).

Analysis for $C_{20}H_{23}F_3H_2O$ (364.414).—Calcd (percent): C, 65.92; H, 6.36; F, 15.64; N, 7.69. Found (percent): C, 65.87; H, 6.31; F, 15.80; N, 7.55.

Dihydrochloride of 7' - trifluoromethyl - dihydrocinchonidine, M.P. >184° decomposition (from ethanol-acetone); $[\alpha]_D^{25}$ −62.9° (c. 1.00, $CH_3OH$).

Analysis for $C_{20}H_{23}F_3N_2O.2$ HCl (437.33).—Calcd (percent): C, 54.93; H, 5.76; Cl, 16.21; F, 13.03; N, 6.40. Found (percent): C, 54.70; H, 6.07; Cl, 16.00; F, 12.75; N, 6.28.

EXAMPLE 104

Preparation of 7-trifluoromethyl-4-{3 - [3(R) - vinyl - 4-(S)-piperidyl[-2-oxopropyl}quinoline from 7 - trifluoromethyllepidine and 3(R)-vinyl-4(S) - piperidineacetic acid methyl ester To 147 ml. of about 1.6 M n-butyllithium in hexane, at −78° and under an atmosphere of dry nitrogen, was added 25 g. of diisopropylamine. To the lithium diisopropylamide thus prepared, was added dropwise over a 30-minute period with stirring, a solution of 40.3 g. of 7-trifluoromethyllepidine in 500 ml. of tetrahydrofuran. The brownish mixture containing 7-trifluoromethyllepidyl lithium was stirred at −78° for 30 minutes. Then a solution of 18.1 g. of 3(R)-vinyl-4(S)-piperidineacetic acid methyl ester in 500 ml. of tetrahydrofuran was added dropwise (30 minutes). Stirring at −78° was continued for 12 hours, and at room temperature for 3 hours. Glacial acetic acid was added to about pH 7. Thereafter, 250 ml. of ether was added and the organic phase was extracted with 16× 500 ml. of 7.5 percent sodium bicarbonate solution. The aqueous bicarbonate extract was backwashed with 100 ml. of ether, and then with chloroform. The chloroform extract was dried over anhydrous sodium sulfate, filtered and evaporated to give 27.3 g. (75 percent) of crude 7-trifluoromethyl-4-{3 - [3(R) - vinyl - 4(S)-piperidyl]-2-oxopropyl}quinoline.

EXAMPLE 105

Preparation of epimeric 7-trifluoromethyl-4 - {3 - [3(R)-vinyl-4(S)-piperidyl]-2-hydroxypropyl}quinolines from 7-trifluoromethyl-4-{3-[3(R)-vinyl - 4(S) - piperidyl]-2-oxopropyl}quinoline To an ice cooled solution of 26.3 g. of 7-trifluoromethyl-4-{3 - [3(R) - vinyl - 4(S) - piperidyl] - 2 - oxopropyl}quinoline in 600 ml. of 95 percent ethanol was added 3.5 g. of sodium borohydride, and the reaction mixture was stirred for 2 hours. The excess of sodium borohydride was decomposed by the addition of acetic acid. 300 ml. of water was added, and the obtained mixture was made basic (pH~8) with concentrated ammonium hydroxide. The ethanol was evaporated, and the aqueous mixture was extracted with chloroform (3× 100 ml.). The extract was dried and evaporated to give 22.5 g. (86 percent) of crude epimeric 7-trifluoromethyl-4-{3-[3(R)-vinyl-4(S)-piperidyl]-2-hydroxypropyl}quinolines.

EXAMPLE 106

Preparation of epimeric 7-trifluoromethyl-4 - {3 - [3(R)-vinyl-4(S)-piperidyl]-2-acetoxypropyl}quinolines from epimeric 7-trifluoromethyl-4 - {3 - [3(R) - vinyl - 4(S)-piperidyl]-2-hydroxypropyl}quinolines To a solution of 21.5 g. of crude epimeric 7-trifluoromethyl-4-{3-[3(R)-vinyl-4(S) - piperidyl] - 2 - hydroxypropyl}quinolines in 800 ml. of glacial acetic acid was added 80 ml. of boron trifluoroetherate. The resulting homogeneous reaction mixture was kept at 50° for 17 hours. The solvent was evaporated in vacuo and 200 g. of ice was added to the residue. After the pH was adjusted to ~8 with concentrated ammonium hydroxide, the aqueous mixture was extracted three times with 250 ml. of methylene chloride. The extract was dried over sodium sulfate anhydrous, filtered and evaporated to give about 20 g. of crude product. Purification was performed by chromatography on a 600 g. silica gel column with 85:10:5 chloroform-triethylamine-methanol eluent to give 14.0 g. (61 percent) of amorphous epimeric 7-trifluoromethyl-4-{3-[3(R)-vinyl-4(S) - piperidyl] - 2 - acetoxypropyl}quinolines.

EXAMPLE 107

Preparation of a mixture of 7'-trifluoromethyl-desoxycinchonidine and 7'-trifluoromethyl-desoxycinchonine from epimeric 7'-trifluoromethyl-4-{3-[3(R)-vinyl-4(S)-piperidyl]-2-acetoxypropyl}quinolines The mixture of 14 g. of epimeric 7-trifluoromethyl-4-{3-[3(R)-vinyl-4(S)-piperidyl] - 2 - acetoxypropyl}quinolines, 900 ml. of benzene, 45 ml. of glacial acetic acid and 138 g. of sodium acetate trihydrate was refluxed under nitrogen for 16 hours. To the cooled mixture was added 200 g. of ice and the pH was adjusted to ~8 with concentrated ammonium hydroxide. The aqueous layer was separated from the benzene, and extracted with methylene chloride (3× 500 ml.). The combined organic phases were washed with 100 ml. of water, dried over sodium sulfate anhydrous, filtered and evaporated. The residue was chromatographed on a 400 g. silica gel column with 9:1 chloroform-triethylamine eluent to give 4.8 g. of cyclized product and 7.8 g. of intermediate olefins. Olefins were subjected to the same conditions of cyclization and work up. This gave additional 1.3 g. of cyclized product. Total yield 6.1 g. (51 percent) of a mixture of 7'-trifluoromethyl-desoxycinchonidine and 7'-trifluoromethyl-desoxycinchonine, $[\alpha]_D^{25}$ +73.3° (c. 1.3, $CH_3OH$).

Analysis for $C_{20}H_{21}F_3N_2$ (346.398).—Calcd (percent): C, 69.35; H, 6.11; F, 16.45; N, 8.09. Found (percent): C, 69.22; H, 6.20; F, 16.29; N, 8.05.

EXAMPLE 108

Preparation of 7'-trifluoromethyl-cinchonidine and 7'-trifluoromethyl-cinchonine from the mixture of 7'-trifluoromethyl-desoxycinchonidine and 7'-trifluoromethyl-desoxycinchonine The reaction was carried out in a 500 ml., 3-neck flask connected to a gas burette and fitted with a gas outlet, an Erlenmeyer flask attached by means of a piece of Gooch rubber, and a magnetic stirrer.

A solution of 5.7 g. of a mixture of 7'-trifluoromethyl-desoxycinchonidine and 7'-trifluoromethyl-desoxycinchonine in 200 ml. of anhydrous dimethyl sulfoxide-t-butanol (4:1) was first stirred in an atmosphere of dry oxygen at 20° for several minutes (no $O_2$ uptake observed), then 2.96 g. of solid potassium t-butoxide was added in one batch. The resulting reddish solution was stirred while uptake of oxygen was measured. After consumption of 400 ml. of oxygen (20 minutes, theory 368 ml. as one mole equivalent) the reaction mixture was quenched by the addition of 5 ml. water. The pH was adjusted to about 7 by the addition of acetic acid. After evaporation in vacuo, the residue was suspended in 500 ml. of methylene chloride, which was then washed with 7.5 percent sodium bicarbonate solution (3× 50 ml.) and water (50 ml.). The aqueous layer was reextracted with 100 ml. of methylene chloride. The combined organic phases were dried over sodium sulfate anhydrous, filtered and evaporated. 7.1 g. of the crude crystalline product was chromatographed on a 600 g. silica gel column with 9:1 chloroform-triethylamine eluent. The less polar 7'-trifluoromethylcinchonine, 1.4 g. (23.6 percent) was crystallized from acetone, M.P. 228–229°, $[\alpha]_D^{25}$ +154° (c. 0.95, $CH_3OH$). The more polar, 7'-trifluoromethyl-cinchonidine, 1.7 g. (28.7 percent); dihydrochloride was crystallized from ethanol, M.P. 211–215°, $[\alpha]_D^{25}$ −84.3° (c. 1.1, $CH_3OH$).

Utilizing the procedure of Example 108, the following compounds can be prepared:

5'-trifluoromethyl-cinchonidine
5'-trifluoromethyl-cinchonine
6'-trifluoromethyl-cinchonidine
6'-trifluoromethyl-cinchonine.

EXAMPLE 109

Preparation of 7'-trifluoromethyl-dihydrocinchonidine from 7'-trifluoromethyl-cinchonidine To a solution of 2.638 g. of 7'-trifluoromethyl-cinchonidine in 100 ml. of absolute methanol was added 1.5 g. of 99 percent hydrazine hydrate and about 20 mg. of cupric acetate. The mixture was stirred at room temperature for 3 days, filtered through celite, and evaporated to give 7'-trifluoromethyl-dihydrocinchonidine, M.P. 163–164° (from methanol-water).

EXAMPLE 110

Tablet formulation

| | Per tablet, mg. |
|---|---|
| 6',7'-dimethoxydihydrocinchonine | 25.00 |
| Dicalcium phosphate dihydrate unmilled | 175.00 |
| Corn starch | 24.00 |
| Magnesium stearate | 1.00 |
| Total weight | 225.00 |

Procedure: 25 parts of racemic 6',7'-dimethoxydihydrocinchonine and 24 parts of corn starch were mixed together and passed through a No. 00 screen in Model J Fitzmill with hammers forward. This premix was then mixed with 175 parts of dicalcium phosphate and one-half part of magnesium stearate, passed through a No. 1A screen in Model J Fitzmill with knives forward, and slugged. The slugs were passed through a No. 2A plate in a Model D Fitzmill at slow speed with knives forward, and the remaining magnesium stearate was added. The mixture was mixed and compressed.

EXAMPLE 111

Capsule formulation

| | Per capsule, mg. |
|---|---|
| 6',7'-dimethoxydihydrocinchonine | 50 |
| Corn starch, U.S.P. | 150 |
| Talc, U.S.P. | 10 |
| Total weight | 210 |

Procedure: Fifty parts of racemic 6',7'-dimethoxy-dihydrocinchonine were mixed with 150 parts of corn starch in a suitable mixer. The mixture was further blended by passing through a Fitzpatrick Comminuting Machine with a No. 1A screen with knives forward. The blended powder was returned to the mixer and 10 parts of talc were added and blended thoroughly. The mixture was filled into No. 4 hard shell gelatin capsules on a Parke Davis capsulating machine.

EXAMPLE 112

Suppository formulation

| | Per 1.3 gm. Suppository, gm. |
|---|---|
| 6',7'-dimethoxydihydrocinchonidine | 0.025 |
| Hydrogenated coconut oil | 1.230 |
| Carnauba wax | 0.045 |

Procedure: 123 parts of hydrogenated coconut oil (Wecobee M—E. F. Drew Co., New York, N.Y.) and 4.5 parts of carnauba wax were melted in a suitable size glass lined container (stainless steel may also be used), mixed well and cooled to 45° C. 2.5 parts of 6',7'-dimethoxy-dihydrocinchonidine, which had been reduced to a fine powder with no lumps, was added and stirred until completely and uniformly dispersed. The mixture was poured into suppository molds to yield suppositories having an individual weight of 1.3 gms. The suppositories were cooled and removed from molds and individually wrapped in wax paper for packaging.

EXAMPLE 113

6,8 - dichloro-4-{3-[1-benzoyl-3(R)-vinyl-4(S)-piperidyl]-2-oxo-propyl}-quinoline from 6,8-dichlorolepidine and N-benzoylmeroquinene ethyl ester To a solution of about 6 mmol of lithium diisopropylamide (prepared by addition of 1.5 ml. of diisopropylamine in 5 ml. of dry ether to 4 ml. of about 1.5 molar n-butyllithium in pentane, at −78° under $N_2$) was added dropwise a solution of 1.2 g. (5.7 mmol) of 6,8-dichlorolepidine in 20 ml. of toluene and 15 ml. of ether, and the resulting dark brown suspension was stirred for 2 hours at −78° under nitrogen. A solution of 0.7 g. (2.3 mmol) of N-benzoylmeroquinene ethyl ester in 20 ml. of ether was added dropwise (10 min), followed after stirring at −78° for 30 min. by 7 ml. of anhydrous hexamethylphosphoramide, and the resulting reddish mixture was sitrred at ambient temperature for 18 hours. 50 ml. of water was added, the pH was adjusted to about 8 by addition of acetic acid, the aqueous phase was separated and extracted thoroughly with ether. The combined organic layers were washed with water, dried over magnesium sulfate and evaporated in vacuo. The residue (2 g.) was absorbed on 60 g. of neutral alumina, activity II; elution with benzene afforded unreacted starting materials and some unpolar, unwanted side-products, elution with benzene containing 10 to 50 percent ethyl acetate afforded, after further purification of some fractions by preparative layer chromatography, 0.43 g. (40 percent) of amorphous 6,8-dichloro-4-{3-[1-benzoyl - 3(R) - vinyl-4(S)-piperidyl]-2-oxopropyl}-quinoline.

EXAMPLE 114

Epimeric 6,8 - dichloro-4-{3-[3(R)-vinyl-4(S)-piperidyl]-2-hydroxy-propyl}-quinolines from 6,8-dichloro-4-{3-[1-benzoyl-3(R)-vinyl - 4(S)-piperidyl]-2-oxopropyl}-quinoline To a stirred, ice cold solution of 8.9 g. (about 0.0019 mol) of 6,8 - dichloro - 4 - {3-[1-benzoyl-3(R)-vinyl-4-(S)-piperidyl]-2-oxopropyl}-quinoline in 300 ml. of 95 percent ethanol was added 0.74 g. (1 molar equivalent) of solid sodium borohydride. After stirring for 60 minutes, 40 ml. of water was added, and the ethanol was stripped in vacuo. The aqueous residue was extracted thoroughly with dichloromethane, the extracts were dried over sodium sulfate and concentrated in vacuo, to give about 9 g. of amorphous epimeric 6,8-dichloro-4-{3-[1-benzoyl-3(R)-vinyl-4(S)-piperidyl]-2-hydroxypropyl}-quinolines.

The crude residue was dried by azeotroping with toluene, dissolved in 250 ml. of anhydrous toluene, cooled to −78°, and 30 ml. (about 2.2 molar equivalent) of a 1.5 M solution of diisobutyl aluminum hydride in toluene was added dropwise (20 min.) in an atmosphere of dry nitrogen. The homogeneous solution was stirred at −78° for 60 min., 5 ml. of methanol-water (1:1) was added, and the solvent was removed in vacuo. The residue was partitioned between ether and 1 N hydrochloric acid, the aqueous phase rendered alkaline with conc. ammonium hydroxide and extracted thoroughly with dichloromethane. Usual workup gave 7.3 g. of crude product which was absorbed on 140 g. of neutral alumina, activity II; elution with ethyl acetate containing 1 percent of methanol afforded some by-product, elution with methanol gave 4.2 g. (61 percent) of amorphous epimeric 6,8-dichloro-4-{3-[3(R)-vinyl - 4(S) - piperidyl]-2-hydroxypropyl}-quinolines.

EXAMPLE 115

Mixture of 6′,8′-dichloro-desoxycinchonidine and 6′,8′-dichlorodesoxycinchonine from epimeric 6,8-dichloro-4-{3-[3(R)-vinyl-4(S)-piperidyl] - 2 - hydroxypropyl}-quinolines To a solution of 4.2 g. (11.5 mmol) of epimeric 6,8-dichloro-4-{3-[3(R)-vinyl - 4(S) - piperidyl]-2-hydroxypropyl}-quinolines in 150 ml. of glacial acetic acid was added 15 ml. of freshly distilled boron trifluoride, and the homogeneous solution was kept at 50° for 2½ days. The acetic acid was stripped, ice-water was added, the aqueous solution was rendered alkaline with conc. ammonium hydroxide and extracted thoroughly with dichloromethane. Usual workup afforded 4.5 g. of amorphous epimeric 6,8-dichloro - 4 - {3-[3(R)-vinyl-4(S)-piperidyl]-2-acetoxypropyl}-quinolines.

The crude product was dissolved in 250 ml. of benzene, 12.5 ml. of acetic acid and 12 g. of sodium acetate trihydrate were added, and the resulting mixture was heated with stirring under gentle reflux for 45 hours. 50 ml. of water was added to the cold mixture, the aqueous phase was rendered alkaline by addition of conc. ammonium hydroxide, separated from the organic layer and extracted thoroughly with dichloromethane. The combined organic layers were dried over sodium sulfate and evaporated in vacuo to give 3.5 g. of crude product which was adsorbed on 110 g. of neutral alumina, activity II. Elution with ethyl acetate agorded the desired product, elution with methanol gave some starting material which was subjected to the same conditions for cyclization. The combined fractions containing the desired product were further purified by partition between 1 N hydrochloric acid and ether. The aqueous phase was rendered alkaline by addition of conc. ammonium hydroxide and extracted thoroughly with dichloromethane to give, after usual workup, 2.2 g. (55 percent) of a crystalline mixture of 6′,8′-dichlorodesoxycinchonidine and 6′,8′-dichlorodesoxycinchonine; M.P. 85–87° after recrystallization from ether. $[\alpha]_D^{25}$ +62.5° (c. 1.02, $CH_3OH$).

EXAMPLE 116

6′,8′ - dichlorocinchonidine and 6′,8′ - dichlorocinchonine from a mixture of 6′,8′-dichlorodesoxycinchonidine and 6′,8′-dichlorodesoxycinchonine Apparatus: 100 ml., 3-neck flask connected with a gas burette, and fitted with a gas outlet, an Erlenmeyer flask attached by means of a piece of gooch rubber and a magnetic stirrer.

2.1 g. of a mixture of 6′,8′-dichlorodesoxycinchonidine and 6′,8′-dichlorodesoxycinchonine was hydroxylated in two batches as follows: to about an 0.1 M solution in dry dimethylsulfoxide-t-butanol (4:1) is added 1.1 molar equivalent of dry potassium t-butoxide and the resulting dark solution is stirred vigorously in an atmosphere of dry oxygen. After rapid uptake of one molar equivalent of oxygen, the reaction (color turned to light brown) is quenched by addition of water. The solution is neutralized by addition of acetic acid, the solvents stripped in vacuo, and the residue dissolved in dichloromethane, washed with 10 percent sodium bicarbonate, and worked up as usual.

The combined crude products were separated by preparative layer chromatography (silica gel $GF_{254}$; chloroform-triethylamine 97:3; 4 times developed) into: 6′,8′-dichlorocinchonidine (more polar fraction; 0.94 g., about 41 percent); M.P. 105–108° after recrystallization from benzene; $[\alpha]_D^{25}$ −96.5° (c. 0.85; $CH_3OH$). The dihydrochloride crystallized from ethanol-ether as monohydrate tritoethanolate: M.P. >210°, dec.; $[\alpha]_D^{25}$ −109.5° (c. 0.90, $CH_3OH$). 6,8′-dichlorocinchonine (less polar fraction; 1 g., about 45 percent). The dihydrochloride crystallized from ethanol-ether as monohydrate; M.P. 250°, dec. $[\alpha]_D^{25}$ +169.3° (c. 0.89, $CH_3OH$).

We claim:
1. A process for preparing racemic or optically active alpha-[5-vinyl(or lower alkyl of 1 to 7 carbon atoms)-2-quinuclidinyl]-4-quinolinemethanols, epimeric at positions alpha, 2 and 5, which comprises the steps of:
    (a) condensing the correspondingly substituted 4-methylquinoline and corresponding racemic or optically active cis or trans 1-acyl(or 1-H)-3-vinyl(or lower alkyl of 1 to 7 carbon atoms)-4-piperidylacetic acid or ester thereof in the presence of sodium hydride, an alkali metal alkoxide or a lithium dialkylamide to yield the corresponding racemic or optically active cis or trans 4-{3-[1-acyl(or 1-H)-3-vinyl(or lower alkyl of 1 to 7 carbon atoms)-4-piperidyl]-2-oxopropyl}-quinoline wherein acyl is lower alkanoyl of 1 to 7 carbon atoms or phenyl-lower alkanoyl of 1 to 7 carbon atoms;
    (b) deacylating, if necessary, and reducing the product of step (a) utilizing diisobutylaluminum hydride or sodium aluminum hydride to yield the corresponding racemic or optically active epimeric 4-{cis or trans 3-[3-vinyl(or lower alkyl of 1 to 7 carbon atoms)-4-piperidyl]-2-hydroxypropyl}-quinoline;
(c) cyclizing the product of step (b) utilizing acetic acid in the presence of a solvent selected from the group consisting of benzene, toluene, diethyl ether, and tetrahydrofuran to yield the corresponding racemic or optically active 4-{alpha-[5-vinyl(or lower alkyl of 1 to 7 carbon atoms)-2-quinuclidinyl]methyl}quinoline, epimeric at positions 2 and 5; and
(d) hydroxylating the product of step (c) in the presence of molecular oxygen and a reducing agent selected from the group consisting of dimethylsulfoxide, pyridine, triphenylphosphine, platinum black and a trialkylphosphite in a strong base to yield the corresponding racemic or optically active alpha-[5-vinyl (or lower alkyl of 1 to 7 carbon atoms)-2-quinuclidinyl]-4-quinoline-methanol, epimeric in positions alpha, 2 and 5.

2. A process in accordance with claim 1, wherein 6-methoxy-4-methylquinoline and racemic or optically active cis 1-acyl(or 1-H)-3-vinyl-4-piperidylacetic acid or ester thereof, wherein acyl is lower alkanoyl of 1 to 7 carbon atoms or phenyl-lower alkanoyl of 1 to 7 carbon atoms is utilized.

3. A process in accordance with claim 1, wherein the organic acid of step (c) is glacial acetic acid and the strong base in step (d) is potassium t-butoxide.

4. A process in accordance with claim 1, wherein 6-methoxy-4-methylquinoline and racemic or optically active cis 1-acyl(or 1-H)-3-ethyl-4-piperidylacetic acid or ester thereof, wherein acyl is lower alkanoyl of 1 to 7 carbon atoms or phenyl-lower alkanoyl of 1 to 7 carbon atoms, is utilized.

5. A process for preparing racemic or optically active alpha-[5-vinyl(or lower alkyl of 1 to 7 carbon atoms)-2-quinuclidinyl]-4-quinolinemethanols, epimeric in positions alpha, 2 and 5, which comprises the steps of hydroxylating the correspondingly substituted racemic or optically active 4-{alpha-[5-vinyl(or lower alkyl of 1 to 7 carbon atoms)-2-quinuclidinyl]methyl}quinoline, epimeric at positions 2 and 5 in the presence of molecular oxygen and a reducing agent selected from the group consisting of dimethylsulfoxide, pyridine, triphenylphosphine, platinum black and a trialkylphosphite in a strong base.

6. A process in accordance with claim 5, wherein racemic or optically active 6'-methoxy-4-{alpha-[5-vinyl-2-quinuclidinyl]methyl}quinoline, epimeric at positions 2 and 5, is utilized, and the reducing agent is dimethylsulfoxide and the base is potassium t-butoxide.

7. A process in accordance with claim 5, wherein racemic or optically active 6'-methoxy-4-{alpha[5-ethyl-2-quinuclidinyl]methyl}-quinoline, epimeric at positions 2 and 5, is utilized, and the reducing agent is dimethylsulfoxide and the base is potassium t-butoxide.

8. A process for preparing racemic or optically active alpha-[5-vinyl(or lower alkyl of 1 to 7 carbon atoms)-2-quinuclidinyl]-4-quinolinemethanols, epimeric at positions alpha, 2 and 5, which comprises the steps of:
(a) condensing the correspondingly substituted 4-methylquinoline with racemic or optically active cis or trans 1-acyl(or 1-H)-3-vinyl(or lower alkyl of 1 to 7 carbon atoms)-4-piperidylacetic acid or ester thereof in the presence of sodium hydride, an alkali metal alkoxide or a lithium dialkylamide to yield the corresponding racemic or optically active cis or trans 4-{3-[1-acyl(or 1-H)-3-vinyl(or lower alkyl of 1 to 7 carbon atoms)-4-piperidyl]-3-oxopropyl}-quinoline wherein acyl is lower alkanoyl of 1 to 7 carbon atoms or phenyl-lower alkanoyl of 1 to 7 carbon atoms;
(b) deacylating, if necessary, and reducing the product of step (a) utilizing diisobutylaluminum hydride or sodium aluminum hydride to yield the corresponding racemic or optically active epimeric 4-{cis or trans 3-[3-vinyl(or lower alkyl of 1 to 7 carbon atoms)-4-piperidyl]-2-hydroxypropyl}-quinoline;
(c) acylating the product of step (b) to yield the corresponding racemic or optically active epimeric 4-{cis or trans 3-[3-vinyl(or lower alkyl of 1 to 7 carbon atoms)-4-piperidyl]-2-acyloxypropyl}-quinoline wherein acyloxy is lower alkanoyloxy of 1 to 7 carbon atoms and phenyl-lower alkanoyloxy of 1 to 7 carbon atoms;
(d) cyclizing the product of step (c) utilizing acetic acid in the presence of a solvent selected from the group consisting of benzene, toluene, diethyl ether and tetrahydrofuran to yield the corresponding racemic or optically active 4-{alpha-[5-vinyl(or lower alkyl of 1 to 7 carbon atoms)-2-quinuclidinyl]methyl}-quinoline, epimeric in positions 2 and 5; and
(e) hydroxylating the product of step (d) in the presence of molecular oxygen and a reducing agent selected from the group consisting of dimethylsulfoxide, pyridine, triphenylphosphine, platinum black and a trialkylphosphite in a strong base to yield the corresponding racemic or optically active alpha-[5-vinyl(or lower alkyl of 1 to 7 carbon atoms)-2-quinuclidinyl] - 4 - quinolinemethanol, epimeric in positions alpha, 2 and 5.

9. A process for preparing racemic or optically active alpha-[5-vinyl(or lower alkyl of 1 to 7 carbon atoms)-2-quinuclidinyl]-4-quinolinemethanols, epimeric at positions alpha, 2 and 5, which comprises the steps of:
(a) condensing the correspondingly substituted 4-methylquinoline with racemic or optically active cis or trans 1-acyl(or 1-H)-3-vinyl(or lower alkyl of 1 to 7 carbon atoms)-4-piperidylacetic acid or ester thereof in the presence of sodium hydride, an alkali metal alkoxide or a lithium dialkylamide to yield the corresponding racemic or optically active cis or trans 4-{3-[1-acyl(or 1-H)-3-vinyl(or lower alkyl of 1 to 7 carbon atoms)-4-piperidyl]-2-oxopropyl}-quinoline wherein acyl is lower alkanoyl of 1 to 7 carbon atoms or phenyl-lower alkanoyl of 1 to 7 carbon atoms;
(b) deacylating, if necessary, and reducing the product of step (a) utilizing diisobutylaluminum hydride or sodium aluminum hydride to yield the corresponding racemic or optically active epimeric 4-{cis or trans 3-[3-vinyl(or lower alkyl of 1 to 7 carbon atoms)-4-piperidyl]-2-hydroxypropyl}-quinoline;
(c) dehydrating the product of step (b) utilizing a dehydrating agent selected from the group consisting of thionyl chloride, phosphorus oxychloride and phosphorus pentachloride, to yield the corresponding racemic or optically active cis or trans 4-{cis or trans 3-[3-vinyl(or lower alkyl of 1 to 7 carbon atoms)-4-piperidyl]-prop-1-enyl}-quinoline;
(d) cyclizing the product of step (c) utilizing acetic acid in the presence of a solvent selected from the group consisting of benzene, toluene, diethyl ether and tetrahydrofuran to yield the corresponding racemic or optically active 4-{alpha-[5-vinyl(or lower alkyl of 1 to 7 carbon atoms)-2-quinuclidinyl]methyl}-quinoline, epimeric in positions 2 and 5; and
(e) hydroxylating the product of step (d) in the presence of molecular oxygen and a reducing agent selected from the group consisting of dimethylsulfoxide, pyridine, triphenylphosphine, platinum black and a trialkylphosphite in a strong base to yield the corresponding racemic or optically active alpha-[5-vinyl(or lower alkyl of 1 to 7 carbon atoms)-2-quinuclidinyl] - 4 - quinolinemethanol, epimeric in positions alpha, 2 or 5.

10. A process in accordance with claim 3, wherein step (a) is carried out in the presence of lithium diisopropylamide.

(References on following page)

References Cited
UNITED STATES PATENTS

| | | | |
|---|---|---|---|
| 2,109,957 | 3/1938 | Dahlen et al. | 260—687 X |
| 2,437,938 | 3/1948 | Cislak et al. | 260—687 X |
| 2,502,264 | 3/1950 | Lutz et al. | 260—288 R |
| 2,748,141 | 5/1956 | Cislak | 260—687 X |
| 2,798,071 | 4/1957 | Mathes et al. | 260—289 |
| 2,898,368 | 8/1959 | Pommer | 260—687 X |
| 3,318,891 | 5/1967 | Hausman | 260—270 |
| 3,364,219 | 1/1968 | Albright et al. | 260—288 |
| 3,391,146 | 7/1968 | Godfrey | 260—288 |

OTHER REFERENCES

Turner et al.: Alkaloid, vol. 3, pp. 1–63 (1953).

DONALD G. DAUS, Primary Examiner

U.S. Cl. X.R.

260—240.1, 283.1, 283 S, 287 R, 288 R, 289 R, 293.55, 293.86, 293.88, 465.1; 424—67, 258, 259 R